(12) United States Patent
Ravishankar et al.

(10) Patent No.: US 10,117,249 B2
(45) Date of Patent: Oct. 30, 2018

(54) HIGH SPEED, HIGH TERRESTRIAL DENSITY GLOBAL PACKET DATA MOBILE SATELLITE SYSTEM ARCHITECTURES

(71) Applicant: Hughes Network Systems, LLC, Germantown, MD (US)

(72) Inventors: Channasandra Ravishankar, Clarksburg, MD (US); John Corrigan, Chevy Chase, MD (US)

(73) Assignee: Hughes Network Systems, LLC, Germantown, MD (US)

( * ) Notice: Subject to any disclaimer, the term of this patent is extended or adjusted under 35 U.S.C. 154(b) by 0 days.

(21) Appl. No.: 15/372,357

(22) Filed: Dec. 7, 2016

(65) Prior Publication Data
US 2017/0085329 A1    Mar. 23, 2017

Related U.S. Application Data

(63) Continuation-in-part of application No. 15/186,417, filed on Jun. 17, 2016.
(Continued)

(51) Int. Cl.
*H04W 72/04* (2009.01)
*H04B 7/185* (2006.01)
*H04B 7/19* (2006.01)

(52) U.S. Cl.
CPC .... *H04W 72/0453* (2013.01); *H04B 7/18558* (2013.01); *H04B 7/19* (2013.01)

(58) Field of Classification Search
CPC .. H04W 72/0453; H04B 7/18558; H04B 7/19
See application file for complete search history.

(56) References Cited

U.S. PATENT DOCUMENTS 6,442,147 B1    8/2002 Mauger et al.
6,542,739 B1    4/2003 Garner
(Continued)

OTHER PUBLICATIONS

USPTO, "International Search Report & Written Opinion", PCT/US2016/038260, dated Sep. 28, 2016.

*Primary Examiner* — Ian N Moore
*Assistant Examiner* — Latresa McCallum
(74) *Attorney, Agent, or Firm* — Potomac Technology Law, LLC

(57) ABSTRACT

A satellite communications system comprises multiple satellites (e.g., a combination of LEO/MEO/GEO satellites). Multiple satellite gateways communicate over channels of the satellites with remote mobile user terminals. The mobile user terminals communicate with the satellite gateways via associated satellite terminals that interface with the satellites, or directly with the satellites. Each mobile user terminal of a first group communicates with a satellite gateway, over satellite channels, via an associated satellite terminal. Each mobile user terminal of a second group (e.g., in a remote rural area) communicates with a satellite gateway directly over satellite channels. The mobile user terminals of the first communicate with the satellite terminals locally via S-band. The mobile user terminals of the second group communicate directly over the satellite channels via Ku band or Ka Band. Each of the satellite gateways communicates over satellite channels via Ka band, Ku band, V-band or L-band.

1 Claim, 42 Drawing Sheets

Related U.S. Application Data

(60) Provisional application No. 62/264,204, filed on Dec. 7, 2015, provisional application No. 62/181,062, filed on Jun. 17, 2015.

(56) References Cited

U.S. PATENT DOCUMENTS

| | | | |
|---|---|---|---|
| 2004/0024791 A1 | 2/2004 | Martin et al. | |
| 2007/0252765 A1* | 11/2007 | Jayasuriya | H04B 7/1853 343/702 |
| 2013/0217422 A1 | 8/2013 | Zakaria et al. | |
| 2013/0232565 A1 | 9/2013 | O'Connor et al. | |
| 2013/0321206 A1* | 12/2013 | Chang | H01Q 3/34 342/372 |
| 2014/0022983 A1 | 1/2014 | Ravishankar et al. | |
| 2014/0198709 A1* | 7/2014 | Chang | H04B 7/18526 370/312 |
| 2015/0024677 A1 | 1/2015 | Gopal et al. | |
| 2015/0052360 A1 | 2/2015 | Ravishankar et al. | |
| 2015/0280810 A1* | 10/2015 | Beals | H04B 7/1851 455/13.1 |
| 2016/0006500 A1 | 1/2016 | Radpour | |

* cited by examiner

FIG. 6B(ii)

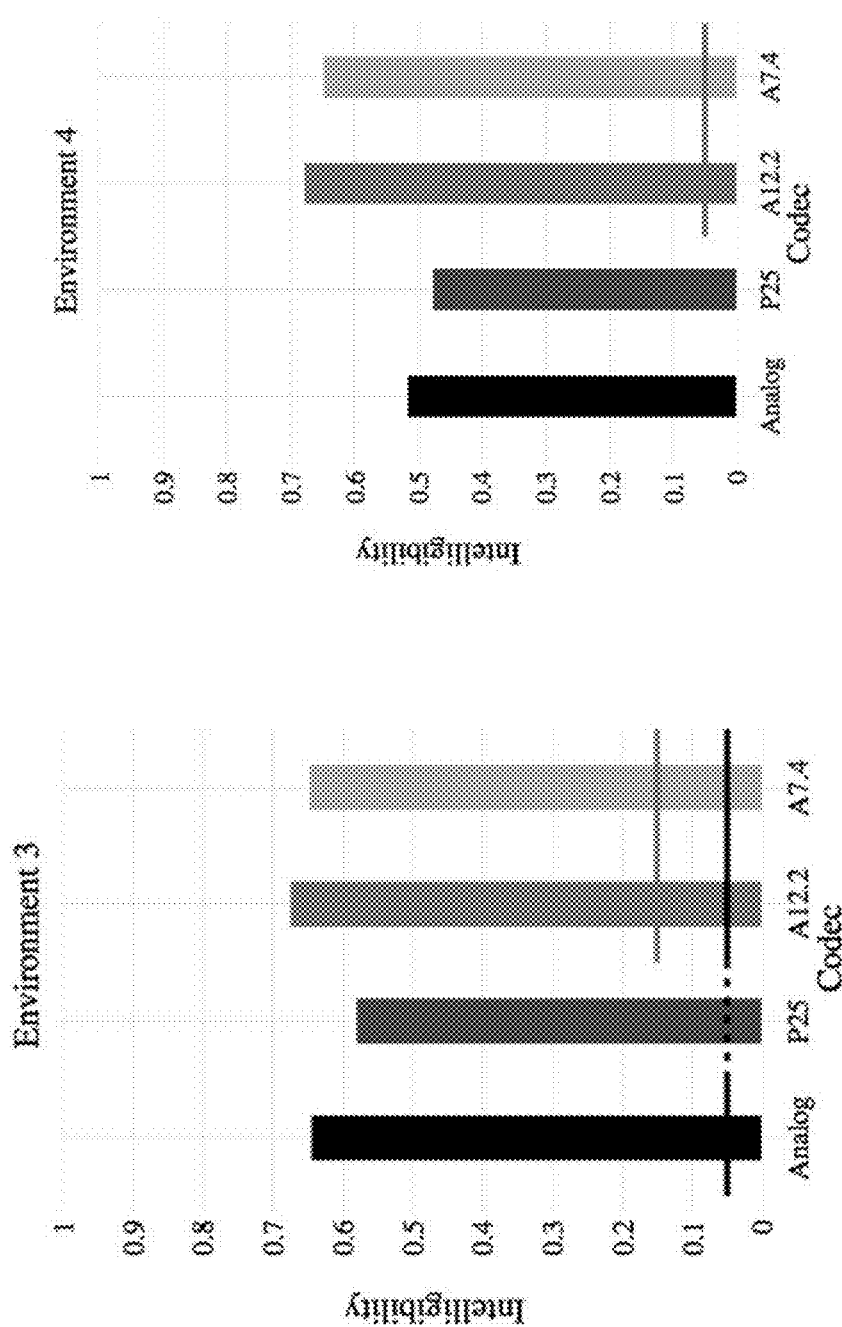
FIG. 6B(iv)
FIG. 6B(iii)

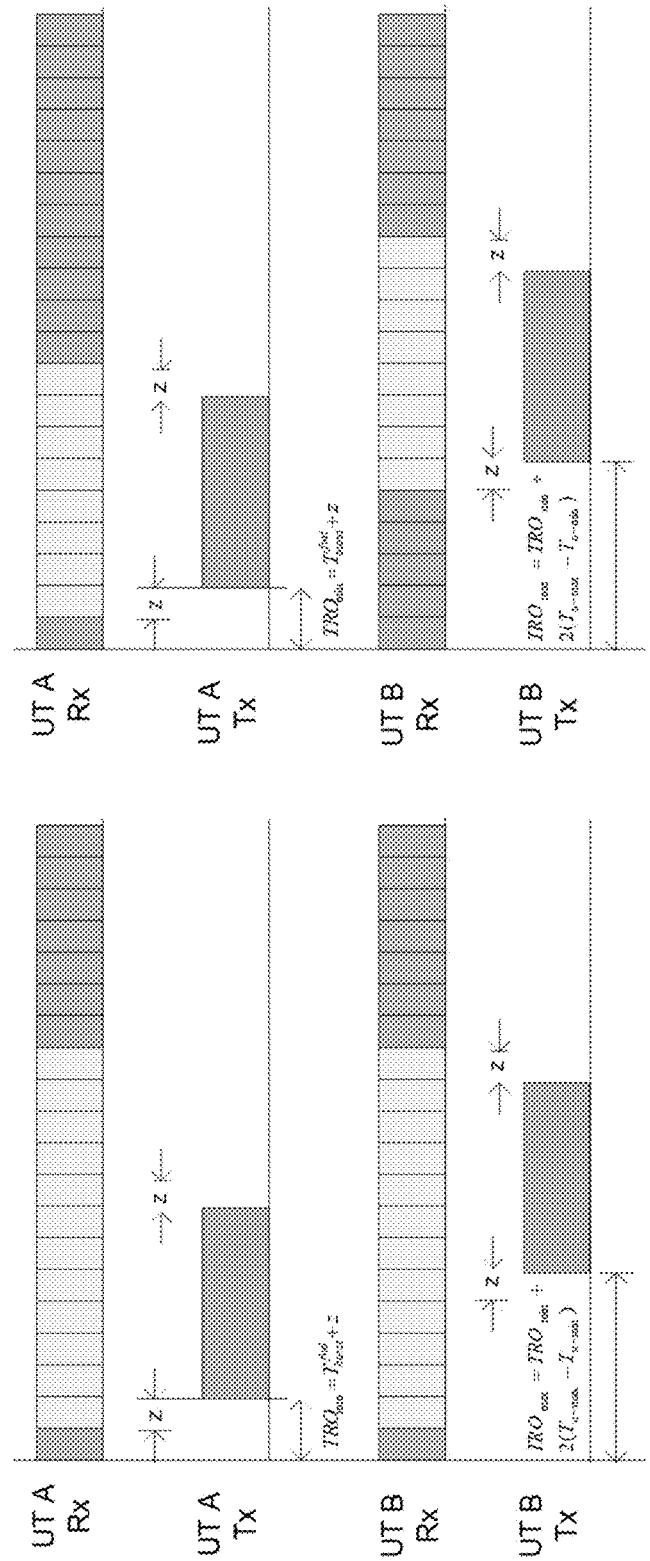

Fig. 3: 1% outage capacity of 2x2 MIMO LMS channel vs. SNR in open rural environment. Effect of antenna cross-polarization discrimination, $XPD_{ant}$.

Fig. 4: 1% outage capacity of 2x2 MIMO LMS channel vs. SNR in suburban environment. Effect of satellite elevation angle, $\theta$.

Fig. 1. Propagation scenario for the LMS dual polarized MIMO: a mobile terminal receives correlated co- and cross-polar (R/LHCP) tree attenuated and scattered fields from both sides of the road.

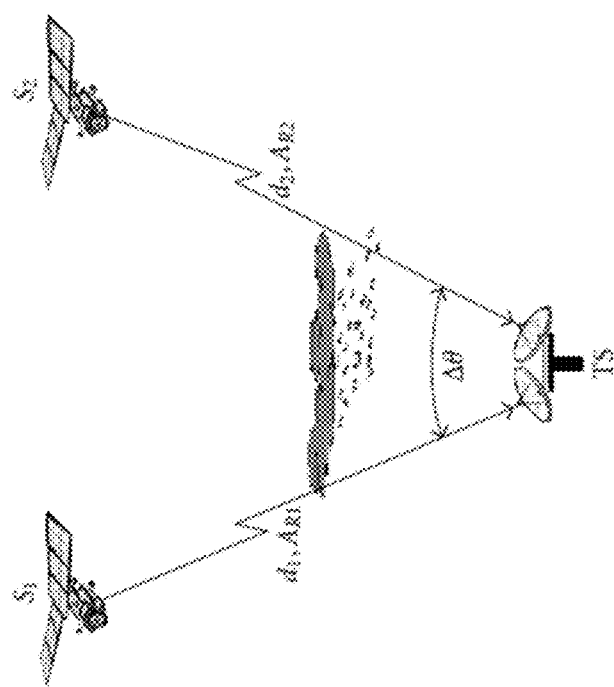
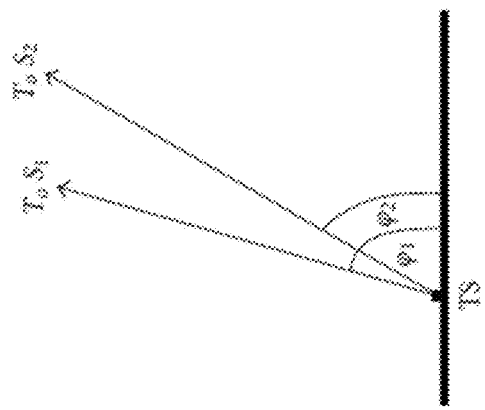
FIG. 16A
FIG. 16B

HIGH SPEED, HIGH TERRESTRIAL DENSITY GLOBAL PACKET DATA MOBILE SATELLITE SYSTEM ARCHITECTURES

RELATED APPLICATIONS

This application claims the benefit of the earlier filing date under 35 U.S.C. § 119(e) from U.S. Provisional Application Ser. No. 62/264,204 (filed 2015 Dec. 7), which is incorporated herein by reference in its entirety; and this application is a continuation in part (CIP) from U.S. patent application Ser. No. 15/186,417 (filed 2016 Jun. 17), which claims the benefit of the earlier filing date under 35 U.S.C. § 119(e) from U.S. Provisional Application Ser. No. 62/181,062 (filed 2015 Jun. 17), the entireties of which are incorporated herein by reference.

BACKGROUND

Terrestrial communication systems continue to provide higher and higher speed multimedia (e.g., voice, data, video, images, etc.) services to end-users. Such services (e.g., Third Generation (3G) and Fourth Generation Long Term Evolution (4G LTE) systems and services) can also accommodate differentiated quality of service (QoS) across various applications. To facilitate this, terrestrial architectures are moving towards an end-to-end all-Internet Protocol (IP) architecture that unifies all services, including voice, over the IP bearer. In parallel, mobile satellite systems are being designed to complement and/or coexist with terrestrial coverage depending on spectrum sharing rules and operator choice. With the advances in processing power of portable computers, mobile phones and other highly portable devices, the average user has grown accustomed to sophisticated applications (e.g., streaming video, radio broadcasts, video games, etc.), which place tremendous strain on network resources. Further, such users have grown to expect ubiquitous global coverage. The Web as well as other Internet services rely on protocols and networking architectures that offer great flexibility and robustness; however, such infrastructure may be inefficient in transporting Web traffic, which can result in large user response time, particularly if the traffic has to traverse an intermediary network with a relatively large latency (e.g., a satellite network). Such high mobility, enhanced processing power of devices, and growth of low-latency applications, however, puts an immense strain on current terrestrial and satellite communications systems.

What is needed, therefore, are approaches for multi-satellite mobile satellite communications systems that efficiently provide high speed and high quality packet data services, and facilitate high terrestrial density.

SOME EXAMPLE EMBODIMENTS

Embodiments of the present invention advantageously address the foregoing requirements and needs, as well as others, by providing system architectures and designs for multi-satellite mobile satellite communications systems that efficiently provide high speed and high quality packet data services, and facilitate high terrestrial density.

With processing satellites (e.g., geosynchronous Earth orbit (GEO), medium Earth orbit (MEO), and low Earth orbit (LEO) and satellites), IP packets and Layer 2 frames transmitted by user terminals are recovered at the satellite and transmitted on the gateway links and/or inter-satellite links. Similarly, in the direction from network to user terminal, IP packets and Layer 2 frames transmitted by gateways are recovered at the satellite and transmitted on the user links. The frequency and format of transmission on gateway and user links may be different. In addition, the transmission to and from user terminal on a user link may be different. Similarly, the transmission to and from gateway on a gateway link may be different. The architecture also permits transmission from user terminal to another user terminal directly without traversing through a gateway. Similarly, the architecture permits direct gateway to gateway communication via the satellite constellation. When LEO/MEO satellites are not processing satellites (i.e., they are bent-pipe satellites), communication is directly between user terminal and gateway with a frequency translation between gateway links and user links.

In accordance with example embodiments, an overall network architecture is shown in FIGS. 1A, 1B. The user terminal (UT) may be in one of a multiplicity of beams in the user link. Satellites, and therefore beams corresponding those satellites move (for satellite-fixed beams) over the user terminal as the satellites of the constellation move, even if the user terminal is not moving. Accordingly, beam-to-beam and satellite-to-satellite handover are required in this scenario. User terminals are typically equipped with a tracking antenna that is preferably electronically steered. However, the design does not preclude terminals using mechanical steering. In another embodiment, the satellite attempts to steer its antenna such that beams remain in the same place on the earth surface (also called earth-fixed beams). In this case, there is no need for beam-to-beam handover. The system also supports gateway to gateway handover to cater to cases where a user terminal may be in motion and it crosses from one gateway region to another. Gateway to Gateway handover would also be necessary when a Gateway fails or when the capacity of the gateway is such that it cannot accept any additional sessions. As part of the above mentioned beam-to-beam, satellite-to-satellite and gateway-to-gateway handovers, frequency handovers occur in a multiple frequency reuse system. To this end, the system design also supports frequency handover even when there is no beam-to-beam, satellite-to-satellite and gateway-to-gateway handovers; this will be the case when a frequency is deemed unusable due to interference and/or when it is required to move a terminal to a different frequency for resource usage efficiency issues and for services such as IP multicast.

Certain system features are as follows:
Powerful FEC coding, near theoretical channel performance;
Adaptive Coding & Modulation (ACM) improves throughput every channel condition;
Power and spectrally efficient advanced modulation;
High spectral efficiency;
High terrestrial and satellite capacity density;
High-speed data services, and high quality of service (QoS) real-time or streaming services; and
Standard wireless and network protocols to utilize commercial implementations and evolution.

Still other aspects, features, and advantages of the present invention are readily apparent from the following detailed description, simply by illustrating a number of particular embodiments and implementations, including the best mode contemplated for carrying out the present invention. The present invention is also capable of other and different embodiments, and its several details can be modified in various obvious respects, all without departing from the spirit and scope of the present invention. Accordingly, the drawing and description are to be regarded as illustrative in nature, and not as restrictive.

BRIEF DESCRIPTION OF THE DRAWINGS

Embodiments of the present invention are illustrated by way of example, and not by way of limitation, in the figures of the accompanying drawings, in which like reference numerals refer to similar elements, and in which:

FIG. 8A illustrates synchronization and half-duplex operation for a beam level, position unaware scheduler, according to example embodiments;

FIG. 8B illustrates synchronization and half-duplex operation for a terminal position aware scheduler according to example embodiments;

FIG. 16A and FIG. 16B (Liolis, et al., EURASIP WCN, 2007) illustrate a multi-satellite MIMO example at Ka band and above.

DETAILED DESCRIPTION

Figure 1A:
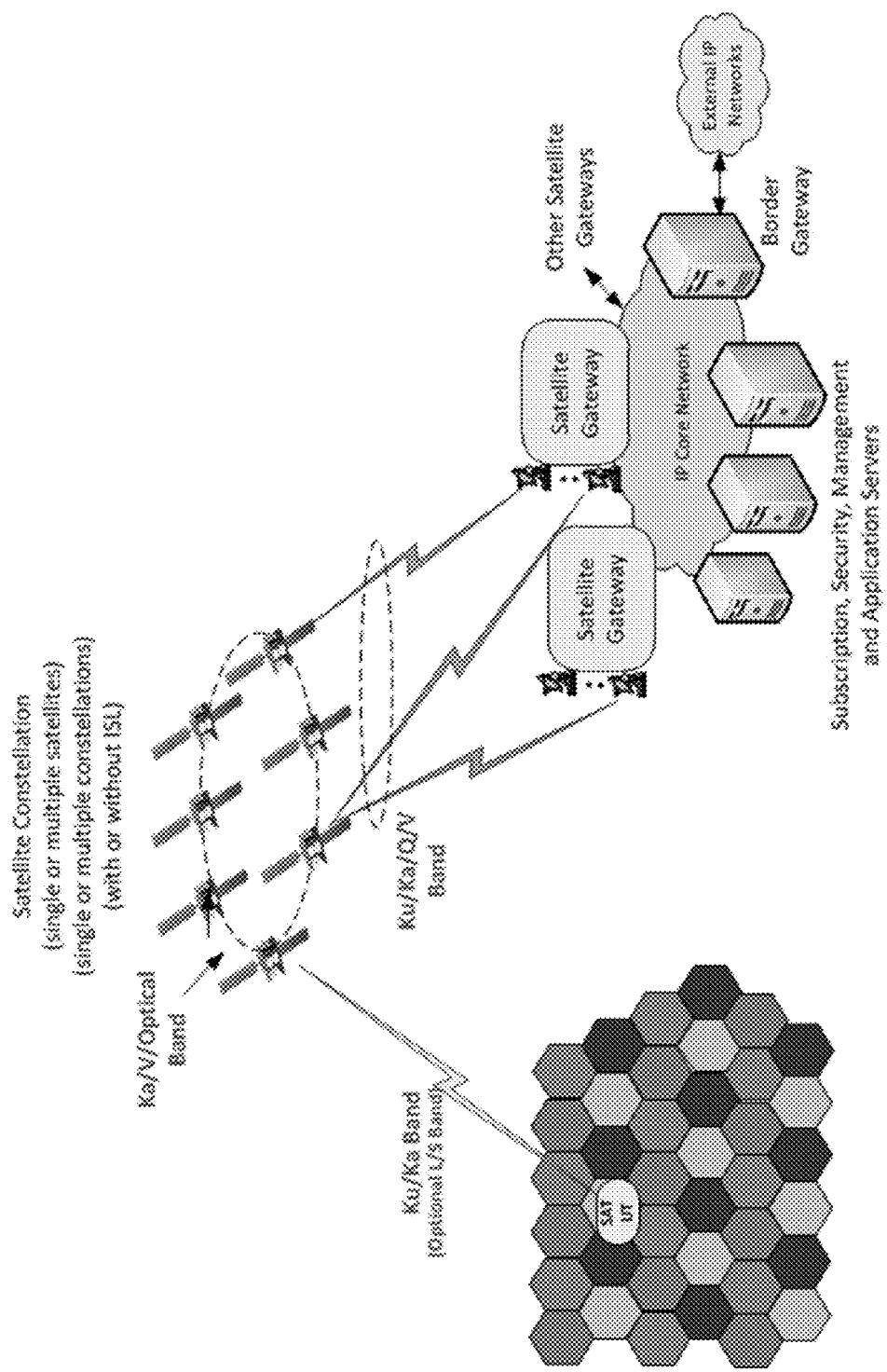
FIG. 1A and FIG. 1B illustrate high-level architectures for high speed/high quality packet data service GEO/MEO/LEO satellite systems, according to example embodiments.

System architectures and associated processes for providing high speed and high quality packet data services via a GEO/MEO/LEO satellite system are described. In the following description, for the purposes of explanation, numerous specific details are set forth in order to provide a thorough understanding of the invention. It is apparent, however, that the invention may be practiced without these specific details or with an equivalent arrangement. In other instances, well-known structures and devices are shown in block diagram form in order to avoid unnecessarily obscuring the invention.

As will be appreciated, a module or component (as referred to herein) may be composed of software component(s), which are stored in a memory or other computer-readable storage medium, and executed by one or more processors or CPUs of the respective devices. As will also be appreciated, however, a module may alternatively be composed of hardware component(s) or firmware component(s), or a combination of hardware, firmware and/or software components. Further, with respect to the various example embodiments described herein, while certain of the functions are described as being performed by certain components or modules (or combinations thereof), such descriptions are provided as examples and are thus not intended to be limiting. Accordingly, any such functions may be envisioned as being performed by other components or modules (or combinations thereof), without departing from the spirit and general scope of the present invention. Moreover, the methods, processes and approaches described herein may be processor-implemented using processing circuitry that may comprise one or more microprocessors, application specific integrated circuits (ASICs), field programmable gate arrays (FPGAs), or other devices operable to be configured or programmed to implement the systems and/or methods described herein. For implementation on such devices that are operable to execute software instructions, the flow diagrams and methods described herein may be implemented in processor instructions stored in a computer-readable medium, such as executable software stored in a computer memory store.

Further, terminology referring to computer-readable media or computer media or the like as used herein refers to any medium that participates in providing instructions to the processor of a computer or processor module or component for execution. Such a medium may take many forms, including but not limited to non-transitory non-volatile media and volatile media. Non-volatile media include, for example, optical disk media, magnetic disk media or electrical disk media (e.g., solid state disk or SDD). Volatile media include dynamic memory, such random access memory or RAM. Common forms of computer-readable media include, for example, floppy or flexible disk, hard disk, magnetic tape, any other magnetic medium, CD ROM, CDRW, DVD, any other optical medium, random access memory (RAM), programmable read only memory (PROM), erasable PROM, flash EPROM, any other memory chip or cartridge, or any other medium from which a computer can read data.

Various forms of computer-readable media may be involved in providing instructions to a processor for execution. For example, the instructions for carrying out at least part of the present invention may initially be borne on a magnetic disk of a remote computer. In such a scenario, the remote computer loads the instructions into main memory and sends the instructions over a telephone line using a modem. A modem of a local computer system receives the data on the telephone line and uses an infrared transmitter to convert the data to an infrared signal and transmit the infrared signal to a portable computing device, such as a personal digital assistance (PDA) and a laptop. An infrared detector on the portable computing device receives the information and instructions borne by the infrared signal and places the data on a bus. The bus conveys the data to main memory, from which a processor retrieves and executes the instructions. The instructions received by main memory may optionally be stored on storage device either before or after execution by processor.

Architecture.

Figure 1B:
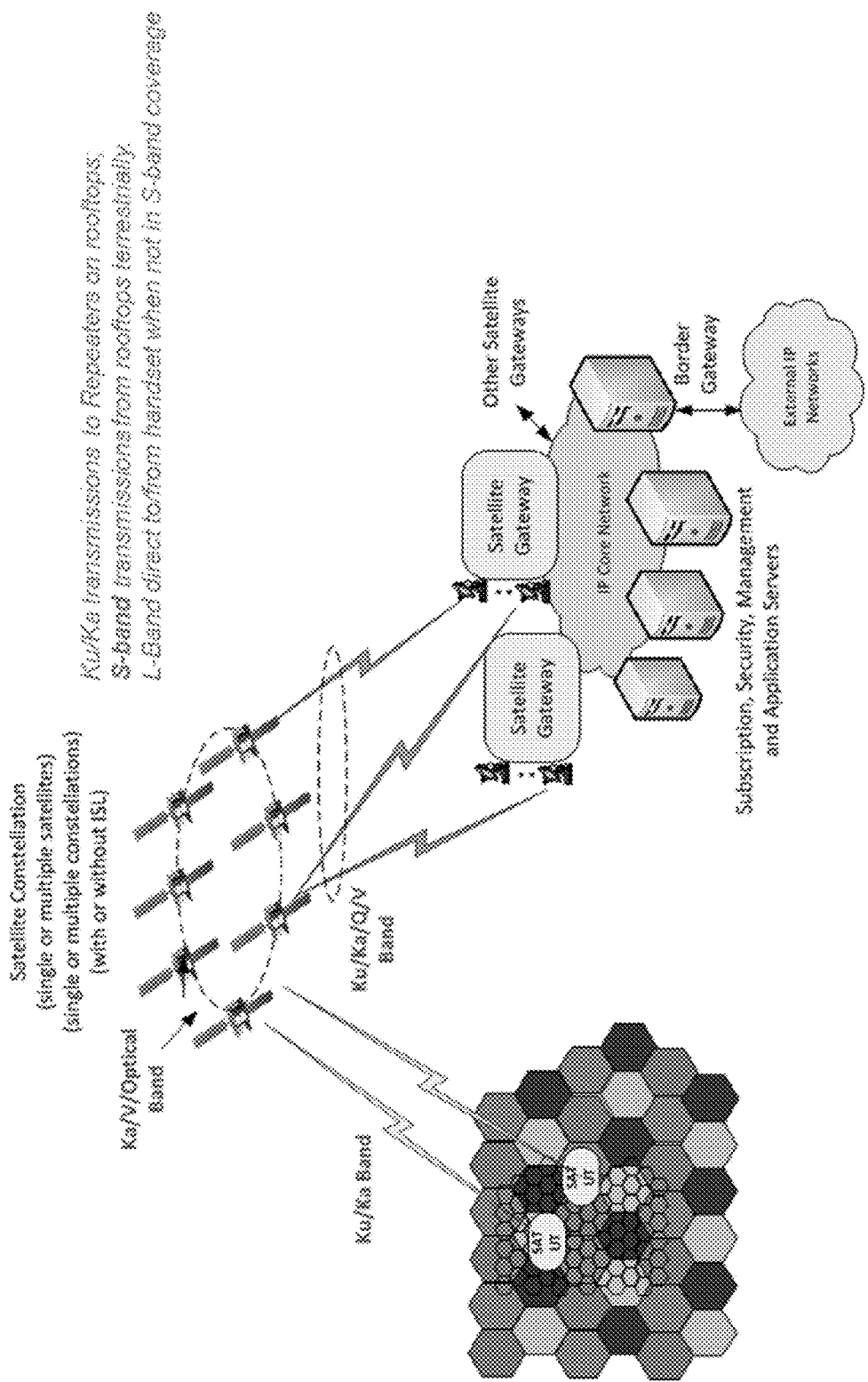
Figure 1C:
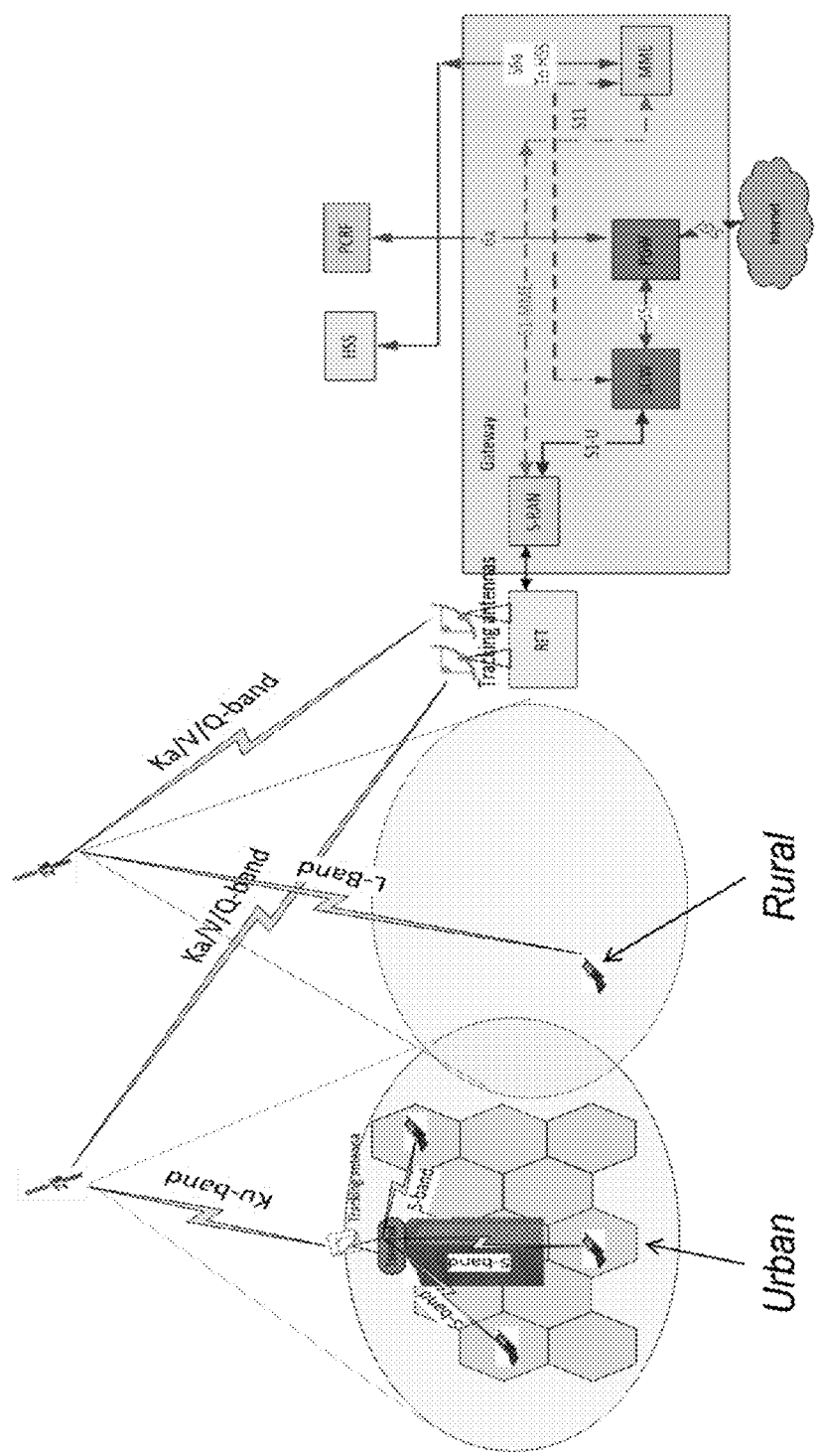
FIG. 1C illustrates a high-level architecture for the network configuration of such a high speed/high quality packet data service GEO/MEO/LEO satellite systems, according to example embodiments.
Figure 1D:
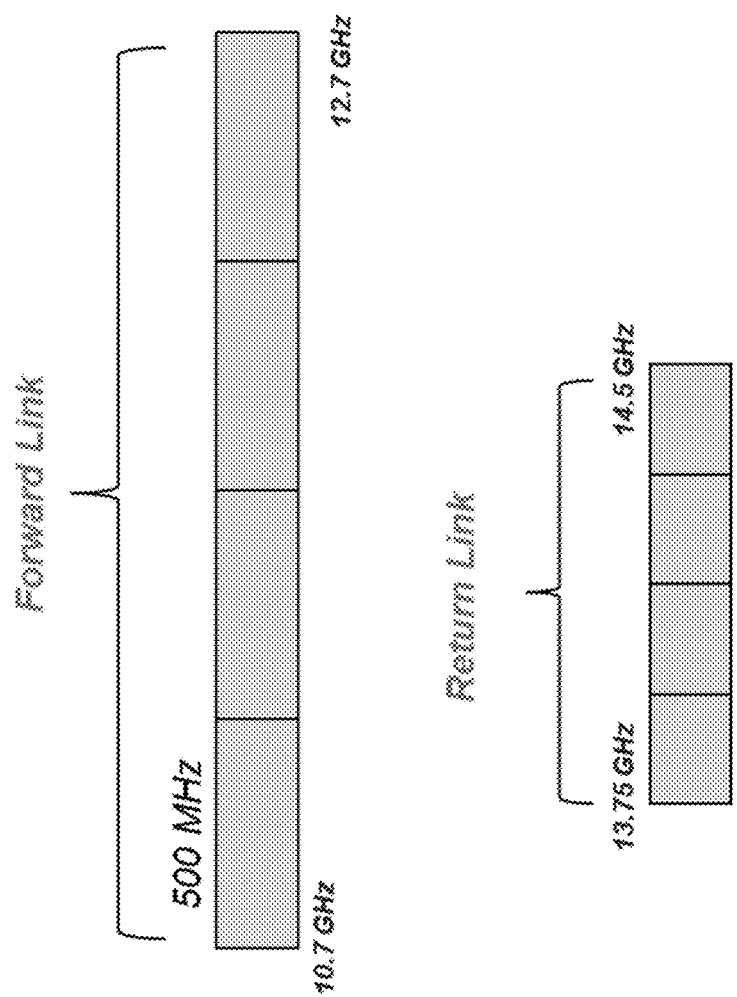
FIG. 1D illustrates an example Ku band user or user terminal (UT) link, according to example embodiments.

FIG. 1A and FIG. 1B illustrate high-level architectures for high speed/high quality packet data service GEO/MEO/LEO satellite systems, and FIG. 1C illustrates a high-level architecture for the network configuration of such a high speed/high quality packet data service GEO/MEO/LEO satellite systems, according to example embodiments. FIG. 1D illustrates an example Ku band user or user terminal (UT) link, according to example embodiments. As illustrated by the drawings of FIG. 1, by way of example, the terminal/user-links may comprise one or more of Ku band and Ka band links (and may alternatively or additionally comprise one or more of L band and S band links), and the Gateway links may comprise one or more of Ku band, Ka Band, Q band and V band links. Other frequencies that are mutually exclusive may also be used in Gateway link and user links. As further shown in FIG. 1, Satellite Gateways are connected via terrestrial links or via the existing satellite constellation links (e.g., via LEO/MEO satellite links or via a GEO satellite system). The IP Core network resembles that of a classical 4G-LTE network with the Border Gateway playing the role of the packet data network (PDN) Gateway (PGW) of LTE core network. Other elements that have a correspondence to 4G LTE core network include Subscription server (equivalent to the Home Subscription Server—HSS), Management Server (equivalent of MME) and Security Server (equivalent to AuC). Although the Serving Gateway (SGW) is not explicitly shown, it is expected to be part of the Satellite Gateway and/or PGW.

Figure 2A:
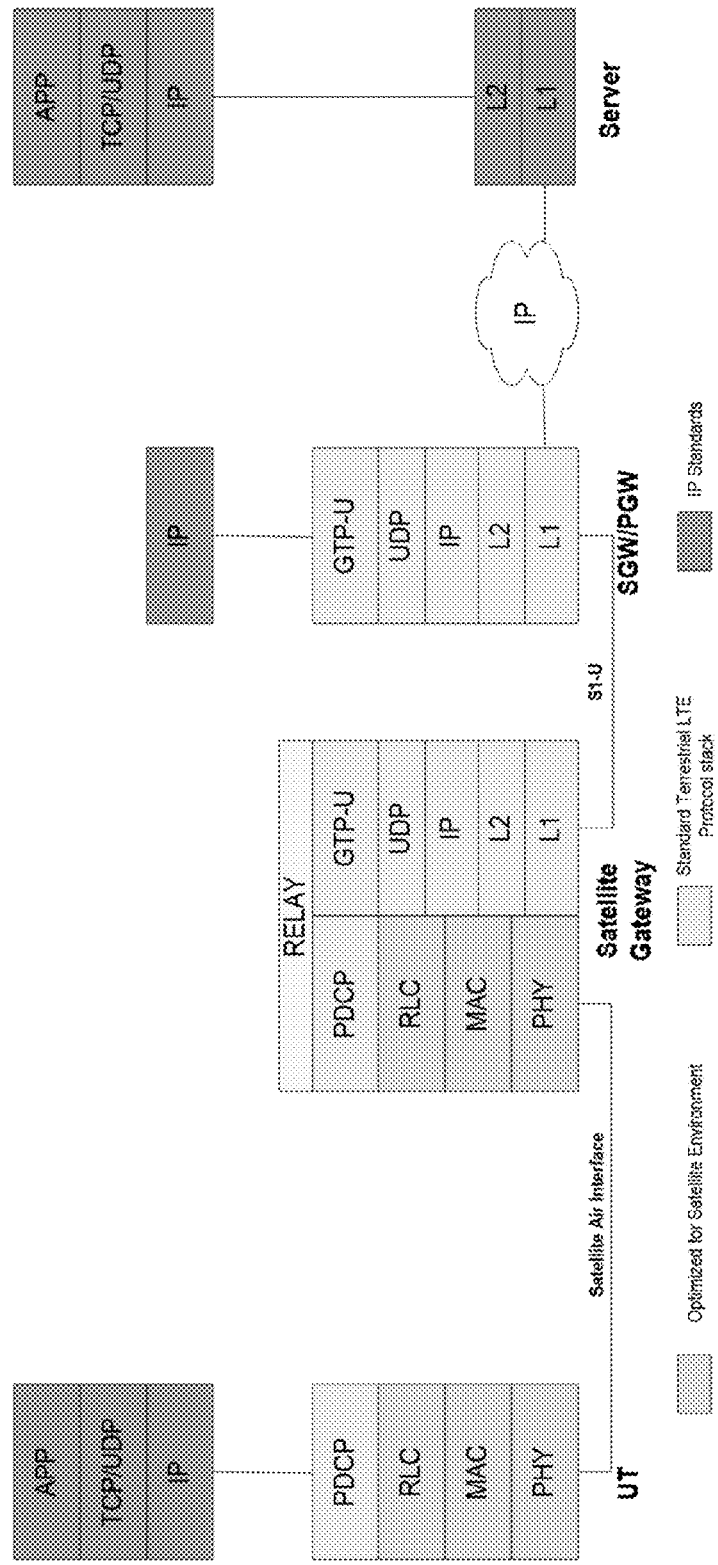
FIG. 2A illustrates the user plane protocol architecture for satellite systems, according to example embodiments.
Figure 2B:
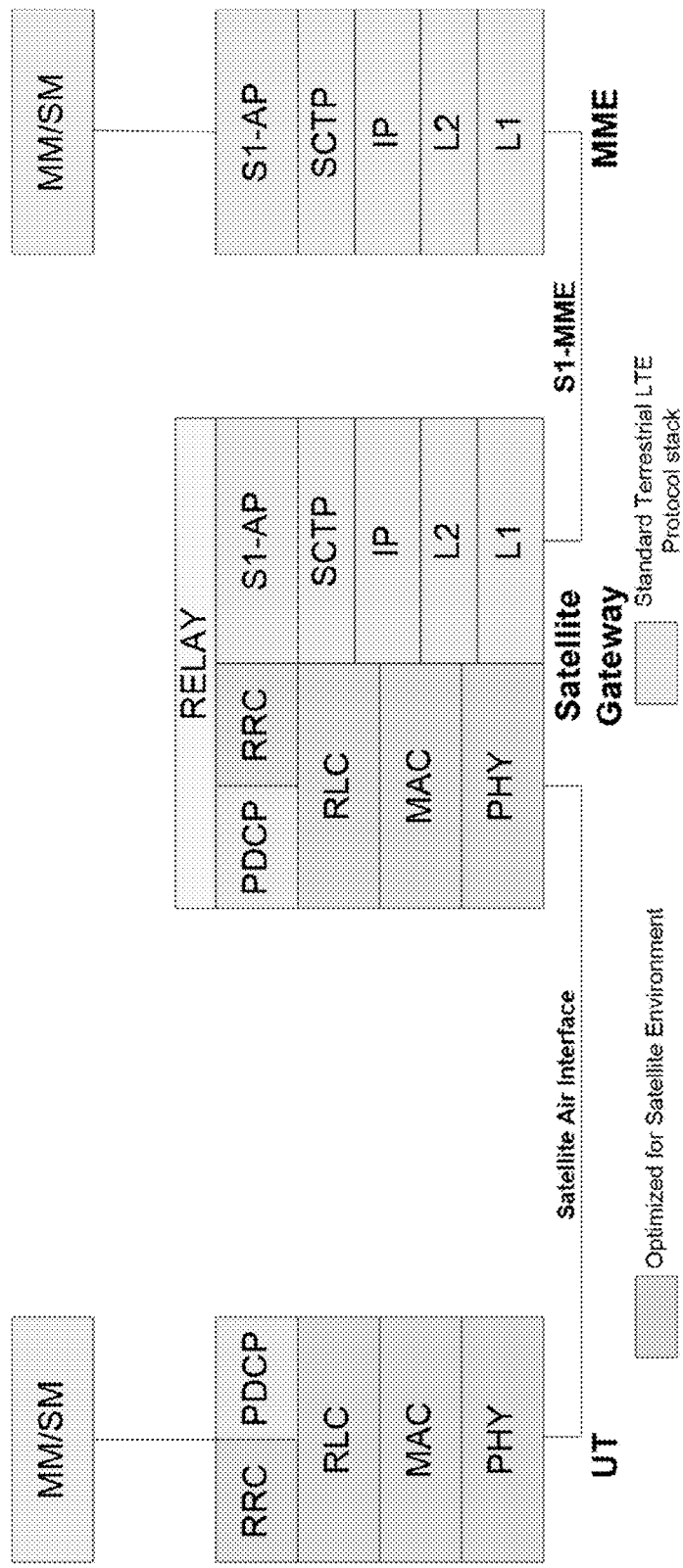
FIG. 2B illustrates the control plane protocol architecture for satellite systems, according to example embodiments.

FIG. 2A illustrates the user plane protocol architecture for satellite systems, according to example embodiments, and FIG. 2B illustrates the control plane protocol architecture for satellite systems, according to example embodiments.

Bearer Attributes.

According to example embodiments, a wide range of bearers may be employed depending on resource availability, demand and terminal capability. By way of example, symbol rates may range from 11.7 killa-symbols-per-second (ksps) to 17.4 Mega-symbols-per-second (Msps), bandwidths may range from 13.5 kHz to 20 MHz, modulation schemes comprise $\pi/2$ BPSK, $\pi/4$ QPSK, 16-APSK, 32-APSK, 64-QAM, coding schemes may comprise LDPC and convolutional codes, code rates may comprise 1/2, 4/7, 5/8, 2/3, 3/4, 4/5, 5/6, 9/10, spectral efficiency with single polarization up to 4.2 bits/s/Hz, and effective spectral efficiency with two polarizations up to 8.4 bits/s/Hz. Such bearers are designed to support a variety of terminal types, data rates, traffic types and efficient resource utilization. Similar to terrestrial systems, the spectral efficiency requires higher satellite power to close links at higher symbol rates.

Modulations.

Figure 3A:
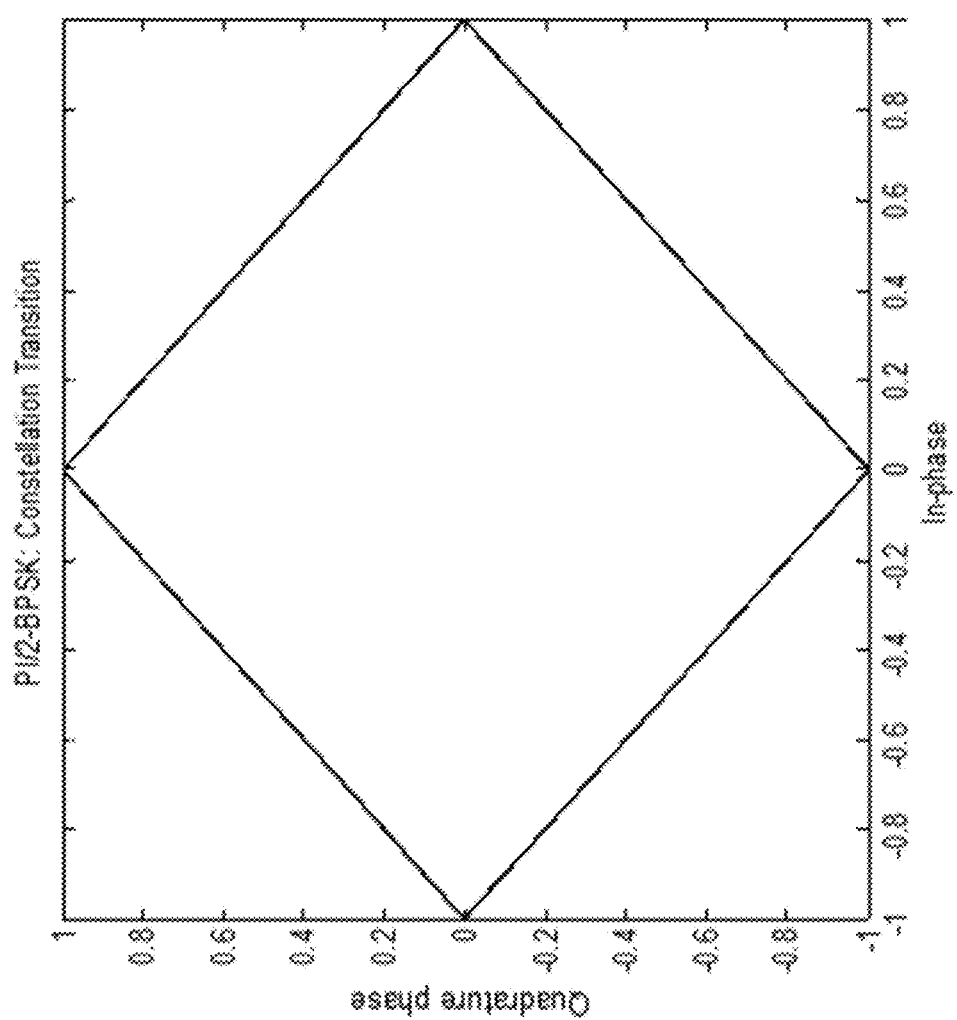
FIG. 3A illustrates a diagram depicting an example constellation transition for a π/2 BPSK modulation, according to example embodiments.
Figure 3B:
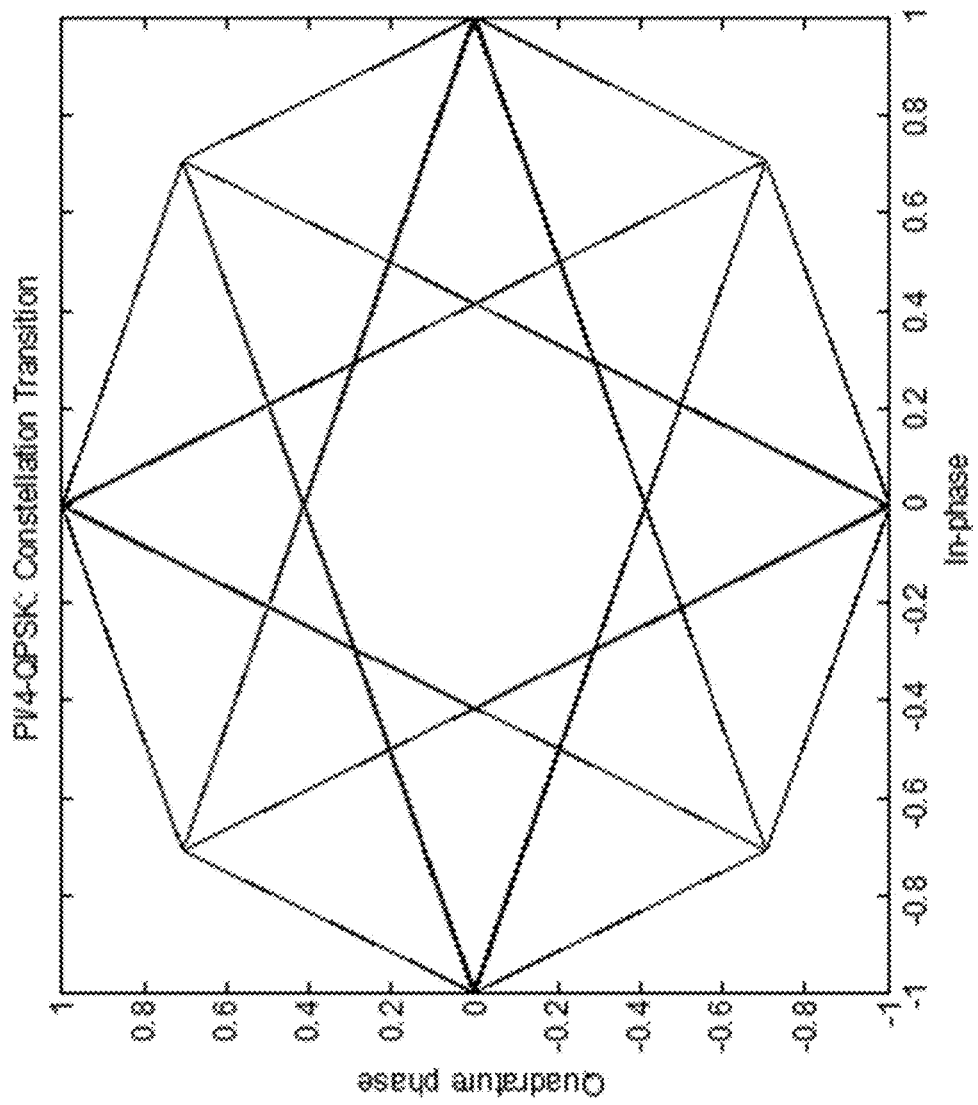
FIG. 3B illustrates a diagram depicting an example constellation transition for a π/4 QPSK modulation, according to example embodiments.
Figure 3C:
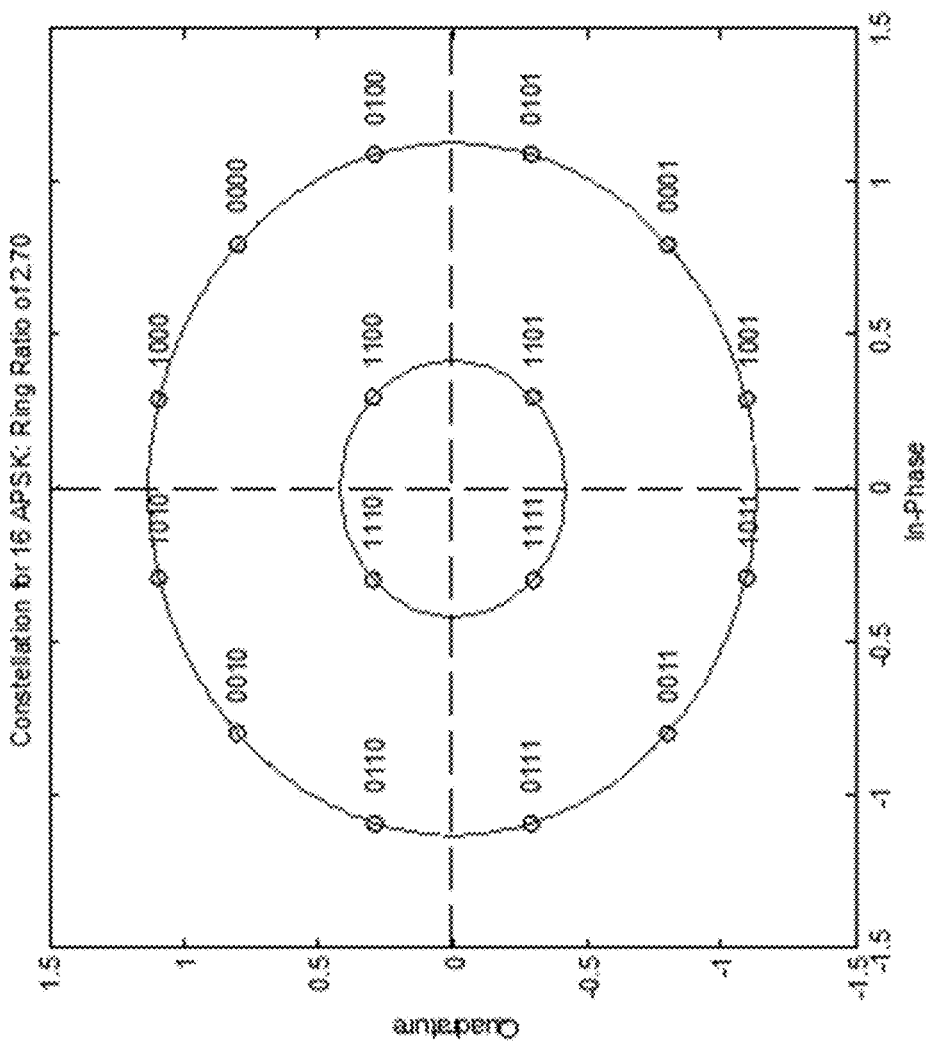
FIG. 3C illustrates a diagram depicting an example constellation for a 16 APSK modulation, according to example embodiments

According to example embodiments, power and spectrally efficient modulations are employed, such as $\pi/2$ BPSK, $\pi/4$ QPSK, 8 PSK, 16-APSK, 32-APSK, 64-QAM. FIG. 3A illustrates a diagram depicting an example constellation transition for a $\pi/2$ BPSK modulation, according to example embodiments. FIG. 3B illustrates a diagram depicting an example constellation transition for a $\pi/4$ QPSK modulation, according to example embodiments. FIG. 3C illustrates a diagram depicting an example constellation for a 16 APSK modulation, according to example embodiments. Further, the following table shows peak-two-average power ratios (PAPR) for the modulation schemes:

| BPSK | $\pi/2$ BPSK | QPSK | $\pi/4$ QPSK | 16 QAM | 16 APSK | 32-APSK |
|---|---|---|---|---|---|---|
| 3.85 | 1.84 | 3.86 | 3.17 | 6.17 | 4.72 | 5.91 |

Link Analyses.

According to example embodiments, for the link analyses, the user terminal (UT) antenna gain it is assumed to be approximately 3 dBi (e.g., for a stub antenna). Further, the UT antenna power is assumed to be approximately 28 dBm, the antenna loss is assumed to be approximately 1 dB, and total spectrum is assumed to be approximately 34 MHz in L band. Alternatively, improved spectral efficiency may be achieved using left-hand circular polarized (LHCP) and right-hand circular polarized (RHCP) antennas. Further, the return bearers for voice over IP (VoIP) are assumed to be at a symbol rate of 11.7 ksps, using π/4 QPSK and 8 PSK for 2.4 and 9.6 kbps vocoder rates. Moreover, narrowband AMR vocoder rates span from 4.75 kbps to 12.2 kbps, and newer generation vocoders (such as AMBE+2) may be employed to provide equivalent or better quality between 2.4 and 9.6 kbps. Additionally, AMR-WB used in HD voice goes up to 23.3 kbps, and although the link analyses shown in the below tables are not performed for 23.3 kbps, the analyses suggest that it would be possible to go to about 12.6 kbps wideband with little or no margin in return link. Lastly, the satellite antenna gain to noise temperature (G/T) is assumed to be approximately 20 dB/K, and the satellite carrier to noise or interference ratio (C/I) is assumed as variable from 12 dB to 19 dB.

The following table illustrates the link analysis for the return link-voice:

| Vocoder Data Rate | kbps | 2.4 | 9.6 |
|---|---|---|---|
| UT EIRP- 28 dBm PA, 3 dBi, antenna, 1 dB loss | dBW | 0 | 0 |
| Uplink Frequency | GHz | 1.64 | 1.64 |
| Satellite Altitude | km | 35786 | 35786 |
| User Terminal Elevation | deg | 30 | 30 |
| Slant Range | km | 38611.6 | 38611.6 |
| Received Power at SAT antenna input | dBW | −203.4 | −196.0 |
| Free Space loss | dB | 188.5 | 188.5 |
| Fade Margin | dB | 14.40 | 7.00 |
| Polarization and Pointing Loss | dB | 0.5 | 0.5 |
| Satellite G/T | dB/K | 20.00 | 20.00 |
| Symbol Rate | ks/s | 11.7 | 11.7 |
| uplink C/No | dB-Hz | 45.2 | 52.6 |
| Feederlink C/No (assumed) | dB-Hz | 60.6 | 60.6 |
| Overall C/No | dB-Hz | 45.1 | 52.0 |
| Received C/N | dB | 4.42 | 11.30 |
| C/I | dB | 12 | 12 |
| Received C/(N + I) | dB | 3.72 | 8.62 |
| Modulation | | pi/4 QPSK | 8 PSK |
| FEC Code Rate (approx.) | | 3/5 | 2/3 |
| Required C/N | dB | 3.6 | 8.5 |
| Excess Link Margin | dB | 0.12 | 0.12 |
| Carrier Bandwidth | kHz | 13.455 | 13.455 |
| calls per carrier | | 4 | 2 |
| Voice calls per MHz | | 296 | 148 |

The following table illustrates the link analysis for the forward link-voice-narrowband channelization:

| Vocoder Data Rate | kbps | 2.4 | 9.6 |
|---|---|---|---|
| Required Satellite EIRP per carrier | dBW | 36.6 | 43.4 |
| Downlink Frequency | GHz | 1.56 | 1.56 |
| Satellite Altitude | km | 35786 | 35786 |
| User Terminal Elevation | deg | 30 | 30 |
| Slant Range | km | 38611.6 | 38611.6 |
| Received Power at UT antenna input | dBW | −156.9 | −150.1 |
| Free Space loss | dB | 188.0 | 188.0 |
| Avg. Link Margin | dB | 5.00 | 5.00 |
| Polarization and Pointing Loss | dB | 0.5 | 0.5 |
| UT Antenna Gain (customer input) | dBi | 3.0 | 3.0 |
| Antenna Losses (assumed) | dB | 1.0 | 1.0 |
| Effective User Terminal G/T@290K | dB/K | −23.62 | −23.62 |
| Downlink C/No | dB-Hz | 48.0 | 54.8 |
| Symbol Rate | ks/s | 23.4 | 23.4 |
| Received C/N | dB | 4.34 | 11.14 |
| C/I | dB | 12.0 | 12.0 |
| Received C/(N + I) | dB | 3.66 | 8.54 |
| Modulation | | pi/4 QPSK | 8-PSK |
| FEC Code Rate (approx.) | | 3/5 | 2/3 |
| Required C/N | dB | 3.6 | 8.5 |
| Excess Link Margin | dB | 0.06 | 0.04 |
| Carrier Bandwidth | kHz | 26.91 | 26.91 |
| calls per carrier | | 8 | 4 |
| Voice calls per MHz | | 296 | 148 |
| Spectral Efficiency | bit/s/Hz | 0.71 | 1.42 |

Link Analyses—MEO Satellite Constellation.

According to example embodiments, for the link analyses with a MEO satellite constellation, the UT antenna gain it is assumed to be approximately 3 dBi (e.g., for a stub antenna). Further, the UT antenna power is assumed to be approximately 28 dBm, the antenna loss is assumed to be approximately 1 dB, and total spectrum is assumed to be approximately 34 MHz in L band. Alternatively, improved spectral efficiency may be achieved using LHCP and RHCP antennas. Further, the return bearers for VoIP are assumed to be at a symbol rate of 11.7 ksps, using π/4 QPSK, 8 PSK and 32 APSK for 2.4, 7.4 and 9.6 kbps vocoder rates. Moreover, narrowband AMR vocoder rates span from 4.75 kbps to 12.2 kbps, and newer generation vocoders (such as AMBE+2) may be employed to provide equivalent or better quality between 2.4 and 9.6 kbps. Additionally, AMR-WB used in HD voice goes up to 23.3 kbps, and although the link analyses shown in the below tables are not performed for 23.3 kbps, the analyses suggest that it would be possible to go to about 12.6 kbps wideband with little or no margin in return link. Further, the satellite G/T is assumed to be approximately 14 dB/K and 20 dB/K, and the satellite C/I is assumed as variable from 12 dB to 21 dB. The orbit height is assumed at approximately 10,000 km, with two orthogonal orbits, 45 degree inclination angle, five satellites per orbit.

The following table illustrates the link analysis for the return link-voice-MEO satellite with G/T=20 dB/K:

| Vocoder Data Rate | kbps | 2.4 | 9.6 |
|---|---|---|---|
| UT EIRP- 28 dBm PA, 3 dBi, antenna, 1 dB loss | dBW | 0 | 0 |
| Uplink Frequency | GHz | 1.64 | 1.64 |
| Satellite Altitude | km | 10000 | 10000 |
| User Terminal Elevation | deg | 30 | 30 |
| Slant Range | km | 12229.5 | 12229.5 |
| Received Power at SAT antenna input | dBW | −196.0 | −186.3 |
| Free Space loss | dB | 178.5 | 178.5 |
| Fade Margin | dB | 17.00 | 7.30 |
| Polarization and Pointing Loss | dB | 0.5 | 0.5 |
| Satellite G/T | dB/K | 20.00 | 20.00 |
| Symbol Rate | ks/s | 11.7 | 11.7 |
| uplink C/No | dB-Hz | 52.6 | 62.3 |
| Feederlink C/No (assumed) | dB-Hz | 60.6 | 60.6 |
| Overall C/No | dB-Hz | 52.0 | 58.4 |
| Received C/N | dB | 11.29 | 17.68 |
| C/I | dB | 12 | 21 |
| Received C/(N + I) | dB | 8.62 | 16.02 |
| Modulation | | 8 PSK | 32-APSK |
| FEC Code Rate (approx.) | | 2/3 | 4/5 |
| Required C/N | dB | 8.5 | 16 |
| Excess Link Margin | dB | 0.12 | 0.02 |
| Carrier Bandwidth | kHz | 13.46 | 13.46 |
| calls per carrier | | 8.00 | 4.00 |
| Voice calls per MHz | | 592 | 296 |

The following table illustrates the link analysis for the return link-voice-MEO satellite with G/T=14 dB/K (half the size of the antenna on a geosynchronous Earth orbit (GEO) satellite):

| | | | |
|---|---|---|---|
| Vocoder Data Rate | kbps | 2.4 | 7.2 |
| UT EIRP- 28 dBm PA, 3 dBi, antenna, 1 dB loss | dBW | 0 | 0 |
| Uplink Frequency | GHz | 1.64 | 1.64 |
| Satellite Altitude | km | 10000 | 10000 |
| User Terminal Elevation | deg | 30 | 30 |
| Slant Range | km | 12229.5 | 12229.5 |
| Received Power at SAT antenna input | dBW | −190.0 | −186.3 |
| Free Space loss | dB | 178.5 | 178.5 |
| Fade Margin | dB | 11.00 | 7.30 |
| Polarization and Pointing Loss | dB | 0.5 | 0.5 |
| Satellite G/T | dB/K | 14.00 | 14.00 |
| Symbol Rate | ks/s | 11.7 | 11.7 |
| uplink C/No | dB-Hz | 52.6 | 56.3 |
| Feederlink C/No (assumed) | dB-Hz | 60.6 | 60.6 |
| Overall C/No | dB-Hz | 52.0 | 54.9 |
| Received C/N | dB | 11.29 | 14.25 |
| C/I | dB | 12 | 21 |
| Received C/(N + I) | dB | 8.62 | 13.42 |
| Modulation | | 8-PSK | 16 APSK |
| FEC Code Rate (approx.) | | 2/3 | 3/4 |
| Required C/N | dB | 8.5 | 13.4 |
| Excess Link Margin | dB | 0.12 | 0.02 |
| Carrier Bandwidth | kHz | 13.46 | 13.46 |
| calls per carrier | | 8.00 | 4.00 |
| Voice calls per MHz | | 592 | 296 |

According to example embodiments, for the gateway links, assuming 3 GHz of Ka spectrum availability on each polarization, this would cover the equivalent of six user beams. By way of example, the system may deploy 10 gateways to cover a 60 beam operation, with 10 tracking antennas on the satellite for the feeder link. By way of further example, the Gateway locations can be determined for best availability. According to further example embodiments, the number of gateways can be reduced by employing processing satellites and/or employing additional spectrum (e.g., V/Q bands) and interference cancellation.

According to further example embodiments, with regard to the links between the satellite terminal and the handset (e.g., the UT to the user mobile handset), the satellite terminal may distribute data locally to urban cells as per demand using S-band. As many satellite terminals may be used as the number of cells that are needed in urban/semi-urban/rural environments. Waveforms and protocols may be based on 4G/5G to take advantage of recent developments in terrestrial equipment and systems. Further, the handset may be S-band and L-band capable, where it may use S-band when S-band signals are available (e.g., when the hand-held can communicate with the satellite terminal), and otherwise may use L-band directly with the satellite (e.g., in rural environments satellite terminals may not yet be deployed in the vicinity). Use of L-band (instead of S-band) is also to avoid interference from S-band handsets. In this context, the satellite would be capable of both Ku band and L band communications.

The following table illustrates the link analysis for the forward link-voice-narrowband channelization-MEO satellite constellation:

| | | | |
|---|---|---|---|
| Data Rate | kbps | 2.4 | 9.6 |
| Required Satellite EIRP per carrier | dBW | 33.4 | 41.3 |
| Downlink Frequency | GHz | 1.56 | 1.56 |
| Satellite Altitude | km | 10000 | 10000 |
| User Terminal Elevation | deg | 30 | 30 |
| Slant Range | km | 12229.5 | 12229.5 |
| Received Power at UT antenna input | dBW | −150.2 | −142.3 |
| Free Space loss | dB | 178.1 | 178.1 |
| Avg. Link Margin | dB | 5.00 | 5.00 |
| Polarization and Pointing Loss | dB | 0.5 | 0.5 |
| UT Antenna Gain (customer input) | dBi | 3.0 | 3.0 |
| Antenna Losses (assumed) | dB | 1.0 | 1.0 |
| Effective User Terminal G/T@290K | dB/K | −23.62 | −23.62 |
| Downlink C/No | dB-Hz | 54.8 | 62.7 |
| Symbol Rate | ks/s | 23.4 | 23.4 |
| Received C/N | dB | 11.13 | 19.03 |
| C/I | dB | 12.0 | 19.0 |
| Received C/(N + I) | dB | 8.53 | 16.00 |
| Modulation | | 8-PSK | 32-APSK |
| FEC Code Rate (approx.) | | 2/3 | 4/5 |
| Required C/N | dB | 8.5 | 16 |
| Excess Link Margin | dB | 0.03 | 0.00 |
| Carrier Bandwidth | kHz | 26.91 | 26.91 |
| calls per carrier | | 16 | 8 |
| Voice calls per MHz | | 592 | 296 |
| Spectral Efficiency | bit/s/Hz | 1.42 | 2.84 |

The following table illustrates the link analysis for a LEO satellite constellation:

| | | LEO |
|---|---|---|
| Data Rate per carrier per pol | Gbps | 1.3832 |
| Required Satellite EIRP per carrier | dBW | 35.4 |
| Downlink Frequency | GHz | 12 |
| Satellite Altitude | km | 900 |
| User Terminal Elevation | deg | 70 |
| Slant Range | km | 950.0 |
| Received Power at UT antenna input | dBW | −140.7 |
| Free Space loss | dB | 173.6 |
| Avg. Link Margin | dB | 2.00 |
| Polarization and Pointing Loss | dB | 0.5 |
| UT Antenna Gain (customer input) | dBi | |
| Antenna Losses (assumed) | dB | |
| Effective User Terminal G/T@100K; 1 m array | dB/K | 15 |
| Downlink C/No | dB-Hz | 102.9 |
| Symbol Rate | ks/s | 455000 |
| Received C/N | dB | 16.33 |
| C/I | dB | 14.0 |
| Received C/(N + I) | dB | 12.00 |
| Modulation | | 16-APSK |
| FEC Code Rate (approx.) | | 3/4 |
| Required C/N | dB | 12 |
| Excess Link Margin | dB | 0.00 |
| Carrier Bandwidth | kHz | 500000 |
| Spectral Efficiency per pol | bit/s/Hz | 0.00 |
| Number of carriers per satellite | | 120 |
| Throupghput per satellite | Gbps | 165.984 |

Voice Capacity.

According to example embodiments, the provided satellite system architectures and designs support upwards of 296 voice calls per MHz of L-band bandwidth (assuming 2.4 kbps voice), and upwards of 148 calls at 9.6 kbps with lower link margin. Further, in view the fact that an AMR type vocoder is employed (narrowband or wideband), the higher vocoder rate will be supported when channel conditions are good (therefore requires less margin). Further, a cluster of satellite beams using 34 MHz of bandwidth, therefore, allows about 10,000 simultaneous voice calls at 2.4 kbps. The total system capacity will depend on the number of times the 34 MHz can be reused, where, in the forward link, it will also be limited by the total satellite power (e.g., each voice call requires approximately 27.6 dBW of satellite EIRP for a terminal with 3 dBi antenna and 28 dBm PA output). For example, when the 34 MHz is used 20 times (for reuse factor of 9, this implies 180 beams) in the coverage area, the simultaneous voice capacity is approximately 200, 000 calls. In terms of satellite power this would require approximately 80 dBW of satellite EIRP.

Spectral Efficiency.

The following table illustrates a comparison of spectral efficiency between π/4 QPSK at rate 3/5 and 32-APSK at rate 4/5:

|  |  | 2.4 k/s vocoder | 2.4 k/s vocoder |
|---|---|---|---|
| Data Rate | kbps | 2.4 | 84.24 |
| Required Satellite EIRP per carrier | dBW | 36.6 | 51.3 |
| Downlink Frequency | GHz | 1.56 | 1.56 |
| Satellite Altitude | km | 35786 | 35786 |
| User Terminal Elevation | deg | 30 | 30 |
| Slant Range | km | 38611.6 | 38611.6 |
| Received Power at UT antenna input | dBW | −156.9 | −142.2 |
| Free Space loss | dB | 188.0 | 188.0 |
| Avg. Link Margin | dB | 5.00 | 5.00 |
| Polarization and Pointing Loss | dB | 0.5 | 0.5 |
| UT Antenna Gain (customer input) | dBi | 3.0 | 3.0 |
| Antenna Losses (assumed) | dB | 1.0 | 1.0 |
| Effective User Terminal G/T@290K | dB/K | −23.62 | −23.62 |
| Downlink C/No | dB-Hz | 48.0 | 62.7 |
| Symbol Rate | ks/s | 23.4 | 23.4 |
| Receive C/N | dB | 4.34 | 19.04 |
| C/I | dB | 12.0 | 19.0 |
| Received C/(N + I) | dB | 3.66 | 16.01 |
| Modulation |  | pi/4 QPSK | 32-APSK |
| FEC Code Rate (approx.) |  | 3/5 | 4/5 |
| Required C/N | dB | 3.6 | 16 |
| Excess Link Margin | dB | 0.06 | 0.01 |
| Carrier Bandwidth | kHz | 26.91 | 26.91 |
| calls per carrier |  | 8 | 35.1 |
| Voice calls per MHz |  | 296 | 1299 |
| Spectral Efficiency | bit/s/Hz | 0.71 | 3.13 |

According to example embodiments, waveforms with higher spectral efficiency (e.g., 32-APSK with Rate 4/5 or even higher in the forward link) may be employed. Such a scheme can deliver spectral efficiency of 3.13 bits/s/Hz. Further, using both polarizations (left hand and right hand) in the forward link, the effective spectral efficiency can be increased to 6.26 bits/s/Hz. Higher code rates such as Rate 9/10 and higher order modulation such as 64-QAM can further improve spectral efficiency. As seen from the analyses of the foregoing table, this comes with an increase in satellite power—for example, about 15 dB increase in power needed for about 6 dB increase in spectral efficiency. Furthermore, the increase Es/No requirement implies better management of interference.

According to example embodiments, forward link throughput is limited based on satellite power. For example, where the satellite can deliver a maximum of 80 dBW of EIRP per polarization, a total capacity of about 150 Mbps per polarization can be obtained with a spectral efficiency of 3.13 b/s/Hz/pol, whereas with a spectral efficiency of 1.03 b/s/Hz/pol, a total capacity of about 1 Gbps per polarization can be obtained—which reflects a system capacity versus per channel capacity trade-off—as illustrated in the following Table:

| Data Rate | kbps | 15649.2 | 5164.236 |
|---|---|---|---|
| Required Satellite EIRP per carrier | dBW | 70.2 | 57 |
| Downlink Frequency | GHz | 1.56 | 1.56 |
| Satellite Altitude | km | 35786 | 35786 |
| User Terminal Elevation | deg | 30 | 30 |
| Slant Range | km | 38611.6 | 38611.6 |
| Received Power at UT antenna input | dBW | −120.3 | −133.5 |
| Free Space loss | dB | 188.0 | 188.0 |
| Avg. Link Margin | dB | 2.00 | 2.00 |
| Polarization and Pointing Loss | dB | 0.5 | 0.5 |
| UT Antenna Gain (customer input) | dBi | 3.0 | 3.0 |
| Antenna Losses (assumed) | dB | 1.0 | 1.0 |
| Effective User Terminal G/T@290K | dB/K | −23.62 | −23.62 |
| Downlink C/No | dB-Hz | 84.6 | 71.4 |
| Symbol Rate | ks/s | 4347 | 4347 |
| Received C/N | dB | 18.25 | 5.05 |
| C/I | dB | 20.0 | 9.0 |
| Received C/(N + I) | dB | 16.03 | 3.58 |
| Modulation |  | 32-APSK | pi/4 QPSK |
| FEC Code Rate (approx.) |  | 4/5 | 2/3 |
| Required C/N | dB | 16 | 3.5 |
| Excess Link Margin | dB | 0.03 | 0.06 |
| Carrier Bandwidth | kHz | 5000 | 5000 |
| Spectral Efficiency per pol | bit/s/Hz | 3.13 | 1.03 |

High Speed Data Example.

According to example embodiments, using 5 MHz bandwidth per beam, more than 15 Mbps of throughput is achieved yielding a spectral efficiency of 3.13 bits/s/Hz per polarization, which, using two polarizations, would achieve a spectral efficiency of 6.26 bit/s/Hz. Further, the satellite EIRP would be about 70 dBW per carrier, the C/I requirement would be 19 dB or higher. According to further example embodiments, interference mitigation schemes could be employed to achieve such high C/I with small reuse factor. The following table illustrates such a high speed data example, in accordance with example embodiments:

| Data Rate | kbps | 15649.2 |
|---|---|---|
| Required Satellite EIRP per carrier | dBW | 70.2 |
| Downlink Frequency | GHz | 1.56 |
| Satellite Altitude | km | 35786 |
| User Terminal Elevation | deg | 30 |
| Slant Range | km | 38611.6 |
| Received Power at UT antenna input | dBW | −120.3 |
| Free Space loss | dB | 188.0 |
| Avg. Link Margin | dB | 2.00 |
| Polarization and Pointing Loss | dB | 0.5 |
| UT Antenna Gain (customer input) | dBi | 3.0 |
| Antenna Losses (assumed) | dB | 1.0 |
| Effective User Terminal G/T@290K | dB/K | −23.62 |
| Downlink C/No | dB-Hz | 84.6 |
| Symbol Rate | ks/s | 4347 |
| Received C/N | dB | 18.25 |
| C/I | dB | 20.0 |
| Received C/(N + I) | dB | 16.03 |
| Modulation |  | 32-APSK |
| FEC Code Rate (approx.) |  | 4/5 |
| Required C/N | dB | 16 |
| Excess Link Margin | dB | 0.03 |
| Carrier Bandwidth | kHz | 5000 |
| Spectral Efficiency per pol | bit/s/Hz | 3.13 |

According to example embodiments, with a MEO satellite constellation, using 5 MHz bandwidth per beam, more than 20 Mbps of throughput is achieved yielding a spectral efficiency of 4.17 bits/s/Hz per polarization, which, using two polarizations, would achieve a spectral efficiency of 8.34 bit/s/Hz. Further, the satellite EIRP would be about 67.5 dBW per carrier, the C/I requirement would be 23 dB or higher. According to further example embodiments, interference mitigation schemes could be employed to achieve such high C/I with small reuse factor. The following table illustrates such a high speed data example with a MEO constellation, in accordance with example embodiments:

| Data Rate | kbps | 20865.6 |
|---|---|---|
| Required Satellite EIRP per carrier | dBW | 67.5 |
| Downlink Frequency | GHz | 1.56 |
| Satellite Altitude | km | 10000 |

-continued

| | | |
|---|---|---|
| User Terminal Elevation | deg | 30 |
| Slant Range | km | 12229.5 |
| Received Power at UT antenna input | dBW | −113.1 |
| Free Space loss | dB | 178.1 |
| Avg. Link Margin | dB | 2.00 |
| Polarization and Pointing Loss | dB | 0.5 |
| UT Antenna Gain (customer input) | dBi | 3.0 |
| Antenna Losses (assumed) | dB | 1.0 |
| Effective User Terminal G/T@290K | dB/K | −23.62 |
| Downlink C/No | dB-Hz | 91.9 |
| Symbol Rate | ks/s | 4347 |
| Received C/N | dB | 25.54 |
| C/I | dB | 23.0 |
| Received C/(N + I) | dB | 21.08 |
| Modulation | | 64-APSK |
| FEC Code Rate (approx.) | | 4/5 |
| Required C/N | dB | 21 |
| Excess Link Margin | dB | 0.08 |
| Carrier Bandwidth | kHz | 5000 |
| Spectral Efficiency per pol | bit/s/Hz | 4.17 |

Terrestrial/Satellite Capacity Density.

According to example embodiments, the following table illustrates an example of the terrestrial/satellite capacity density (to get comparable capacity density, as terrestrial system in a typical satellite system with 80 km beam radius, each satellite beam requires to support about 77 Gbps throughput):

| Attribute | Value | Units |
|---|---|---|
| hexagonal area with cell radius of 2 km | 10.3923 | sq km |
| circular area with cell radius of 2 km | 12.56637 | sq km |
| circular area with beam radius of 80 km | 20106.19 | sq km |
| avg. capacity per 2 km cell (20 MHz) | 40 | Mbps |
| terrestrial capacity per sq km | 3.849002 | Mbps |
| eq. sat capacity needed per sat beam | 77388.77 | Mbps |

Satellite Carrier to Interference Ratio (C/I) and Satellite Spectrum Reuse.

According to example embodiments, the following table illustrates a typical example of reuse and C/I ratio (the required SNR of a bearer that can close links for a given reuse value has to be lower than the C/I specified in the table, and C/I mitigation techniques, such as adaptive beamforming and interference cancellation, can be employed to achieve improved spectral efficiency):

| Reuse | Typical Beam C/I (top 5%) | Typical Beam C/I (bottom 5%) | Typical Coverage C/I (bottom 5%) |
|---|---|---|---|
| 1 | −7.5 dB | −7.9 dB | −8.5 dB |
| 4 | 1.36 dB | 0.965 dB | −0.35 dB |
| 7 | 7.6 dB | 6.9 dB | 5.6 dB |
| 9 | 11.02 dB | 10.6 dB | 7.9 dB |
| 12 | 20.42 dB | 18.42 dB | 14.05 dB |

Figure 4A:
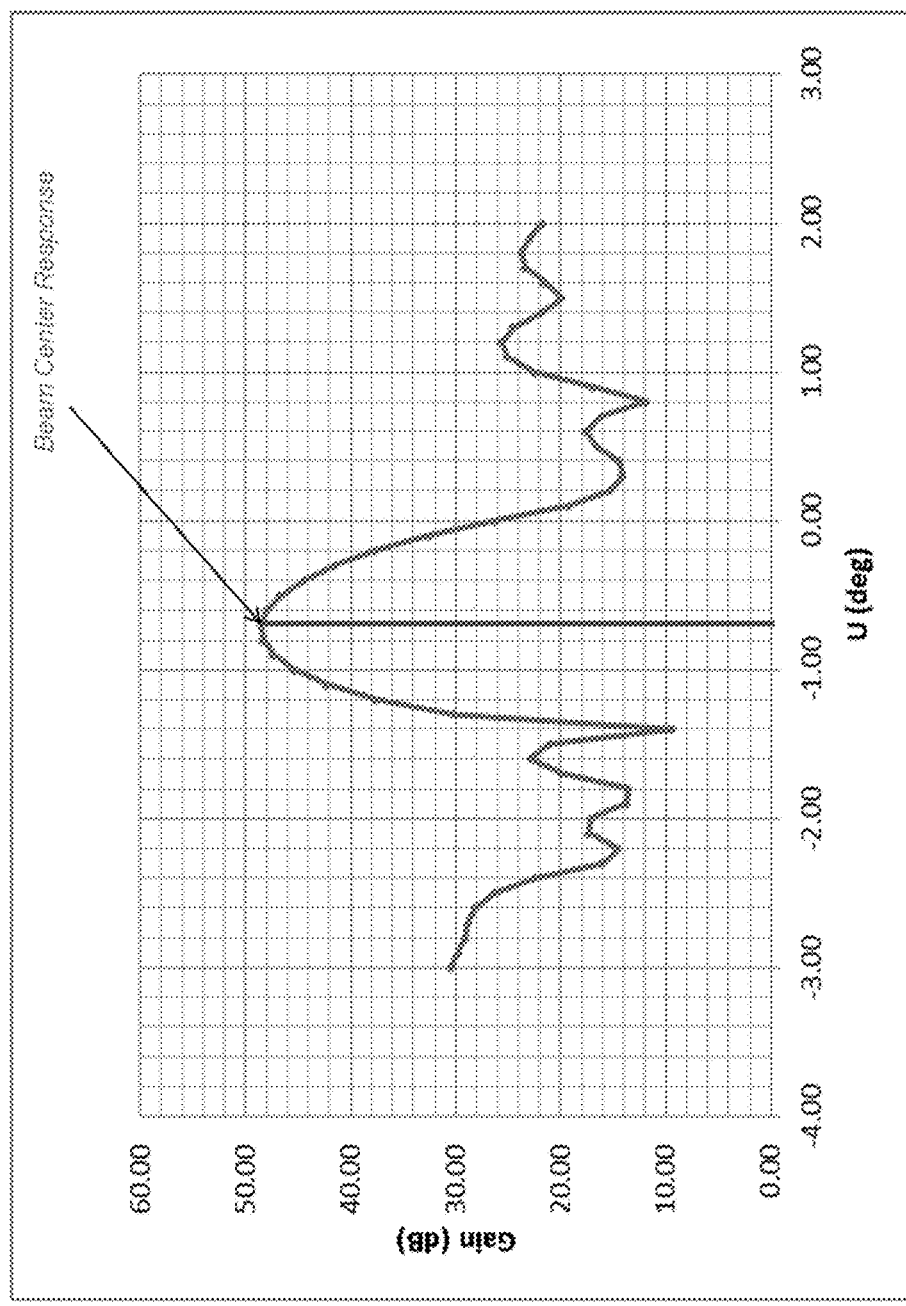
FIG. 4A illustrates a typical satellite beam from an 18 meter reflector, according to example embodiments.
Figure 4B:
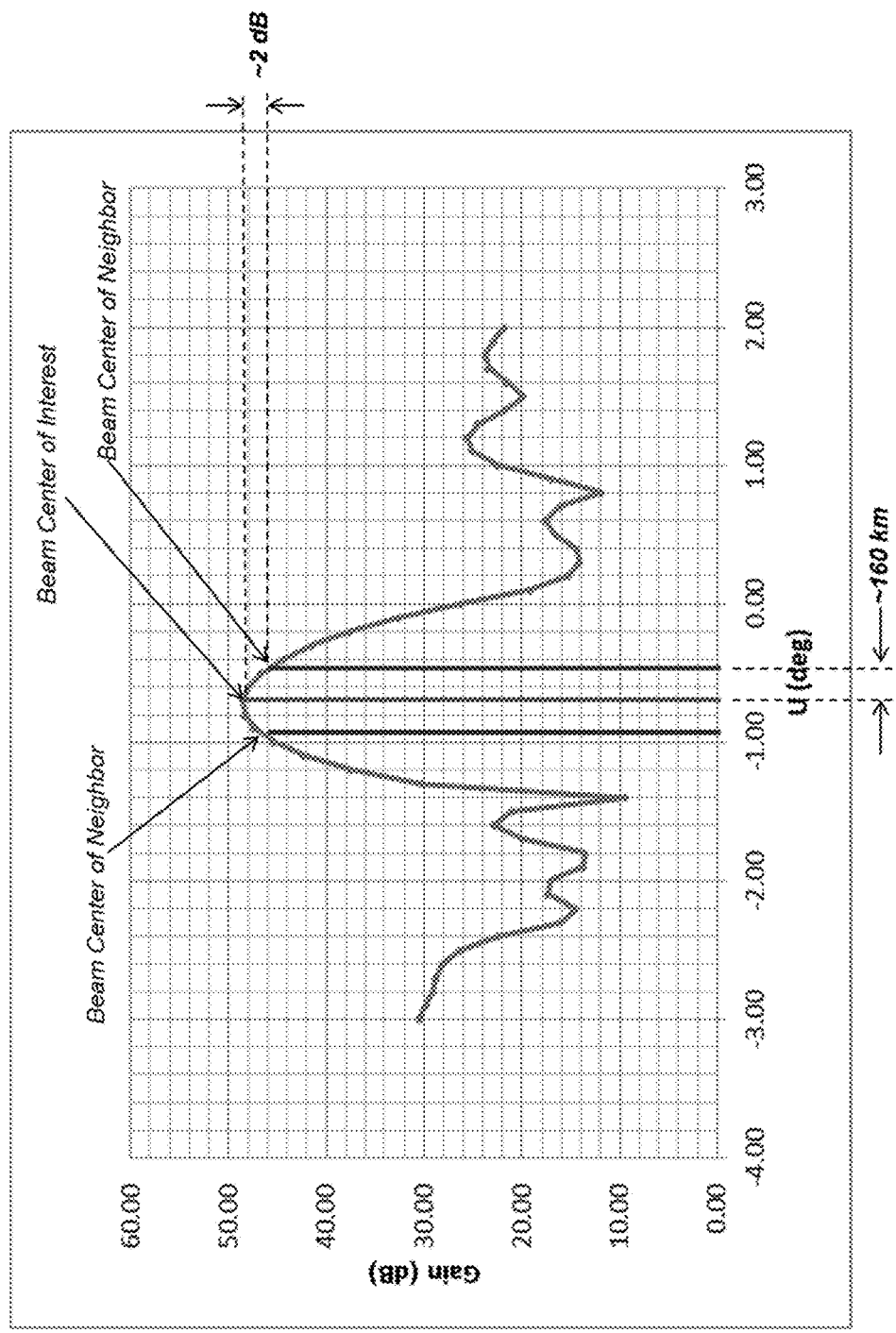
FIG. 4B illustrates a typical satellite beam in a K=1 scenario, according to example embodiments.
Figure 4C:
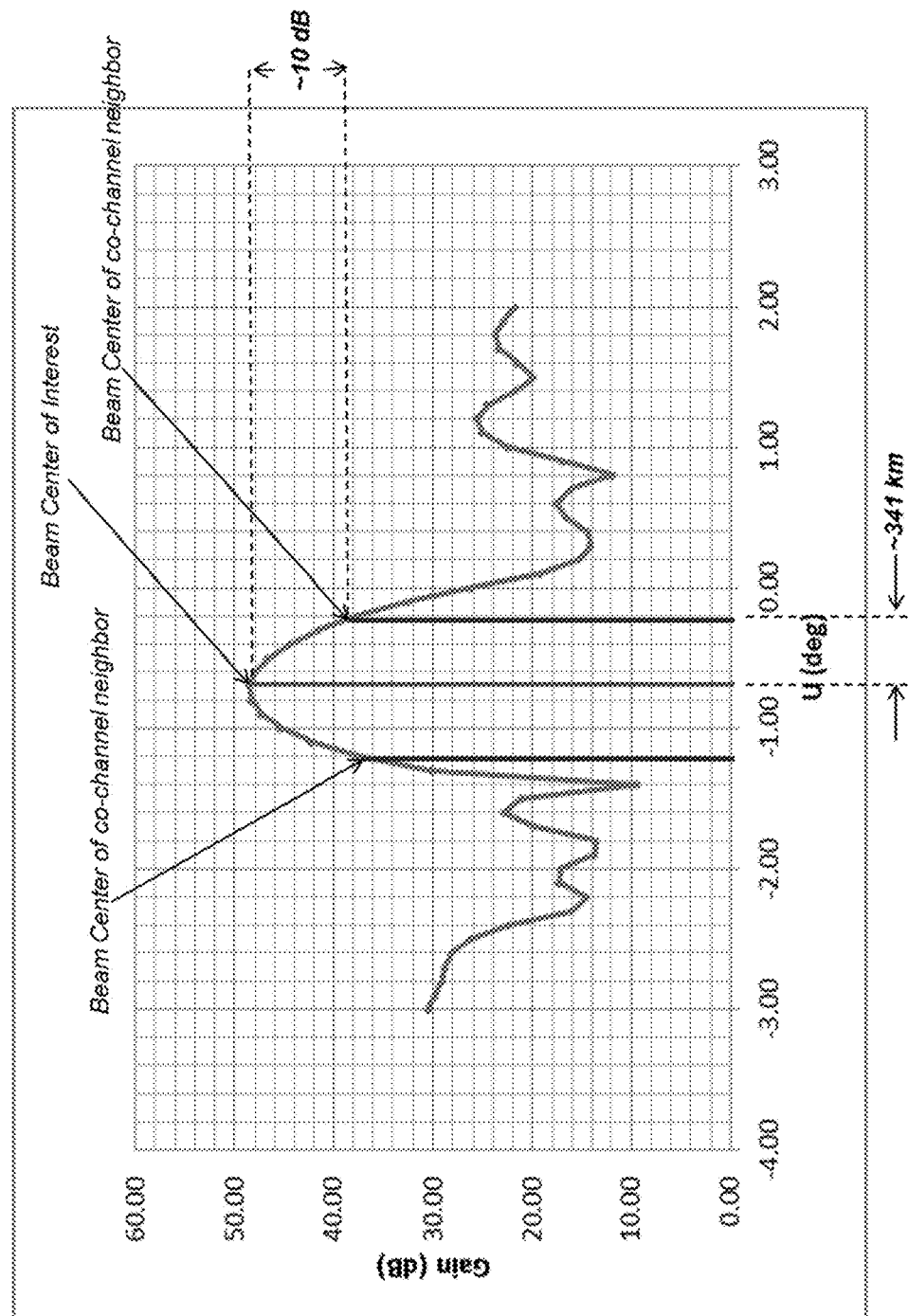
FIG. 4C illustrates a typical satellite beam in a K=4 scenario, according to example embodiments.
Figure 4D:
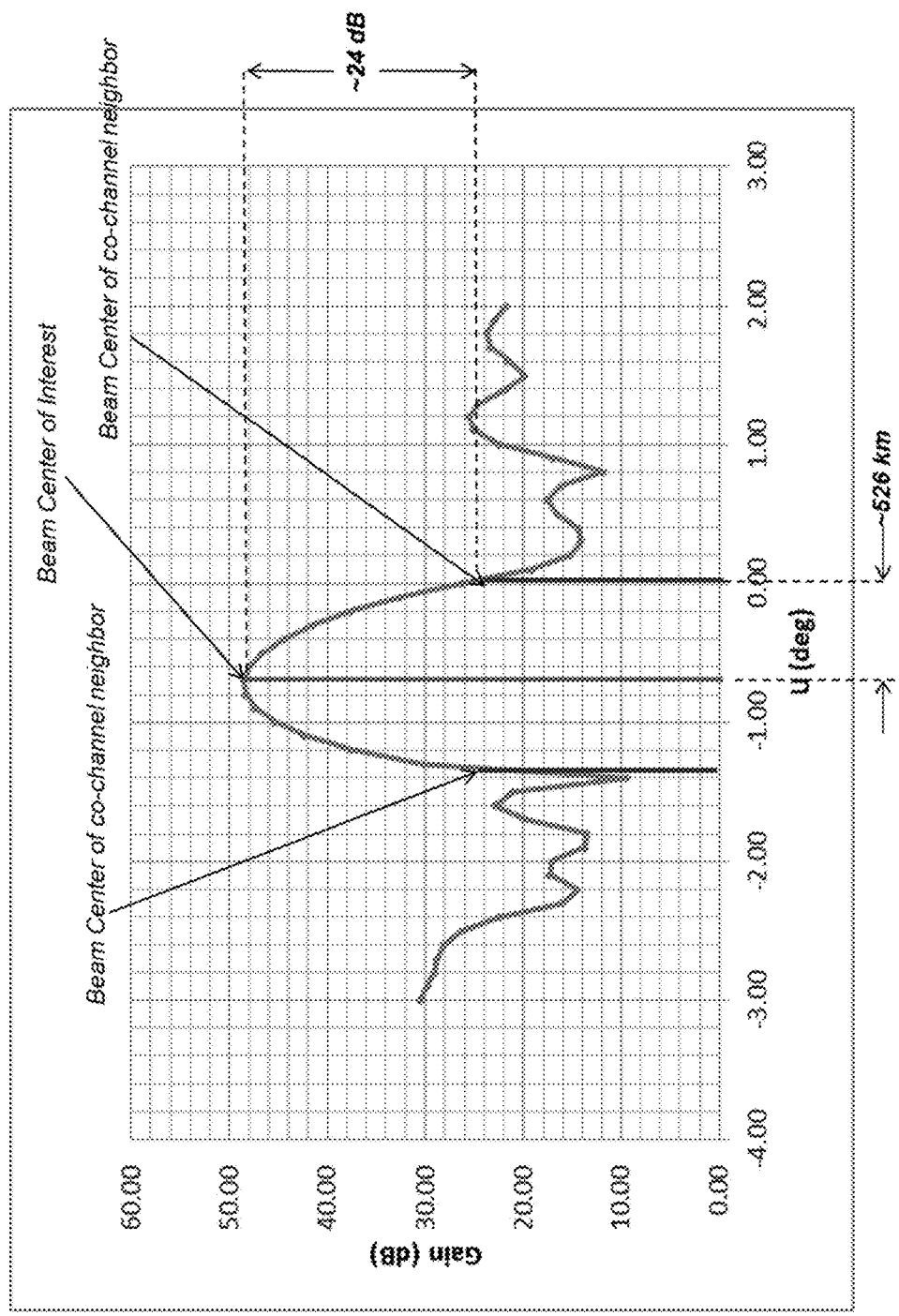
FIG. 4D illustrates a typical satellite beam in a K=9 scenario, according to example embodiments.

FIG. 4A illustrates a typical satellite beam from an 18 meter reflector, according to example embodiments. FIG. 4B illustrates a typical satellite beam in a K=1 scenario, according to example embodiments. FIG. 4C illustrates a typical satellite beam in a K=4 scenario, according to example embodiments. FIG. 4D illustrates a typical satellite beam in a K=9 scenario, according to example embodiments.

Fading Characteristics.

According to example embodiments, a Rician fading model with a Line-of-Sight (LoS) component and a Multipath (MP) component is employed, which is representative of a user/UT in an open environment with clear view of the sky with no head blockage. The fading characteristics will exhibit different characteristics depending on, for example, whether the user is walking slowly (less than 5 km/h)→slow fading, or driving in a car (e.g., 100 km/h)→fast fading. Further, for suburban and urban environments, the Loo distribution model may be employed. The following figures show representative fading distributions based on a Rician fading model and the Loo model.

Figure 5A:
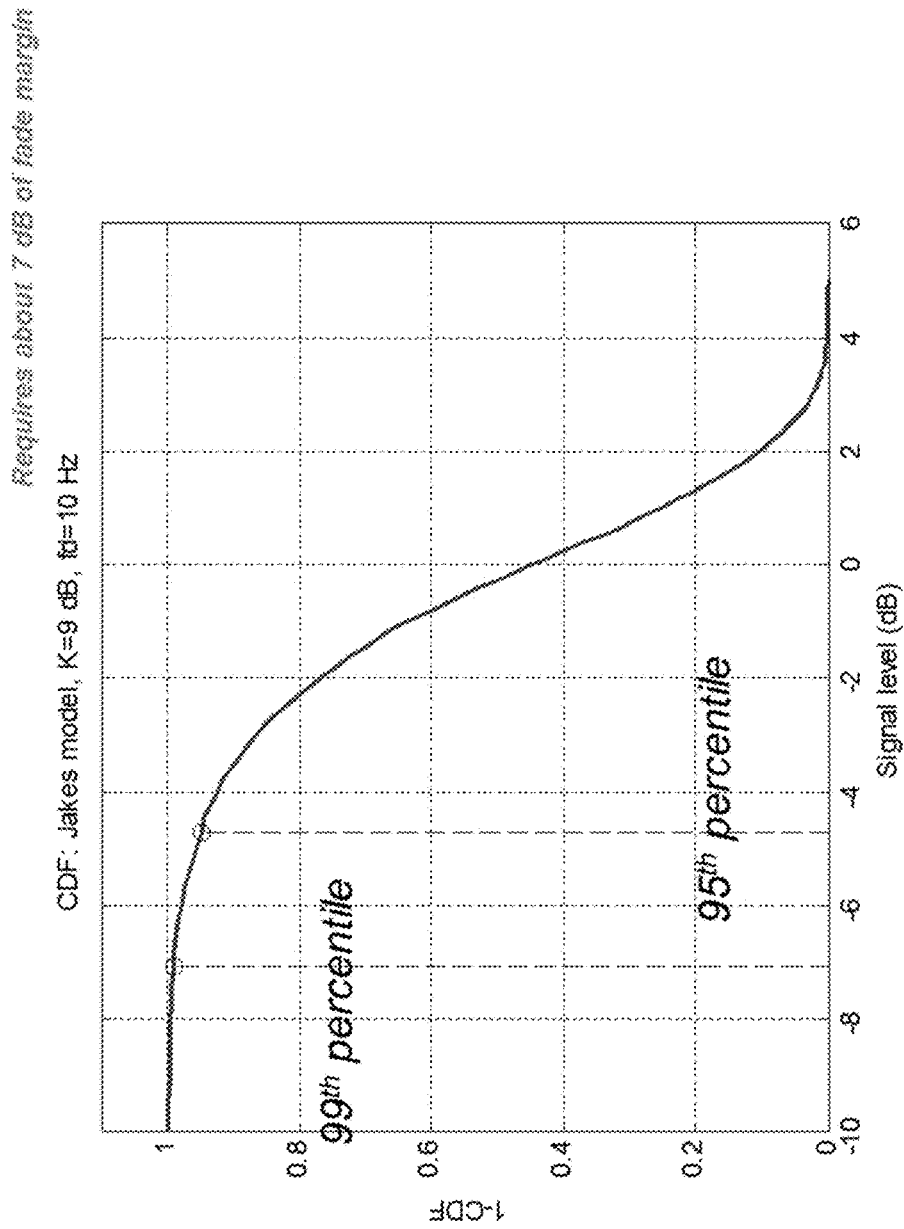
FIG. 5A illustrates an example of slow fading (e.g., in an open environment), according to example embodiments.
Figure 5B:
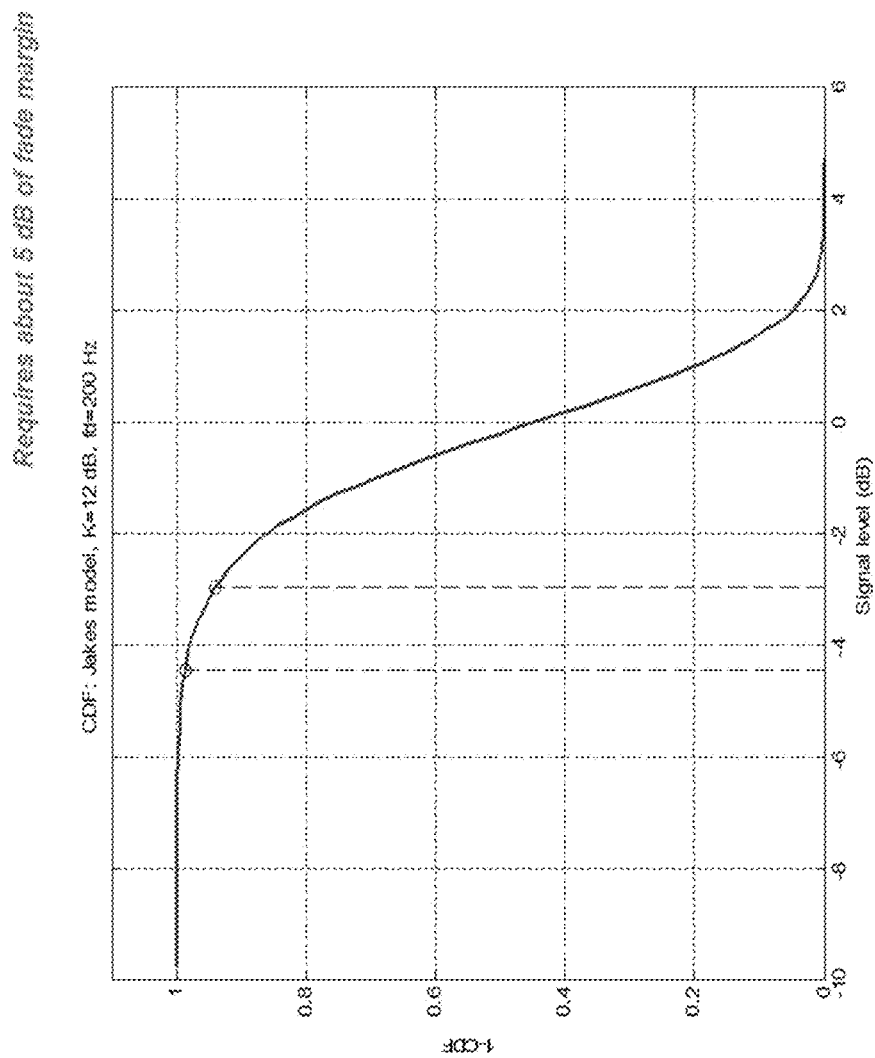
FIG. 5B illustrates an example of fast fading (e.g., in an open environment), according to example embodiments.
Figure 5C:
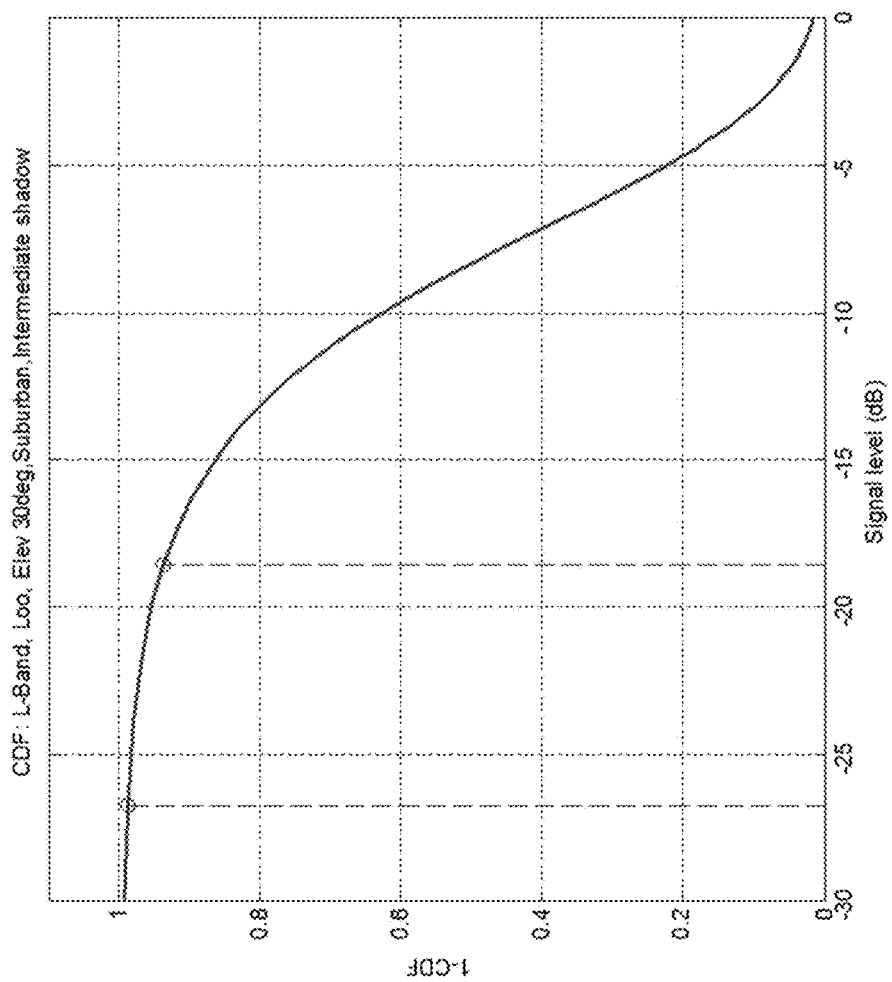
FIG. 5C illustrates an example of fading (e.g., in a typical suburban environment), according to example embodiments.
Figure 5D:
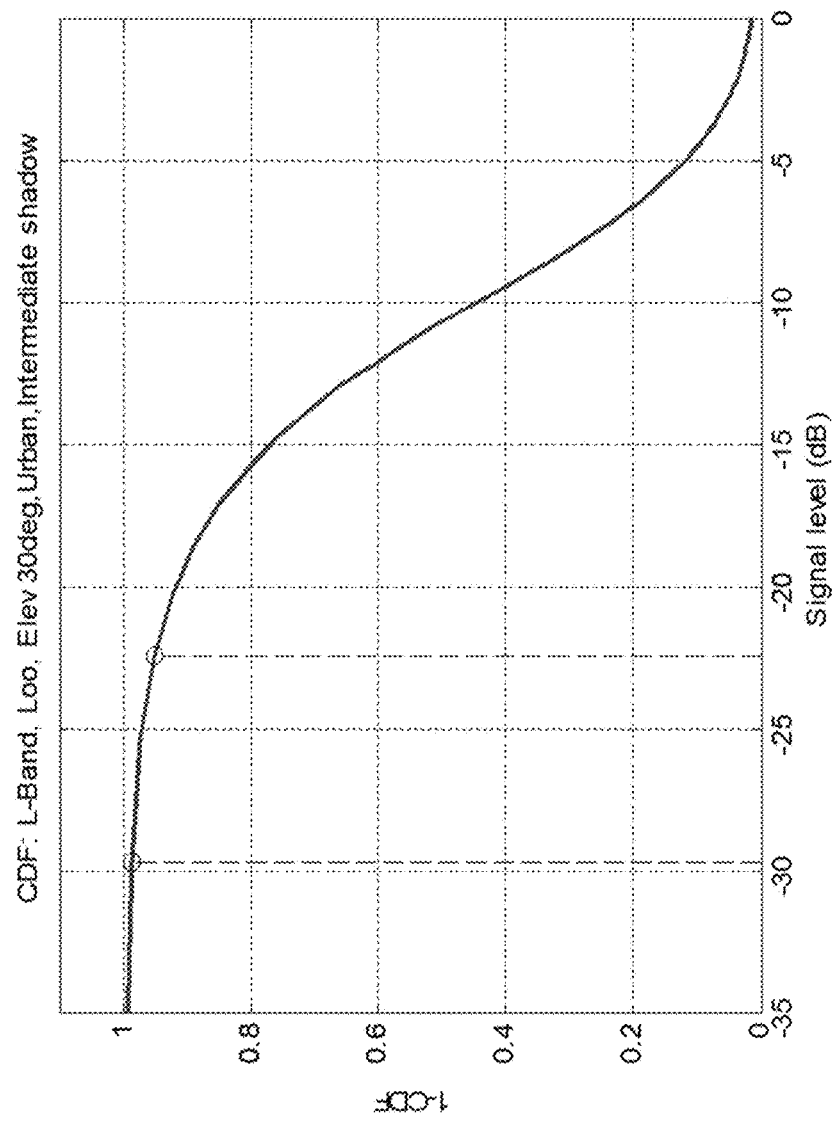
FIG. 5D illustrates an example of fading (e.g., in a typical urban environment), according to example embodiments.

FIG. 5A illustrates an example of slow fading (e.g., in an open environment), according to example embodiments. FIG. 5B illustrates an example of fast fading (e.g., in an open environment), according to example embodiments. FIG. 5C illustrates an example of fading (e.g., in a typical suburban environment), according to example embodiments. FIG. 5D illustrates an example of fading (e.g., in a typical urban environment), according to example embodiments.

Attribute Comparison to GMR-1 System.

The following two tables illustrate a comparison of certain attributes between the system architectures and designs of example embodiments of the present invention and the architectures and designs of GMR-1 systems (as defined in the European Telecommunications Standards Institute (ETSI) published GEO-Mobile Radio Interface Specifications standard):

| Attribute | Current GMR-1 Systems | Embodiments of the Present Invention | Benefit | Notes |
|---|---|---|---|---|
| Symbol Rates | Up to 234 ksps | Up to 17.4 Msps | Data Rate supported goes up from 590 kbps to 80 Mbps per polarization. | Current generation Hughesnet (Ku & Ka band) systems operate from 1-225 Msps |
| Polarization | Dual in return; single in forward | Dual in return, Dual in forward | Allows up to 160 Mbps using 20 MHz wide carrier in forward link | Requires very high satellite power, especially for handheld terminals. |
| Channel Spacing | 1.35 | 1.15 | Results in about 17% increase in spectral efficiency | Proposed roll-off factor has been deployed in VSAT and other MSS systems |
| Modulation | $\pi/2$ BPSK $\pi/4$ QPSK 16 APSK 32 APSK | $\pi/2$ BPSK $\pi/4$ QPSK 16 APSK 32 APSK [64 QAM] | Allows spectral efficiency to go up to 4.17 b/s/Hz per polarization; 8.34 b/s/Hz using both polarizations in forward link | 64 QAM has been implemented for other MSS systems |

-continued

| Attribute | Current GMR-1 Systems | Embodiments of the Present Invention | Benefit | Notes |
|---|---|---|---|---|
| FEC algorithm | Convolutional Turbo LDPC (short code blocks) | Convolutional — LDPC (long code blocks) | About 0.25 dB improvement in links due to long code blocks | |
| Reuse Factors | 1 to 19 (fixed) | 1 to 19 (dynamic) | | Reuse of 1 used for CDMA based system |

| Attribute | Current GMR-1 Systems | Embodiments of the Present Invention | Benefit | Notes |
|---|---|---|---|---|
| MIMO/Divers with LEO/MEO/GEO | LEO | Combination of LEO/MEO/GEO | | |
| Adaptive Beam Forming | No | Yes | Improved C/I performance | |
| Successive Interference Cancellation | No | Yes | Improved C/I performance | |
| Faster Than Nyquist (FTN) | No | Yes | [25%] improvement in throughput | Implemented on VSAT systems |
| Carrier Aggregation | No | Yes | Improves capacity about two-fold assuming 34 MHz of L-band and 30 MHz of 5-band | |
| Terrestrial Extensions | No | Possibly | Higher link margin and capacity in urban and suburban environments | Provides capability to receive from satellite and rebroadcast terrestrially. |

Long Term Evolution (LTE) VoIP Capacity.

The following table specifies a summary of LTE VoIP uplink (UL) and downlink (DL) capacity—taken from the 3GPP specification TR 25.912 (ver. 9.0.0)—assuming 5 MHz of spectrum, AMR codec up to 12.2 Kbps, which translates to approximately 12.2*300/500=0.7 bit/s/Hz:

TABLE 13.8

Summary of UL and DL VoIP Capacity

| Deployment Scenario | Average VoIP Capacity (users/sector) | |
|---|---|---|
| | DL | UL |
| Case1 | 317 | 241 |
| Case2 | 293 | — |
| Case3 | 289 | 123 |

Average Spectral Efficiency.

The following table specifies average spectral efficiency—taken from the 3GPP specification 36.913 (ver. 12.0.0, release 12):

TABLE 8.1

Targets for average spectrum efficiency

| | Ant. Config. | Case 1 [bps/Hz/cell] | Radio env. | | |
|---|---|---|---|---|---|
| | | | Micro | Indoor | Rural/High speed |
| UL | 1 × 2 | 1.2 | | | |
| | 2 × 4 | 2.0 | | | |
| DL | 2 × 2 | 2.4 | | | |
| | 4 × 2 | 2.6 | | | |
| | 4 × 4 | 3.7 | | | |

Vocoder Comparison.

Figure 6A:
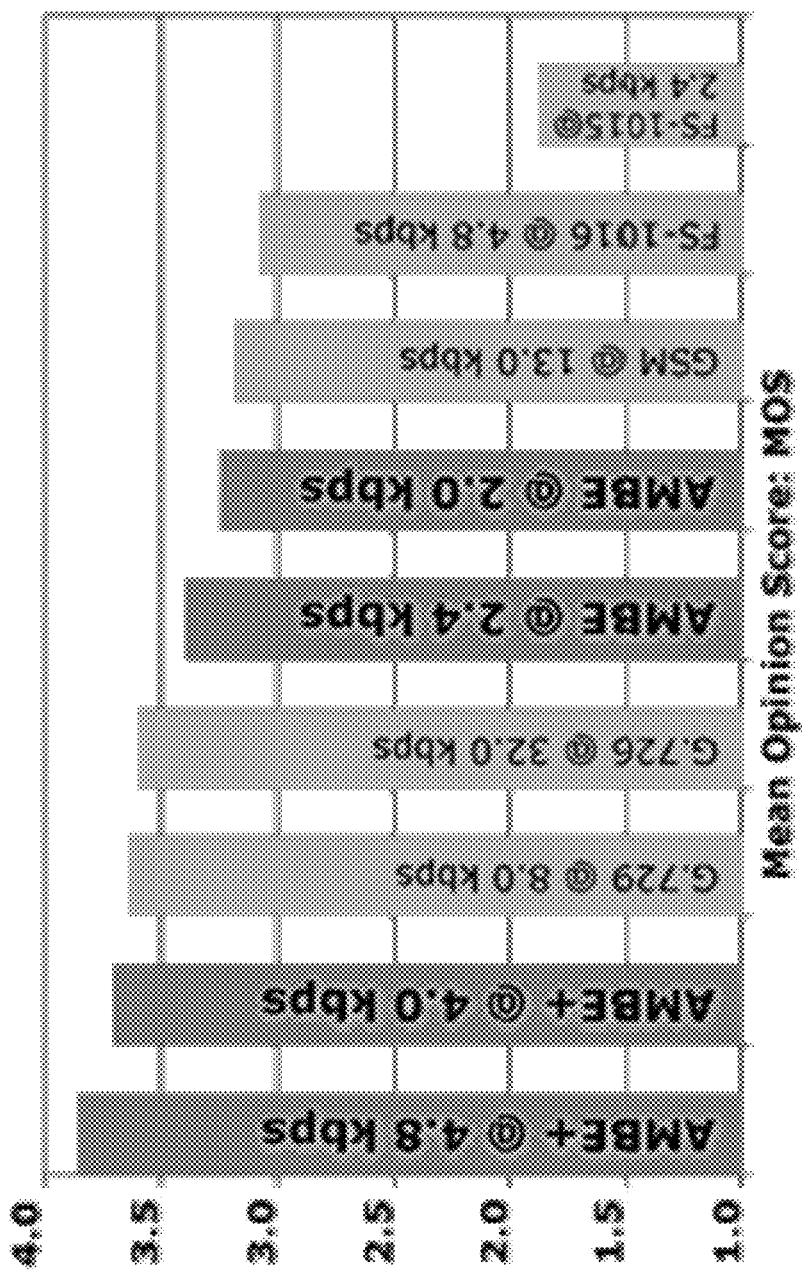
FIG. 6A illustrates a comparison of example vocoders (from the website http://www.dvsinc.com/papers/eval_results.htm)
Figure 6B:
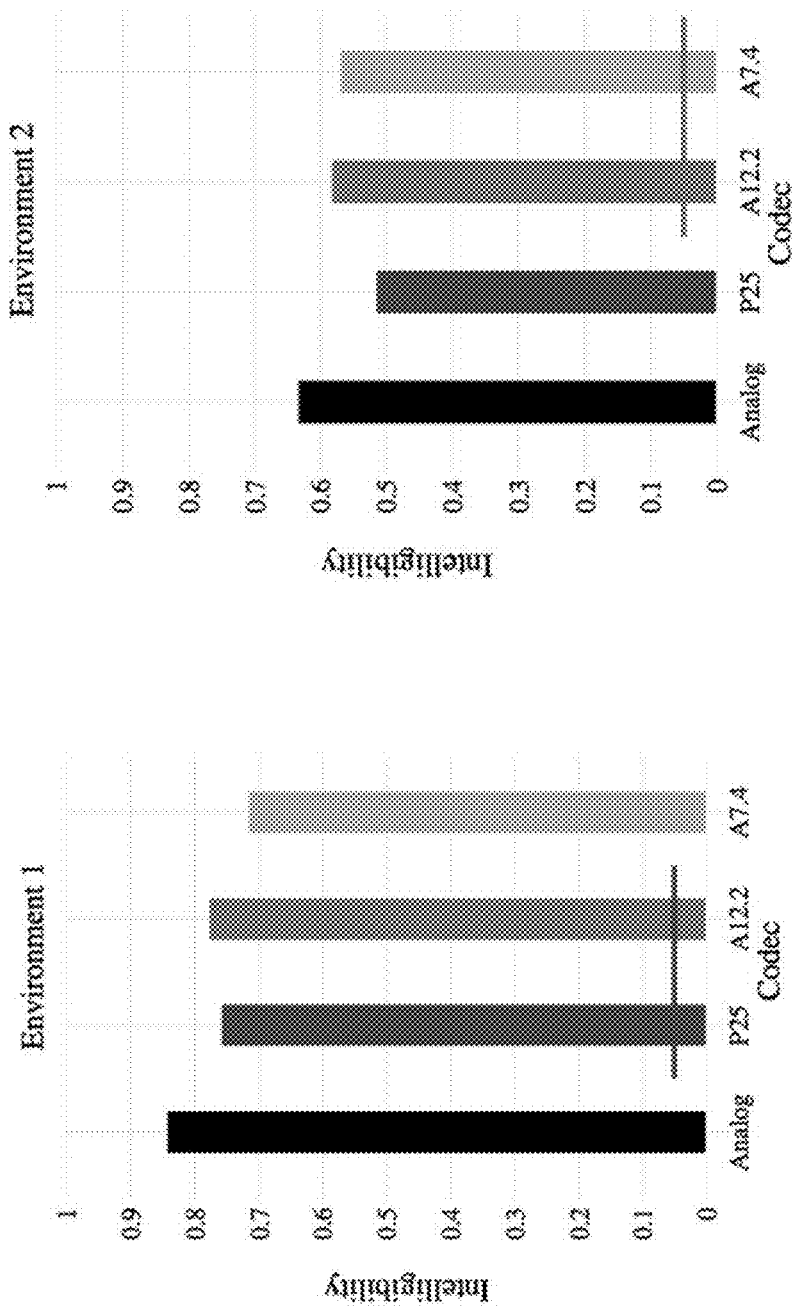
FIGS. 6B(i), 6B(ii), 6B(iii), 6B(iv) illustrate a comparison of example AMR and AMBE+2 vocoders (P25: AMBE+2 vocoder at 4.4 kbps source rate; A12.2: AMR 12.2 kbps source rate; A7.4: AMR 7.4 kbps source rate)

FIG. 6A illustrates a comparison of example vocoders (taken from the website http://www.dvsinc.com/papers/eval_results.htm). FIGS. 6B(i), 6B(ii), 6B(iii), 6B(iv) illustrate a comparison of example AMR and AMBE+2 vocoders (P25: AMBE+2 vocoder at 4.4 kbps source rate; A12.2: AMR 12.2 kbps source rate; A7.4: AMR 7.4 kbps source rate). The 6B figures show intelligibility results for ten "audiometrically normal" subjects, with environments 1-4, showing statistical similarities.

GMR-1 Bearer Table.

The following table, for example, shows a bearer table for a GMR-1 system:

| Modulation | FEC | Coding Rate (Approx.) | Approx. Peak Payload Bit Rate (kbps) | $E_s/N_o$ Estimate in static AWGN channel (dB) | FER | Achievable spectral efficiency |
|---|---|---|---|---|---|---|
| PI/4 QPSK | Conv. | 4/5 | 4 | 7.05 | 1.00E−02 | 1.19 |
| PI/4 QPSK | Conv. | 1/2 | 2.45 | 3.55 | 1.00E−02 | 0.73 |

-continued

| Modulation | FEC | Coding Rate (Approx.) | Approx. Peak Payload Bit Rate (kbps) | $E_s/N_o$ Estimate in static AWGN channel (dB) | FER | Achievable spectral efficiency |
|---|---|---|---|---|---|---|
| PI/4 QPSK | Conv. | 2/5 | 4 | 2.15 | 1.00E−02 | 0.59 |
| PI/2 BPSK | Conv. | 1/2 | 2.45 | −0.05 | 1.00E−02 | 0.36 |
| PI/4 QPSK | Conv. | 3/5 | 21 | 5.55 | 1.00E−03 | 0.78 |
| PI/4 QPSK | Conv. | 7/10 | 25 | 6.65 | 1.00E−03 | 0.93 |
| PI/4 QPSK | Conv. | 4/5 | 29 | 7.95 | 1.00E−03 | 1.08 |
| PI/4 QPSK | Turbo | 3/5 | 47 | 4.75 | 1.00E−03 | 0.87 |
| PI/4 QPSK | Turbo | 7/10 | 56 | 6.15 | 1.00E−03 | 1.04 |
| PI/4 QPSK | Turbo | 4/5 | 64 | 7.55 | 1.00E−03 | 1.19 |
| PI/4 QPSK | Turbo | 1/2 | 110 | 2.65 | 1.00E−03 | 0.82 |
| PI/4 QPSK | Turbo | 5/8 | 139 | 3.85 | 1.00E−03 | 1.03 |
| PI/4 QPSK | Turbo | 3/4 | 166 | 5.75 | 1.00E−03 | 1.23 |
| PI/4 QPSK | Turbo | 5/8 | 186 | 6.95 | 1.00E−03 | 1.38 |
| 16 APSK | Turbo | 1/2 | 222 | 9.2 | 1.00E−03 | 1.85 |
| 16 APSK | Turbo | 4/7 | 256 | [10.1] | 1.00E−03 | 1.90 |
| 16 APSK | Turbo | 2/3 | 296 | 11.8 | 1.00E−03 | 2.20 |
| PI/4 QPSK | Turbo | 5/8 | 261 | 4.15 | 1.00E−03 | 0.97 |
| 16 APSK | Turbo | 2/3 | 590 | 12.1 | 1.00E−03 | 2.19 |
| PI/4 QPSK | Turbo | 1/2 | 261 | 2.95 | 1.00E−03 | 0.97 |
| PI/4 QPSK | Turbo | 3/4 | 261 | 6.05 | 1.00E−03 | 0.97 |
| PI/4 QPSK | Turbo | 5/8 | 261 | 7.25 | 1.00E−03 | 0.97 |
| 32 APSK | LDPC | 4/5 | 444 | 16 | 1.00E−03 | 3.30 |

Capacity Density.

The following table illustrates terrestrial and satellite capacity density equivalents:

| Data | | |
|---|---|---|
| Attribute | Value | Units |
| circular area with cell radius of 2 km | 12.57 | sq km |
| circular area with sat beam radius of 80 km | 20106.193 | sq km |
| avg. capacity per 2 km cell (20 MHz) | 40 | Mbps |
| terrestrial capacity per sq km | 3.18 | Mbps/sq_km |
| eq. sat capacity needed per sat beam | 64 | Gbps/sat_beam |

The following table illustrates the effective capacity density improvement required for satellite systems:

| Data | | |
|---|---|---|
| Attribute | Value | Units |
| circular area with cell radius of 2 km | 12.57 | sq km |
| circular area with sat beam radius of 80 km | 20106.193 | sq km |
| avg. capacity per 2 km cell (20 MHz) | 40 | Mbps |
| terrestrial capacity per sq km | 3.18 | Mbps/sq_km |
| eq. sat capacity needed per sat beam | 64 | Gbps/sat_beam |
| Avg. achievable per sat beam (20 MHz, reuse 12) | 3.33 | Mbps |
| Improvement Factor Needed | 19200 | |

The following table illustrates the effective capacity density improvement required for satellite systems in terrestrial environments:

| Data | | |
|---|---|---|
| Attribute | Value | Units |
| circular area with cell radius of 2 km | 12.57 | sq km |
| circular area with sat beam radius of 80 km | 20106.193 | sq km |
| avg. capacity per 2 km cell (20 MHz) | 40 | Mbps |
| terrestrial capacity per sq km | 3.18 | Mbps/sq_km |
| eq. sat capacity needed per sat beam | 64 | Gbps/sat_beam |
| Avg. achievable per sat beam (20 MHz, reuse 12) | 3.33 | Mbps |
| Improvement Factor Needed | 19200 | |
| Extra Link Margin for Terrestrial use | 20 | dB |
| Effective Improvement Needed | 1920000 | |

The total land area of the contiguous United States is approximately 7,600,000 km², and, with an average of 3 Mbps per km², the total throughput for the United States would be approximately 23 terra-bits per second (Tbps). According to example embodiments, such a 23 Tbps system may comprise a total number of approximately 10,000 LEO satellites globally. By way of example, the satellites may be deployed in 66 orbits with 150 satellites per orbit. By way of further example, hundred and 50 of such satellites may cover the US with a throughput per satellite of 150 Gbps. By way of further example, with a 2 GHz Ku availability in the forward link and a reuse of 4, and with 60 beams per satellite and each beam having 500 MHz of spectrum, an effective spectrum or capacity of 30 GHz per polarization may be obtained—60 GHz of spectrum using two polarizations. By way of further example, with a 16 APSK, Rate 3/4 modulation and coding scheme, a spectral efficiency of 150 Gbps/60 GHz=2.5 can be achieved. By way of further example, such a system may have an Es/No of 11 dB and a C/I of approximately 15 dB with a reuse of 4. By way of further example, the UT may deploy a tracking antenna of an approximate 70 cm aperture, in the system would employ predictive handovers to assist signaling.

Synchronization.

According to example embodiments, the UT forward link acquisition process may be in one of the following states: (1) Cold Start—characterized by limited availability of satellite ephemeris and/or terminal position data, resulting in large uncertainties in Doppler and timing and antenna tracking angle—which is facilitated by a terminal receiver that employs a large time, frequency, angular acquisition window; (2) Warm Start—characterized by available satellite ephemeris and/or terminal position data that may not have been recently updated—links in partially synchronized state; (3) Steady State (Idle and Connected Mode Handovers)—characterized by available accurate ephemeris data, and estimates of delay and Doppler and antenna tracking angle—guard bands and acquisition windows are smallest. A UT forward link synchronization scheme is employed to address these various modes of operation.

According to example embodiments for the UT forward link synchronization, the following synchronization schemes are employed. According to one such embodiment, the satellite and the UT both have a GPS disciplined oscillator, whereby the frequency reference is locked to GPS, the frame markers are derived based on GPS 1 pps timing ticks, and the UT continually estimates the downlink delay and Doppler using the satellite ephemeris data. According to a further such embodiment, downlink timing is acquired at the UT, where, by adding the estimated downlink delay to its GPS based 1 pps ticks, the UT derives an estimate of the downlink frame markers, and the UT opens an acquisition window for the downlink frame timing around this estimated frame marker (the acquisition window is largest at cold start (e.g., may be continuous), smaller in the warm start, and smallest in steady-state). According to a further such embodiment, downlink frequency is acquired at the UT, where, by adding the estimated downlink Doppler to its GPS disciplined frequency reference, the UT derives an estimate of the downlink frequency, and the UT opens an acquisition window centered at this estimated downlink frequency (the acquisition window is largest at the cold start (e.g., may be continuous), smaller in the warm start, and smallest in steady-state). After the initial acquisition, the downlink timing and frequency are continually tracked by the UT receiver.

Figure 7A:
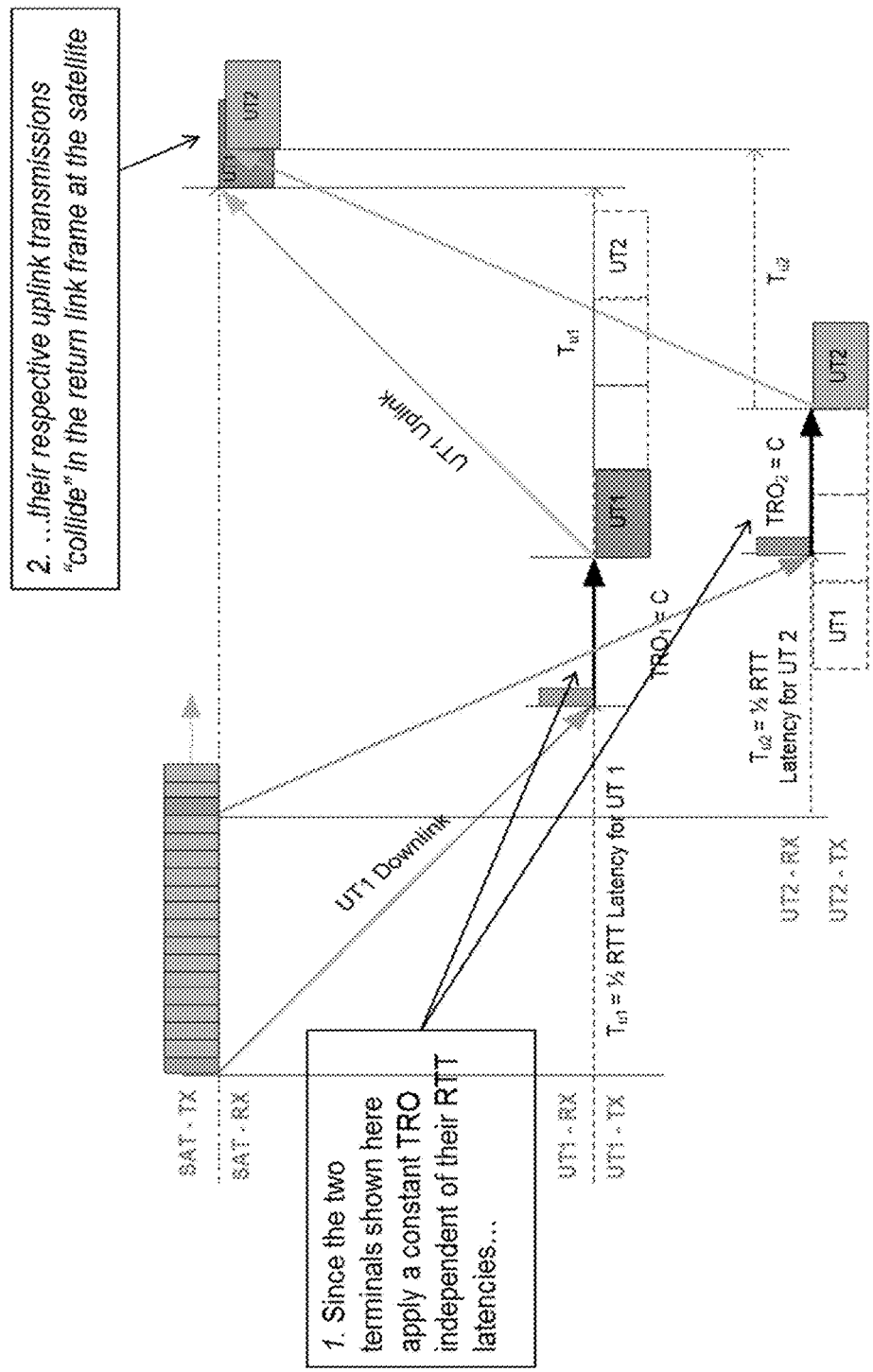
FIG. 7A illustrates an example of UT return link synchronization where the transmissions of two different UTs overlap at the satellite according to example embodiments.

In TDMA systems, different non-collocated terminals occupy different timeslots of the return link frame. According to example embodiments, therefore, for the UT return link synchronization, the synchronization scheme is designed so to ensure that the uplink transmissions of different terminals do not overlap or collide at the satellite. For example, if different terminals apply a constant offset to its receive frame marker to determine its transmit frame marker, their respective uplink transmissions may collide at the satellite. FIG. 7A illustrates an example of UT return link synchronization where the transmissions of two different UTs overlap at the satellite. As shown in the figure, since the two terminals apply a constant TRO independent of their RTT latencies, their respective uplink transmissions collide in the return link frame at the satellite.

Figure 7B:
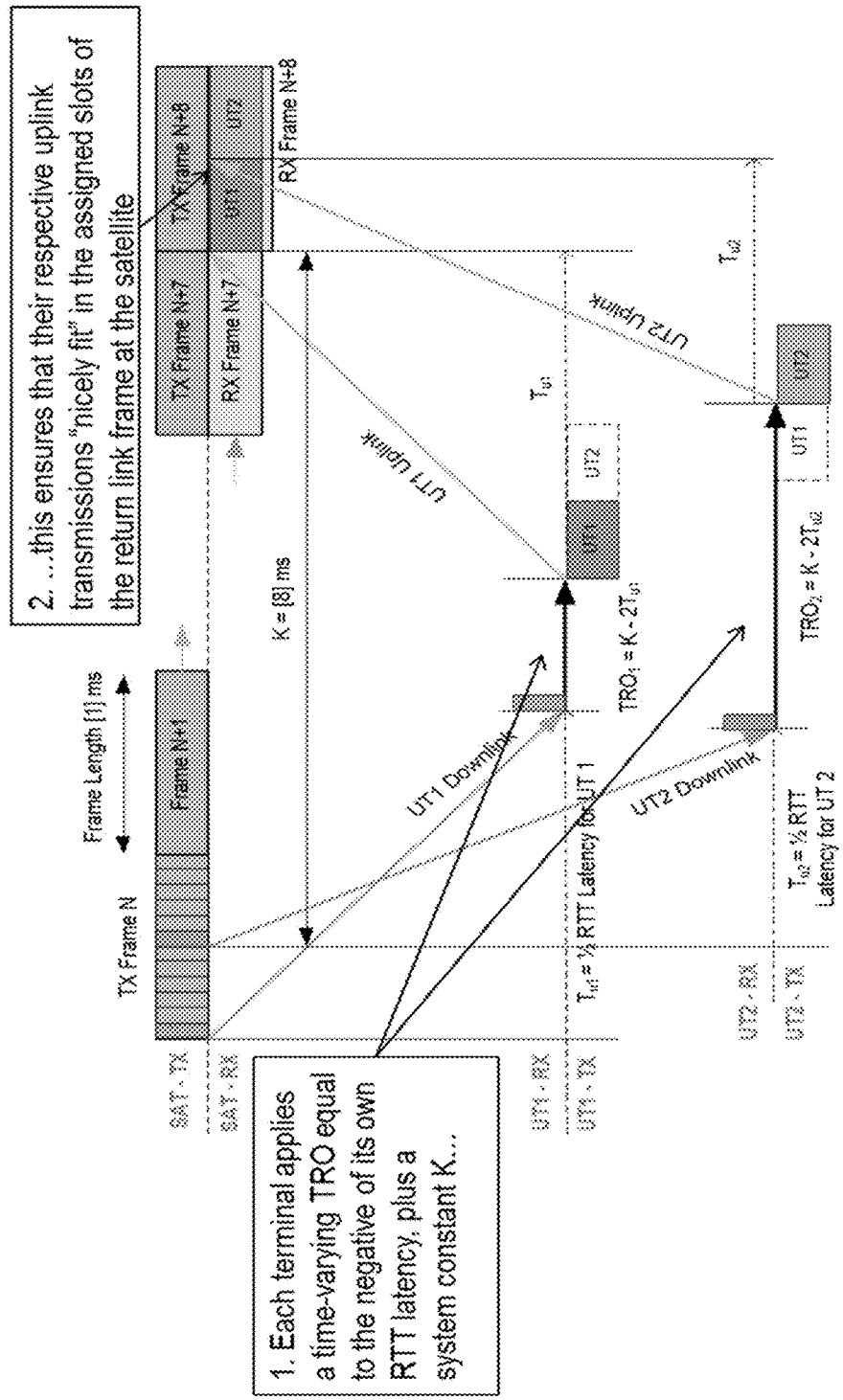
FIG. 7B illustrates an example UT return link synchronization scheme, according to example embodiments.

FIG. 7B illustrates an example UT return link synchronization scheme, according to example embodiments. According to example embodiments, the UT continually adjusts the Transmit Receive Offset (TRO) to make it equal to the negative of its RTT latency plus a system constant. In this manner, each terminal applies a time-varying TRO equal to the negative of its own RTT latency, plus a system constant K, which ensures that their respective uplink transmissions fit in the assigned slots of the return link frame at the satellite.

FIG. 8A illustrates synchronization and half-duplex operation for a beam level, position unaware scheduler, and FIG. 8B illustrates synchronization and half-duplex operation for a terminal position aware scheduler. With reference to FIG. 8A, for a single allocated uplink burst, the same set of downlink bursts is blocked irrespective of the terminal position within the beam, and the number of blocked bursts varies from beam to beam. With reference to FIG. 8B, the number of blocked bursts is reduced, because the scheduler accounts for the terminal specific TRO, and the downlink bursts that are blocked depends on the terminal position within the beam.

Figure 9:
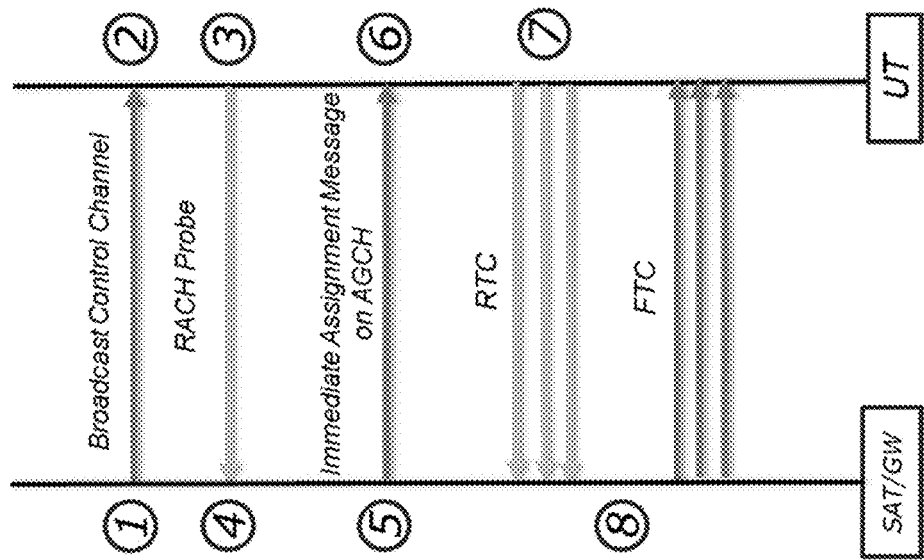
FIG. 9 illustrates a further example synchronization scheme, according to example embodiments.

FIG. 9 illustrates a further example synchronization scheme, according to example embodiments. At Step 1, the satellite broadcasts on the Control Channel the ephemeris vectors of all satellites (e.g., LEO satellites). At Step 2, the UT acquires the forward link Control Channel and reads the broadcast ephemeris information. At Step 3, the UT initiates a connection by transmitting an Contention burst on the return link random access channel (RACH). At Step 4, the satellite acquires the RACH Probe from the UT and measures the received timing and frequency. At Step 5, the Gateway (GW) sends to the UT the Immediate Assignment message on the Access Grant Channel (AGCH), which may optionally contain a timing and frequency correction field. At Step 6, the UT receives the AGCH message. At Step 7, the UT initiates the Return Traffic Channel (RTC). At Step 8, the GW seeds the RTC receiver using the measured timing offset measured on the RACH, and initiates the Forward Traffic Channel (FTC). Further, to conserve battery, the UT may enter the sleep mode at Steps 2 and 7.

According to further example embodiments, the terminal uses a predictive approach to determine the expected [time, frequency] offsets of the downlink burst after wake up (e.g., after the UT wakes from the sleep mode entered in the idle and connected modes). By way of example, the terminal determines the [time, frequency] offset of the last downlink burst read prior to entering the sleep mode, and then enters the sleep state for the next consecutive N downlink bursts. Then, just prior to the next downlink burst that the terminal must receive, the terminal wakes up and extrapolates [time, frequency] offsets measured for the last received burst using the ephemeris knowledge.

Figure 10:
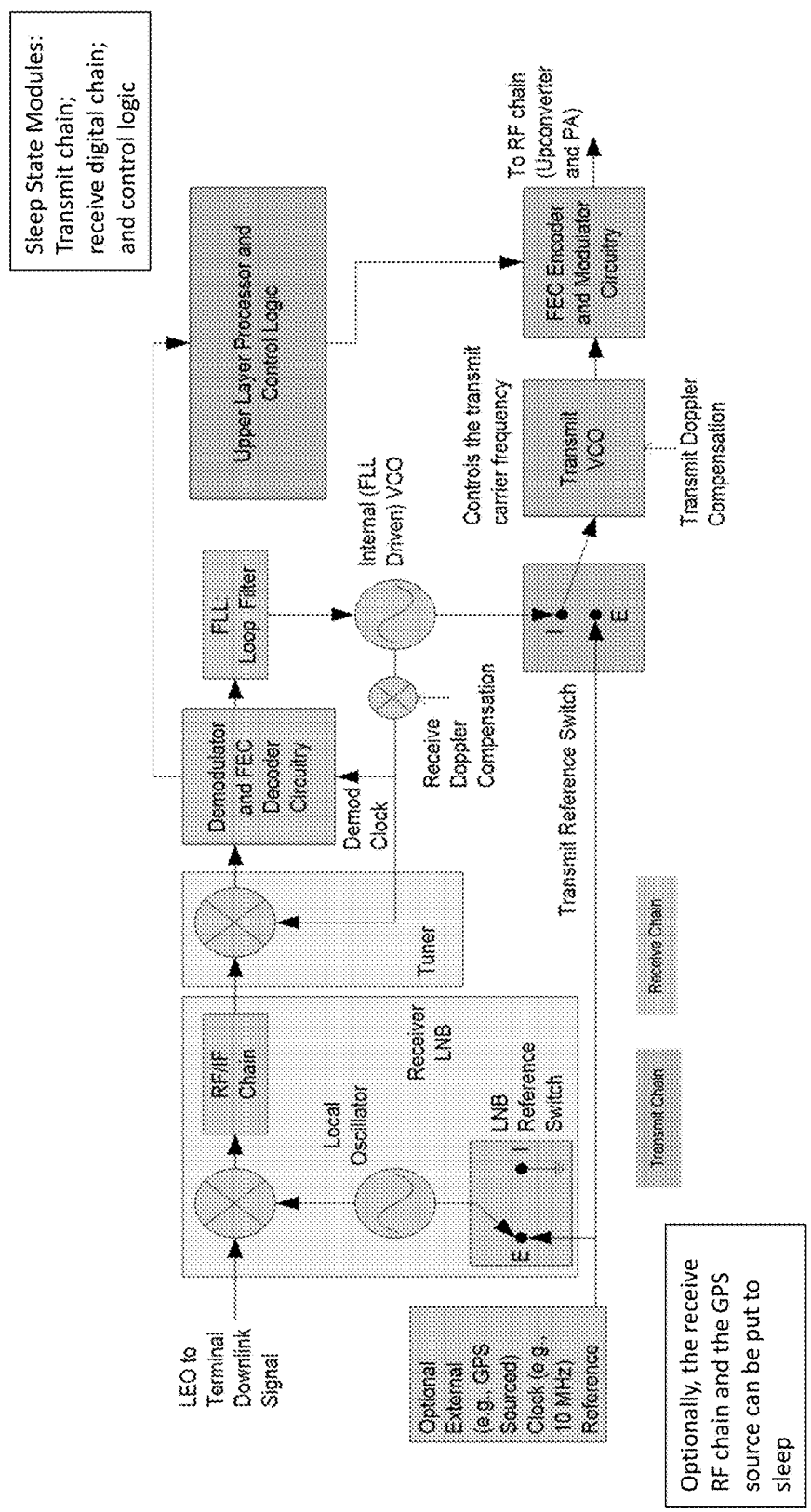
FIG. 10 illustrates an example terminal schematic and sleep states, according to example embodiments.

FIG. 10 illustrates an example terminal schematic and sleep states, according to example embodiments. For example, by keeping the terminal clock active while the other modules of the terminal circuitry go to sleep, the terminal frame numbering and frequency synch is kept in a disciplined state on wake-up.

Figure 11A:
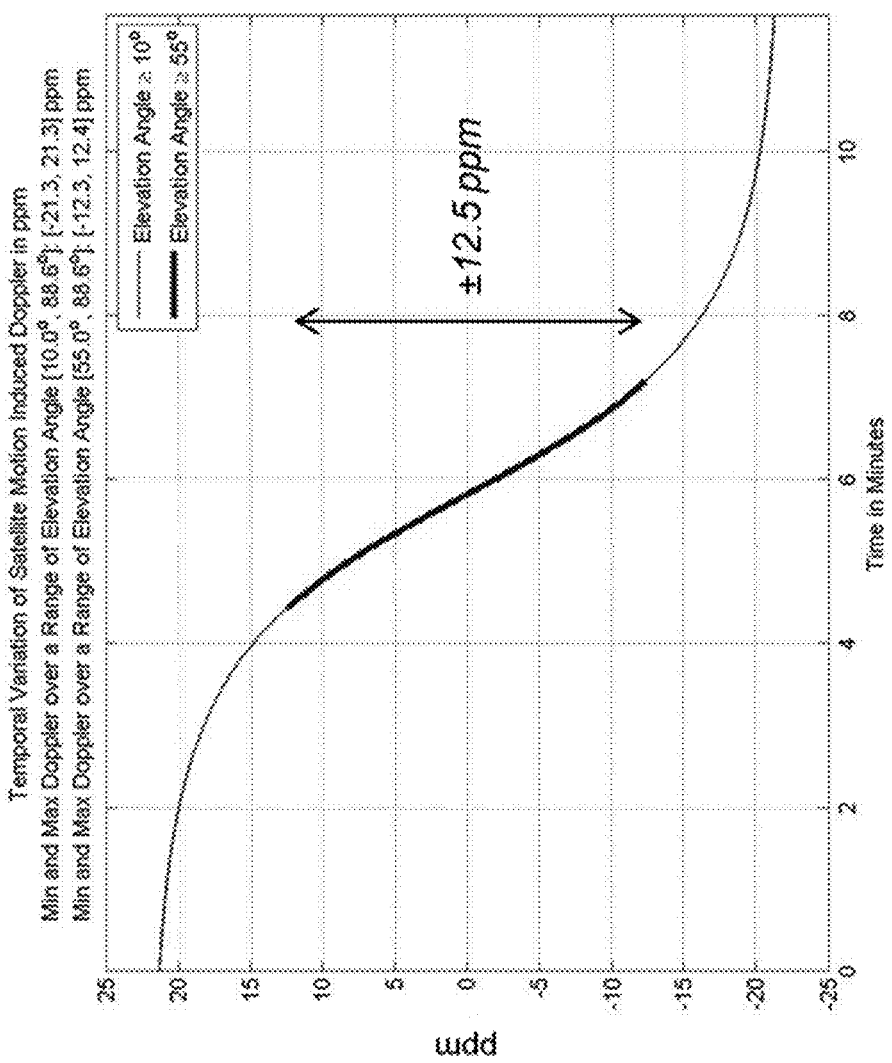
FIG. 11A illustrates the rate of change of delay on LEO links, according to example embodiments.
Figure 11B:
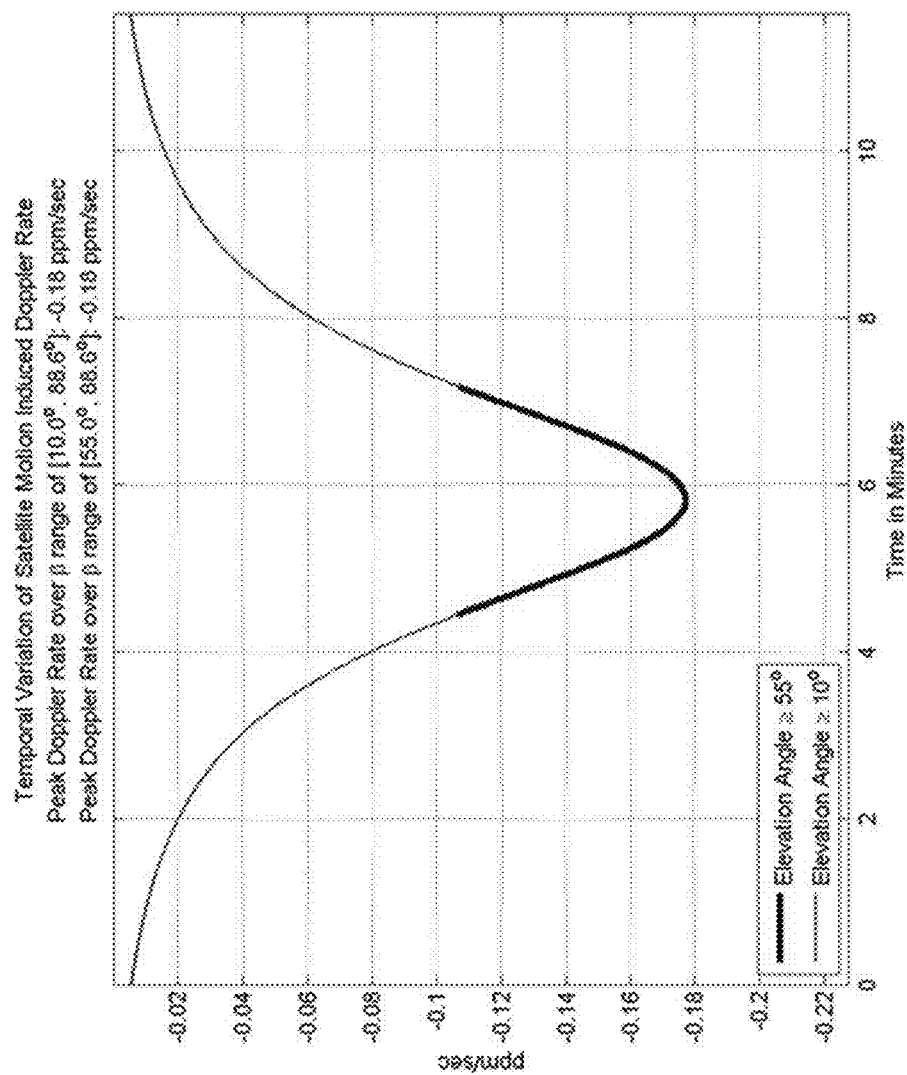
FIG. 11B illustrates the rate of change of Doppler on LEO links, according to example embodiments.

FIG. 11A illustrates the rate of change of delay on LEO links, and FIG. 11B illustrates the rate of change of Doppler on LEO links, according to example embodiments. By way of example, rates of change of delay and Doppler on the LEO links have been determined to be at maximum uncertainties in rates of change of delay of ±12.5 ppm, and rates of change of Doppler of ±0.04 ppm/sec.

Figure 11C:
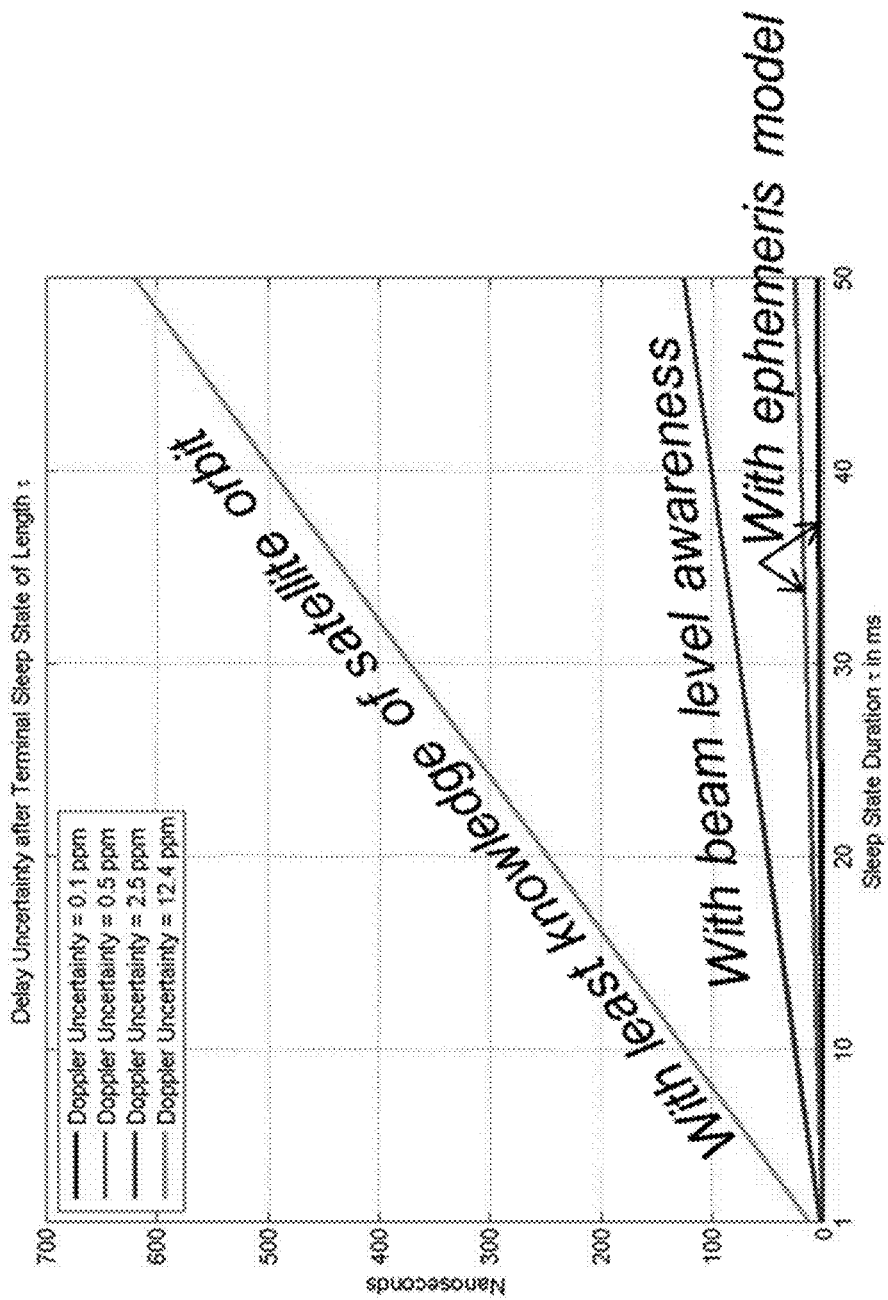
FIG. 11C illustrates uncertainty in delay as a function of terminal sleep duration, according to example embodiments.
Figure 11D:
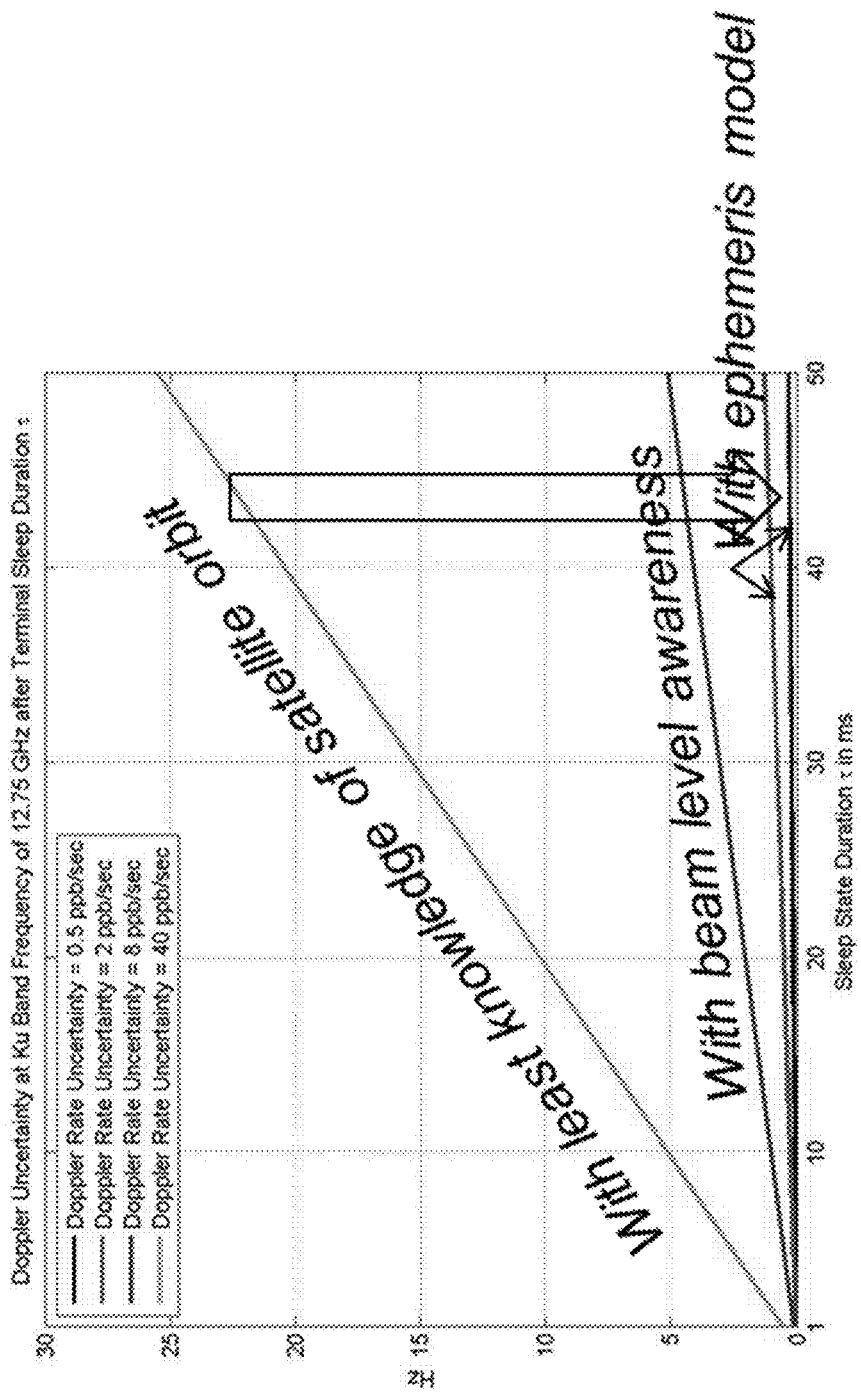
FIG. 11D illustrates uncertainty in Doppler as a function of terminal sleep duration, according to example embodiments.

FIG. 11C illustrates uncertainty in delay as a function of terminal sleep duration, and FIG. 11D illustrates uncertainty in Doppler as a function of terminal sleep duration, according to example embodiments. For example, The duration of the terminal sleep state and the predictability of satellite motion when terminal is in the sleep state determine the uncertainties at the terminal in delay and Doppler after the terminal wakes from the sleep state. The FIGS. 11C and 11D show example profiles of the delay and Doppler uncertainties, taking an example model of ephemeris knowledge (e.g., when the ephemeris is known at the terminal, the delay uncertainty at the highest bandwidth of 500 MHz reduces to a few symbols from a few hundred symbols).

According to example embodiments, certain design considerations are applied to address link outages. The terminal performs a link outage detection (signal present versus signal absent) check for each burst it receives. Further, due to the possibility of a link outage when the terminal wakes from a sleep state, the duration since it last successfully acquired a downlink burst can be greater than the duration of the sleep state. In case of a link outage, with regard to delay and Doppler uncertainties, the terminal expands its time and frequency domain acquisition ranges based on (i) the duration since last successful burst acquisition, and (ii) the expected uncertainties in the rates of change of delay and Doppler. Further, the terminal may include an extra margin in the acquisition ranges to guard against the possible drift in the terminal local timing and frequency references during its sleep state.

According to further example embodiments, in addition to simplifying the forward link burst acquisition at the terminal after it wakes from a sleep state, the knowledge of ephemeris at the terminal additionally helps simplify the return link burst acquisition at the satellite. By way of example, the following table illustrates example return link burst acquisition ranges at the satellite (SAT):

| Type of Return Link Window at SAT | Round Trip Delay Uncertainty | Round Trip Frequency Uncertainty | |
|---|---|---|---|
| | | in ppm | in kHz (at Ku Band) |
| Satellite Link Aperture | ±620 µs | ±26.66 ppm | ±363.2 kHz |
| Beam Width Aperture | ±440 µs | ±5.28 ppm | ±71.9 kHz |
| Wide Aperture | ±30 µs | ±0.3 ppm | ±4.1 kHz |
| Normal Aperture | ±2 µs | ±0.05 ppm | ±0.7 kHz |

In the table, the wide aperture and normal aperture rows are with ephemeris knowledge, and the satellite link aperture and beam width aperture rows are without ephemeris or position knowledge. In the connected mode, the normal aperture affects the frequency of the closed loop corrections (CLCs) to the UT Transmit Receive Offset (TRO), and the UT extrapolates the received TRO on the CLC using the ephemeris data to remain within the normal aperture. For initial contention access, the wide aperture is determined by the accuracy of the ephemeris model. The beam width aperture and satellite link aperture are required if the ephemeris knowledge is not available, and are included in the table for comparison. With the known ephemeris, the window sizes for return link burst acquisition at the satellite reduce by an order of magnitude. Accordingly, the wide aperture is chiefly determined by the accuracy of the ephemeris model and the terminal position knowledge—in the example numbers of the foregoing table, the allocated budget for ephemeris errors (in estimation of RT delay and RT Doppler) is ±30 µs and ±0.3 ppm, respectively.

The Normal and Wide Apertures described above are interrelated. The normal aperture affects the frequency of the closed loop corrections (CLCs) to UT's Transmit Receive Offset (TRO). For example, the RT Doppler error induced rate of change of ±0.3 ppm, and the normal aperture of ±2 is . . . one CLC may be needed ~2/0.3=6.6 seconds. Further, the Normal Aperture reduces with (i) increasing accuracy of the ephemeris, and (ii) an increase in the maximum rate at which the CLCs are sent. For (ii) above, the ETSI GMR-1 3G standard provides for a periodically dedicated uplink resource, which may be considered for a LEO satellite System.

Additionally, to support the "lost terminal" whose position is not available, the beam width aperture may be needed. For example, by using the estimate of the RTT latency and the RTT Doppler provided by the satellite (based on its beam width aperture), the "lost terminals" may be able to fix their positions. However, along the satellite ground track, the rate of change of RT Doppler is small, causing a high Geometric Dilution of Precision (GDOP). This issue can be addressed either by performing triangulation using multiple satellites, or by allowing for an increased delay in the position fix.

As shown above, accurate knowledge of ephemeris at the terminal helps simplify the burst acquisition after the terminal wakes up from a sleep state, after warm start, and at satellite and beam handovers. In that context, according to example embodiments, the following consist of an example set of requirements for the LEO satellite ephemeris: 1σ accuracy of satellite ephemeris position ~50 meters, and of satellite ephemeris velocity ~0.05 meters/sec. This accuracy facilitates an efficient design—for example, regarding UT and satellite acquisition and tracking mechanisms, handover mechanisms, paging mechanisms, etc. Further, the on-board timing and frequency references can be disciplined using the on-board GPS system at the satellite, which allows the on-board references to be highly stable (e.g., drift of less than $10^{-11}$), and simplifies terminal forward link acquisition at cold/warm start.

According to example embodiments, the format of the ephemeris model is a parametric set with the following parameters—argument of latitude L, inclination i, longitude of ascending node Ω, radius r. By way of example, each set of parameters may be valid for one orbit duration (e.g., about 100 minutes). The satellite position and velocity vectors in ECEF coordinates can be computed using the above orbit parameters at any given time using the following matrix equation:

$$\vec{p} = \begin{bmatrix} cosLcos\Omega - sinLsin\Omega cosi \\ cosLsin\Omega - sinLcos\Omega cosi \\ sinLsini \end{bmatrix}$$

Accordingly, each day, approximately 30 such sets are provided that cover a period of the next approximately two days. Further, such a format of the ephemeris simplifies transmission on the forward link broadcast control channel, where the ephemeris broadcast can be achieved in a highly compressed and extremely accurate manner.

MIMO for Satellite Links.

In radio, multiple-input/multiple-output (MIMO) is a method for multiplying the capacity of a radio link using multiple transmit and receive antennas to exploit multipath propagation. MIMO has become an essential element of wireless communication standards including IEEE 802.11n (Wi-Fi), IEEE 802.11ac (Wi-Fi), HSPA+(3G), WiMAX (4G), and Long Term Evolution (4G). More recently, MIMO has been applied to power-line communication for 3-wire installations as part of ITU G.hn standard and HomePlug AV2 specification.

According to example embodiments, channel capacity is improved through the application of MIMO techniques.

For single user applications, there are various channel capacity formulations.

Single-user single-input/single-output (SU-SISO) channel capacity in a Rayleigh channel is a random variable given as (e.g., if channel h is Rayleigh, SNR is multiplied by a Chi-squared variable with 2 degrees of freedom):

$C=\log_2(1+SNR*X_2^2)$

Single-user single-input/multiple-output (SU-SIMO) channel capacity in a Rayleigh channel with $n_R$ receive antennas is (thus, there is an SNR gain, because of increased degrees of freedom of Chi-squared variable):

$C=\log_2(1+SNR*X_{2\times n_R}^2)$

Single-user multiple-input/multiple-output (SU-MIMO) channel capacity in a Rayleigh channel with $n_R$ receive antennas and $n_T$ transmit antennas (total Tx power constraint of $P_T$):

$$C = \log_2\left[\det\left(I_{n_R} + \frac{P_T}{n_T\sigma^2}*HH^+\right)\right] = \log_2\left[\det\left(I_{n_R} + \frac{SNR}{n_T}*HH^+\right)\right]$$

whereby, for a given $n_R$, as $n_T$ gets large, $$\frac{1}{n_T}HH^+ \to I_{n_R},$$

and thus, $C=n_R \log_2[1+SNR]$, or alternatively $R=n_R B \log_2[1+SNR]$

Therefore, the original channel dimension (degrees of freedom) of B is multiplied by $n_R$—which reflects a dimensionality gain that translates to a more impressive outcome than SNR gain.

For a further MIMO channel capacity formulation, let Rank(H)=k≤min($n_T$, $n_R$), and $\{\lambda_i\}$ denote singular values of H—an alternative formulation for MIMO channel capacity is:

$$C = \sum_{i=1}^{k} \log_2(1 + SNR*\lambda_i/n_T)$$

where a rule of thumb for an upper bound for the channel capacity is:

$C \leq k*\log_2(1+SNR*u)$ where u is a random variable determined by singular values of H, and there is a linear multiplicative, instead of logarithmic, gain in C.

Figure 12A:
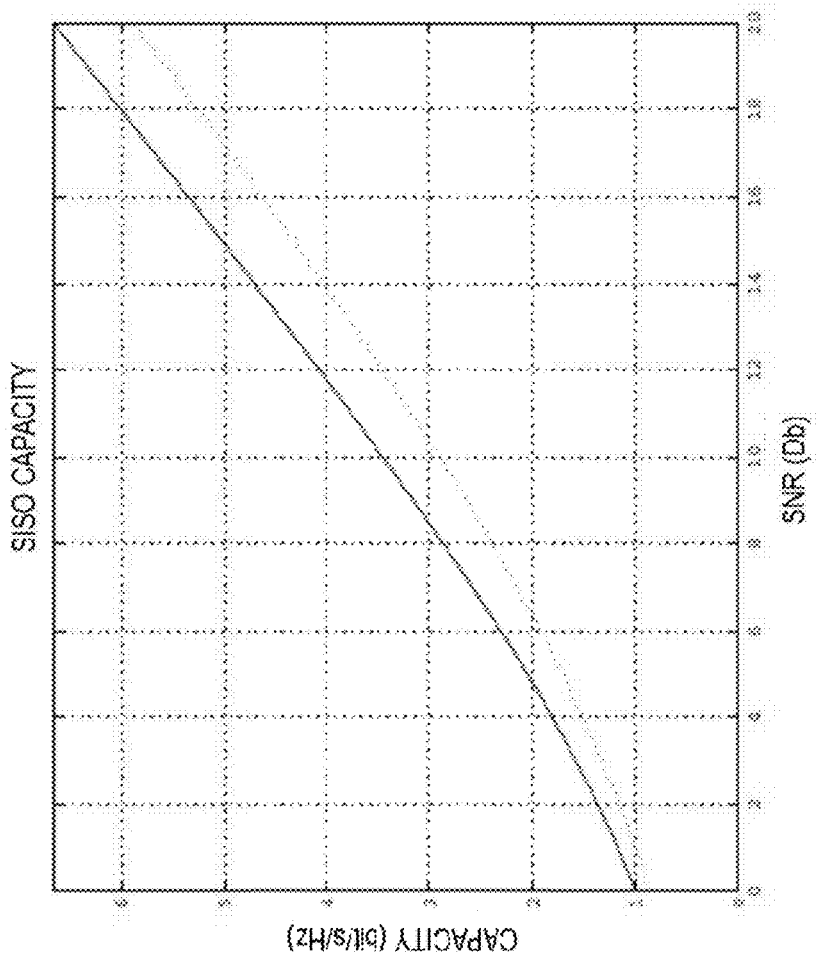
FIG. 12A illustrates the ergodic capacity of a Rayleigh fading SISO channel (dotted line) compared to the Shannon capacity of a SISO channel (solid line)
Figure 12B:
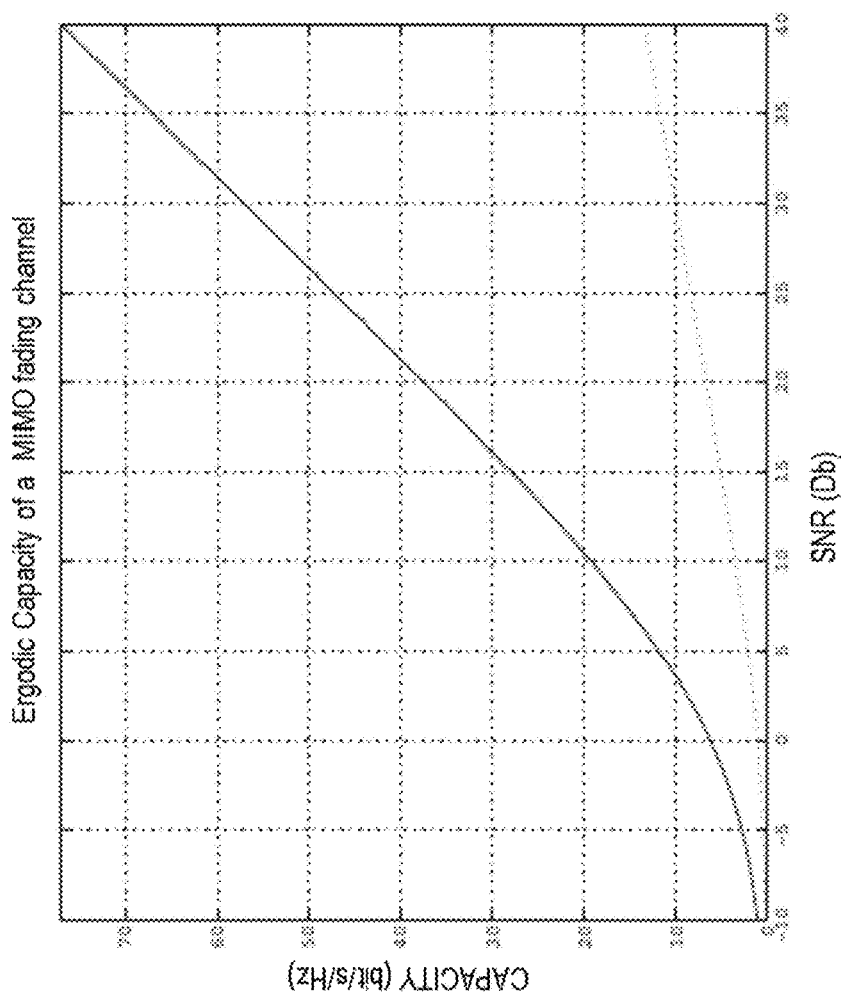
FIG. 12B illustrates the Shannon capacity of a SISO channel (dotted line) compared to the ergodic capacity of a Rayleigh fading MIMO channel (solid line)
Figure 12C:
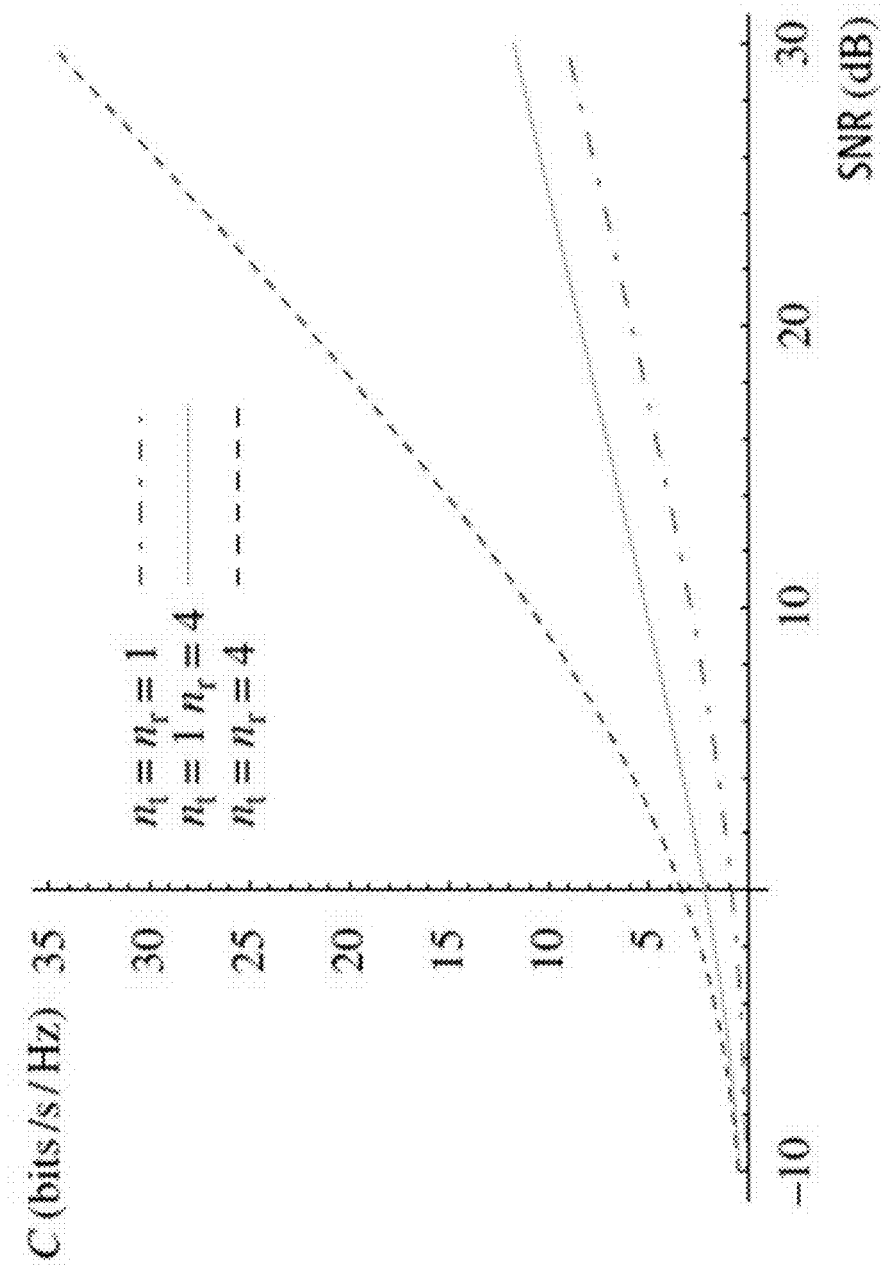
FIG. 12C illustrates a comparison between channel capacity of SISO, SIMO and MIMO channels.

FIG. 12A illustrates the ergodic capacity of a Rayleigh fading SISO channel (dotted line) compared to the Shannon capacity of a SISO channel (solid line). FIG. 12B illustrates the Shannon capacity of a SISO channel (dotted line) compared to the ergodic capacity of a Rayleigh fading MIMO channel (solid line) with $n_T=n_R=6$. FIG. 12C illustrates a comparison between channel capacity of SISO, SIMO and MIMO channels. In general, channel capacity can increase n fold with n×n MIMO.

According to example embodiments, for the model of a channel with inter-symbol interference (ISI), a received signal in the presence of ISI can be formulated as:

$$y(n) = \sum_{k=0}^{L-1} h_k b(n-k)$$

where, $[h_0, h_1, \ldots, h_{L-1}]^T$ is a L×1 vector of channel coefficients, and
$b=[b(0), b(1), \ldots, b(N_b-1)]$ is an $N_b \times 1$ vector of transmit signals.

This convolution operation can alternatively be represented in Matrix formulation as follows:

$$y=H \times b$$

Accordingly, with the model of a channel with ISI, the input symbol vector b is passed through the channel matrix H with ISI (e.g., multipath, FTN, etc.), and the received vector y=H×b, where the channel matrix H is as follows:

$$H = \begin{bmatrix} h_0 & & & \cdots & 0 \\ h_1 & h_0 & & & \\ h_2 & h_1 & & \ddots & \vdots \\ \vdots & & & & \\ 0 & \cdots & h_{L-1} & \cdots & h_1 & h_0 \end{bmatrix}_{N_b \times N_b}$$

Eigen-Decomposition of the Channel with ISI:

The channel with ISI is an LTI system, which has the complex exponentials (sinusoids) as its eigenfunctions. For this property to hold, however, $N_b$ is required to be infinite—unless matrix H is converted to the following circulant matrix (each row is the prior row right shifted by one, with several nonzero elements added in upper right corner, as follows (which is achieved by adding a cyclic prefix to the vector b:

$$H = \begin{bmatrix} h_0 & & & h_{L-1} & \cdots & h_1 \\ h_1 & h_0 & & & h_3 & h_2 \\ h_2 & h_1 & & & \ddots & \\ \vdots & & & & & \\ 0 & \cdots & h_{L-1} & \cdots & h_1 & h_0 \end{bmatrix}_{N_b \times N_b}$$

View of Orthogonal Frequency-Division Multiplexing (OFDM) as Linear Precoding:

Where $N_b \times N_b$ channel matrix H is decomposed according to eigen-decomposition: $H=V\Lambda V^+$. V is an $N_b \times N_b$ matrix of eigen-vectors of H (i.e., complex exponentials in DFT transformation), and $\Lambda$ is a diagonal matrix of $N_b$ eigenvalues (i.e., the DFT coefficients of channel vector h). DFT Precoding in OFDM: Given an $N_b \times 1$ vector b of transmission symbols, DFT precoding in OFDM transforms b to an $N_b \times 1$ vector b': b'=Vb.

Figure 13:
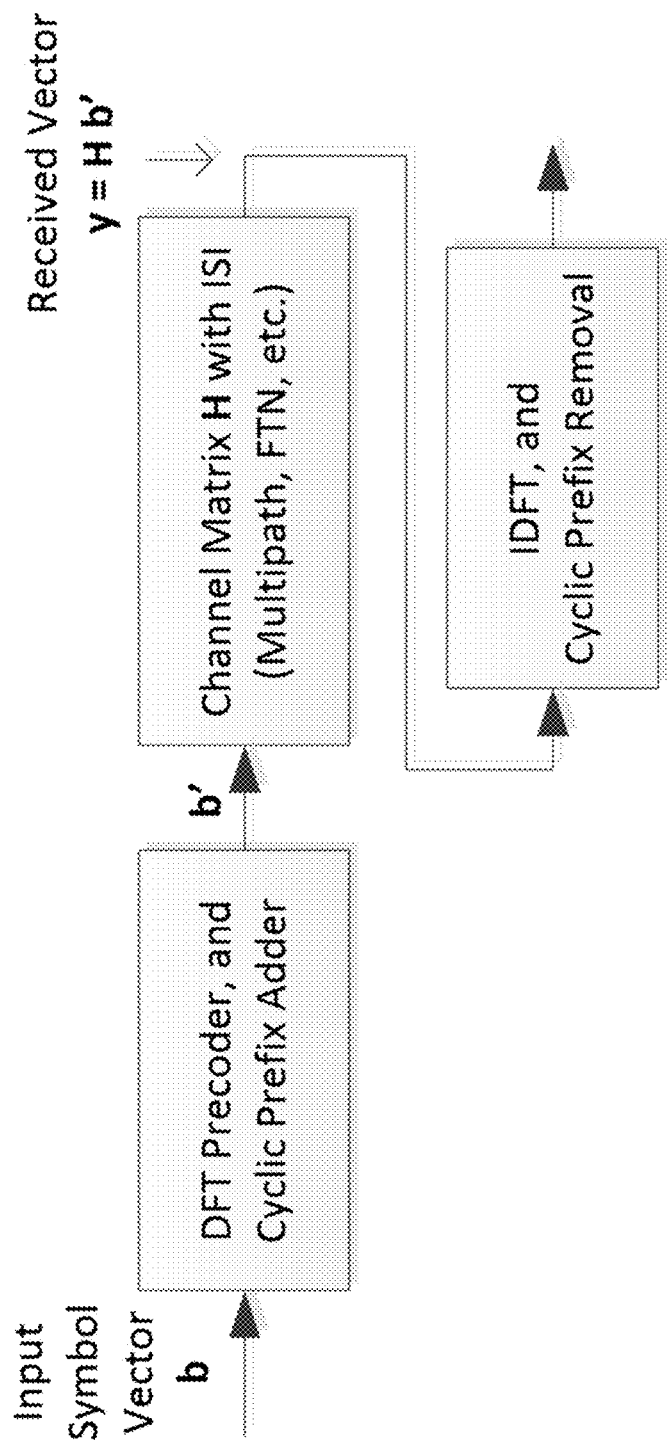
FIG. 13 illustrates a view of OFDM as linear precoding, according to example embodiments.

FIG. 13 illustrates a view of OFDM as linear precoding, according to example embodiments. The received signal $N_b \times 1$ vector is given as y=Hb'+n. The receiver applies linear transformation $C^+=V^+$ (i.e., the IDFT) to y to obtain $y'=C^+ y=V^+Hb'+V^+n=V^+V\Lambda V^+Vb+n'=\Lambda b+n'$. By applying DFT precoding, the channel with ISI (cross-connectivity across symbols) is transformed into a diagonal channel without ISI.

According to further example embodiments, architectures and designs are provided to claim the full capacity benefit of MIMO techniques. By way of example, analogous to DFT-based precoding described above, the MIMO matrix with full connectivity is diagonalized by eigen or singular value decomposition—where, unlike cyclic prefix operation in OFDM, there is not any method to convert MIMO matrix into a circulant matrix, thus, to achieve this diagonalization, unlike the OFDM scheme, both the transmitter and the receiver need to have the knowledge of channel matrix H.

According to one such embodiment, where the $n_R \times n_T$ channel matrix H is decomposed according to eigen decomposition—$H^+H=V\Lambda V^+$–V is an $n_T \times n_T$ matrix of eigen-vectors of $H^+H$, and $\Lambda$ is a diagonal matrix of $n_T$ eigenvalues. The MIMO Precoding is as follows: given an n×1 vector b of transmission symbols, where $n \leq n_T$, the MIMO precoding scheme transforms b to an $n_T \times 1$ vector b' ($b'=V_n Ab$)–$V_n$ is an $n_T \times n$ matrix with n vectors of V corresponding to nonzero eigenvalues in $\Lambda$, and A is an n×n diagonal matrix that allocates power across n parallel data streams. The received signal $n_R \times 1$ vector is given as y=Hb'+n. The receiver applies linear transformation $C^+=AV_n^+H^+$ to y to obtain $y'=C^+y=AV_n^+H^+Hb'+C^+n=AV_n^+H^+HV_nAb+n'=\Lambda A^2b+n'$. Thus, the interference caused by MIMO channel is completely eliminated because of the use of an appropriate precoding matrix $V_nA$ at the transmitter and a receiver "filter" $C=AV_nH$ at the receiver. Accordingly, such MIMO precoding provides optimal capacity gain due to MIMO with a very simple Further, such approaches may also applicable to other interference-rich scenarios such as FTN, NOMA, etc., as follows: (i) interpretation of Matrix H varies (matrix of ISI terms for FTN, matrix of CCI terms for NOMA, etc.) but the algebra remains the same.

Several studies in the literature have addressed MIMO over satellite, such as Dual polarization SU-MIMO, SU-MIMO with geographically separated ground stations, MIMO with multiple coordinated satellites, Multiuser MIMO over satellite.

Figure 14A:
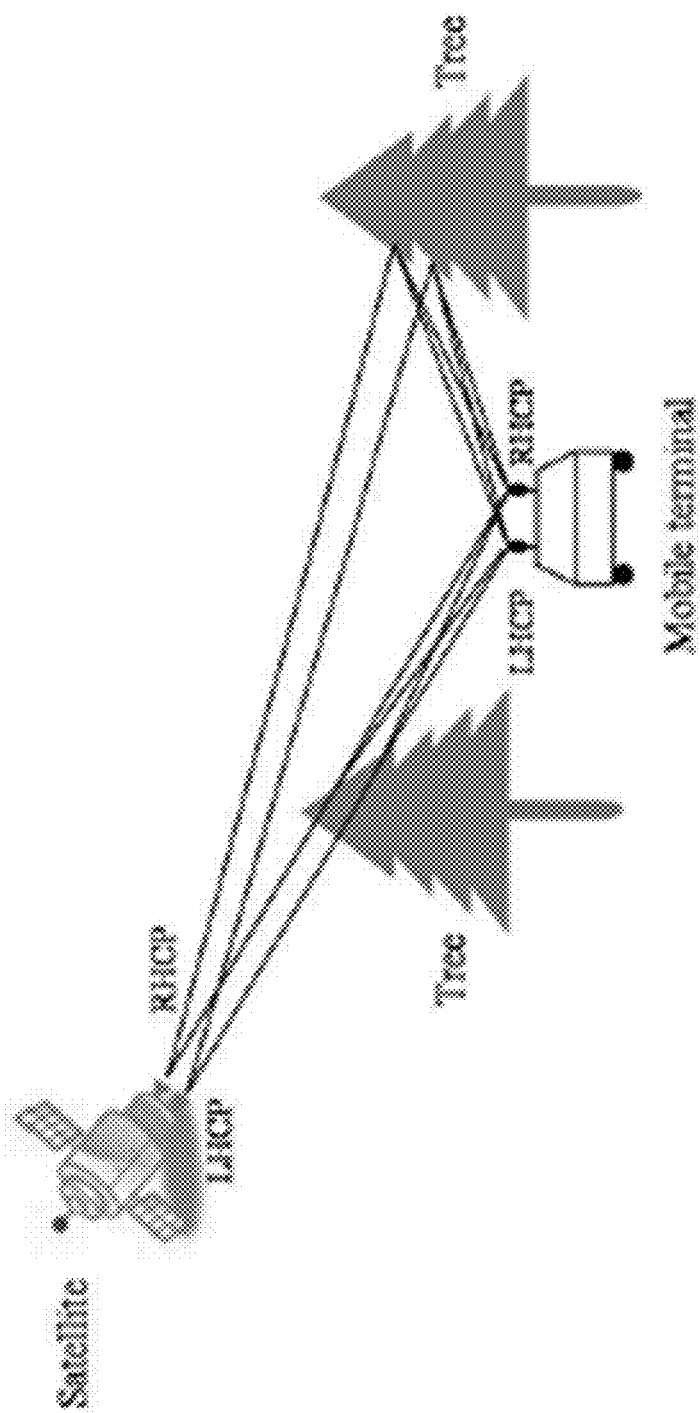
FIG. 14A illustrates an example of Dual Polarization SU-MIMO.
Figure 14B:
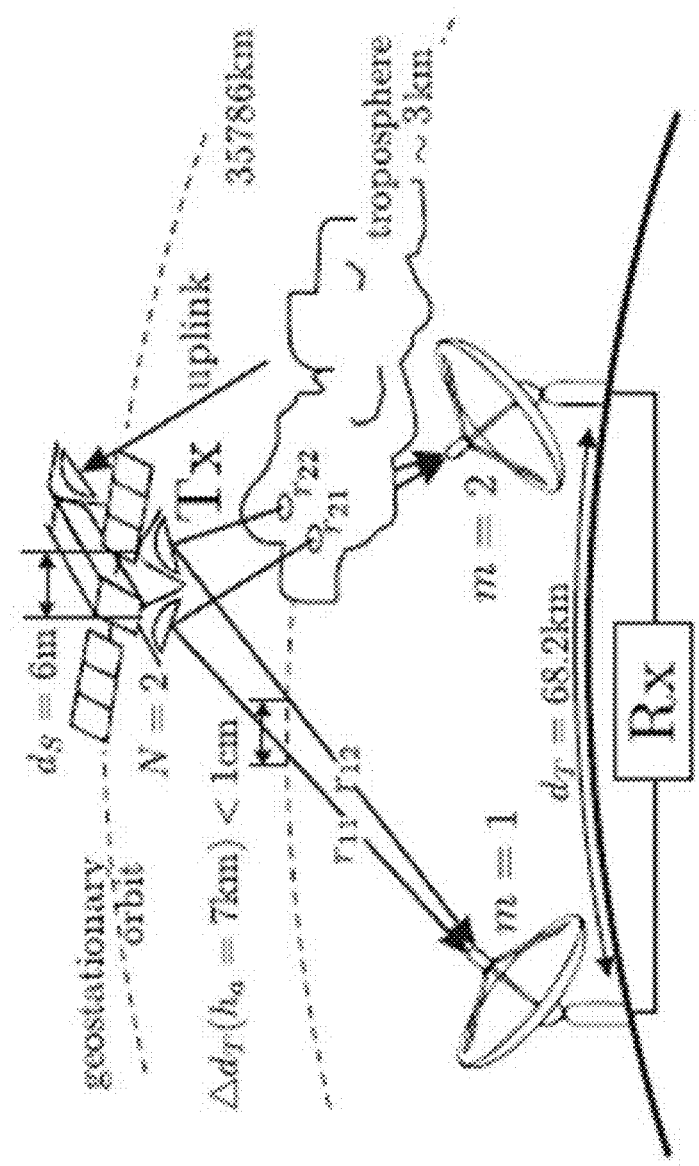
FIG. 14B illustrates an example of SU-MIMO with geographically separated ground stations.
Figure 14C:
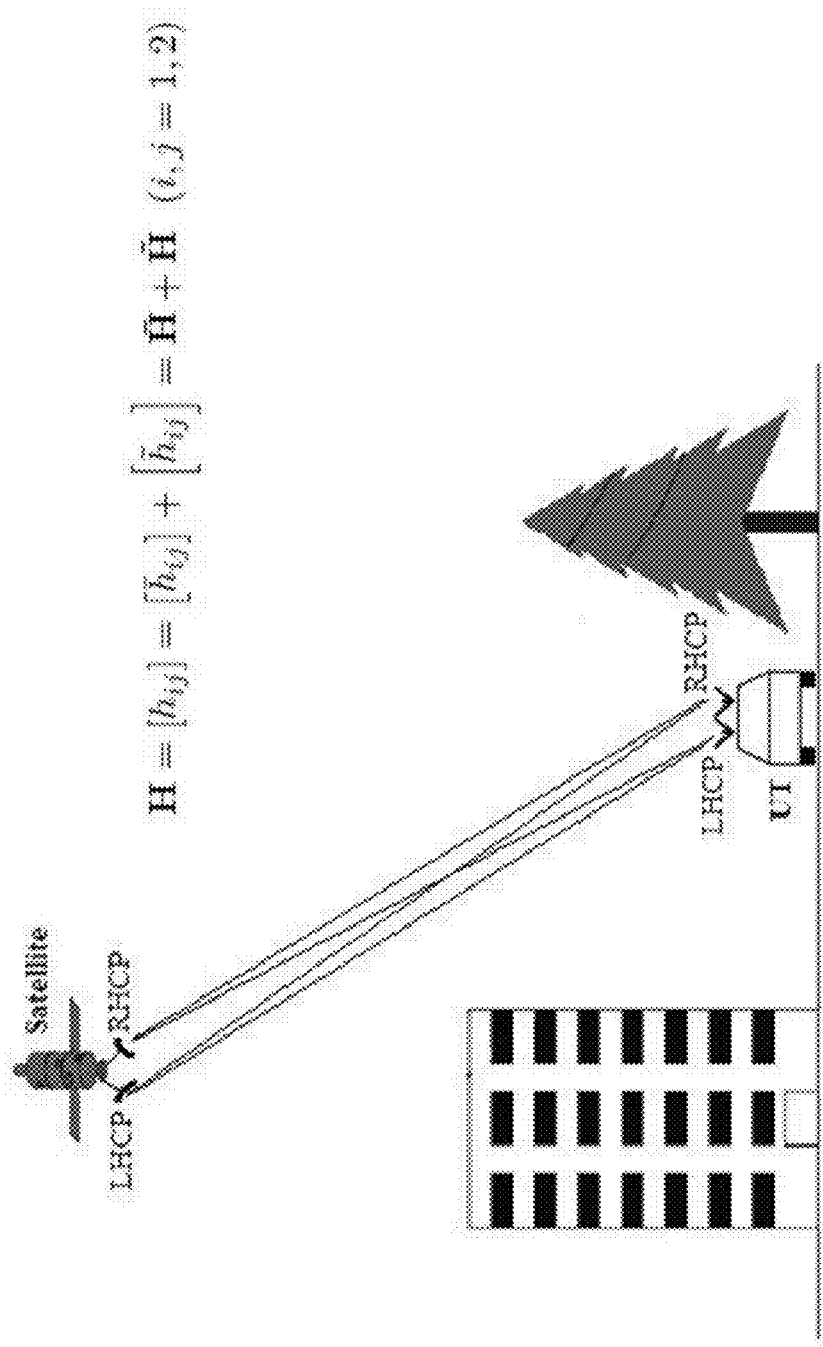
FIG. 14C (Statistical Modeling of Dual-Polarized MIMO Land Mobile Satellite Channels, Konstantinos P. Liolis, et al., IEEE Transactions on Communications, November 2010) illustrates an example of Dual Polarization MIMO over Land Mobile Satellite Systems.

FIG. 14A illustrates an example of Dual Polarization SU-MIMO, and FIG. 14B illustrates an example of SU-MIMO with geographically separated ground stations. FIG. 14C illustrates an example of Dual Polarization MIMO over Land Mobile Satellite Systems. A single satellite employs a dual circularly polarized antenna, and the UT similarly has a dual circularly polarized antenna. S (2/4 GHz) band, geostationary orbit (GEO), and MIMO channel has a LOS component and a diffuse component.

The following table illustrates parameters assumed for Dual-Polarized MIMO LMS channel scenarios.

| Parameter | Open Rural Environment | Suburban Environment | Urban Environment | Reference |
|---|---|---|---|---|
| Operating frequency, f | 2.2 GHz (S band) | 2.2 GHz (S band) | 2.2 GHz (S band) | [9] |
| Satellite orbit | GEO | GEO | GEO | [9] |
| Polarization | RHCP & LHCP | RHCP & LHCP | RHCP & LHCP | [9] |
| Mobile UT speed, υ | 50 km/h | 50 km/h | 50 km/h | [9] |
| Satellite elevation angle, θ | 40° | 40° | 40° | [9] |
| XPD of environment, $XPC_{env}$ | 15 dB | 6 dB | 5 dB | [8], [17] |
| XPD of UT antenna, $XPD_{ant}$ | 15 dB | 15 dB | 15 dB | [8], [17] |
| Loo statistical parameter triplet (α, ψ, MP) | For each environment, each time a new state is reached, (α, ψ, MP) are drawn from corresponding joint distribution | | | [14] |
| Polarization correlation coefficient of small-scale fading components at Tx, $\bar{\rho}_{tx}$ | 0.4 | 0.5 | 0.5 | [8], [17] |
| Polarization correlation coefficient of small-scale fading components at Tx, $\bar{\rho}_{rx}$ | 0.5 | 0.5 | 0.5 | [8], [17] |
| Polarization correlation matrix of large-scale fading components, $\bar{C}$ | $\begin{bmatrix} 1 & 0.80 & 0.85 & 0.00 \\ 0.80 & 1 & 0.01 & 0.87 \\ 0.85 & 0.91 & 1 & 0.88 \\ 0.90 & 0.87 & 0.88 & 1 \end{bmatrix}$ | $\begin{bmatrix} 1 & 0.76 & 0.70 & 0.83 \\ 0.76 & 1 & 0.83 & 0.75 \\ 0.70 & 0.83 & 1 & 0.78 \\ 0.83 & 0.75 & 0.78 & 1 \end{bmatrix}$ | $\begin{bmatrix} 1 & 0.86 & 0.80 & 0.92 \\ 0.86 & 1 & 0.89 & 0.85 \\ 0.86 & 0.89 & 1 & 0.93 \\ 0.92 & 0.85 & 0.93 & 1 \end{bmatrix}$ | [6] |
| Inter-state temporal variations | For each environment, first-order 2-state Markov chain model with respective absolute state and state transitions probability matrices $W_{MIMO} = W_{SISO}$ and $P_{MIMO} = P_{SISO}$ | | | [14] | receiver architecture, and channel coding schemes for SISO channel work "as-is," and provide the same performance gain as the more complicated space-time coding.

According to example embodiments, such approaches are applicable to the satellite forward link, as follows: (i) vector b is available at the Gateway (Forward link bit streams of different users); (ii) assuming LOS channel without diffuse component, matrix H is available at the Gateway (secondary feed elemental gain vectors for different users); (iii) however, the $k^{th}$ user sees only one element, $y_k$, of vector y—a central processing entity is therefore employed, which collects different elements of y from different users, has knowledge of H and $V_n$ matrices used at the transmitter, applies linear transformation C to y, and sends elements of y' back to corresponding users.

Further, such approaches are also applicable to the satellite return link, as follows: (i) the concept of the central processing entity can be extended to enable similar precoding scheme for the return link transmissions from different users.

Figure 15A:
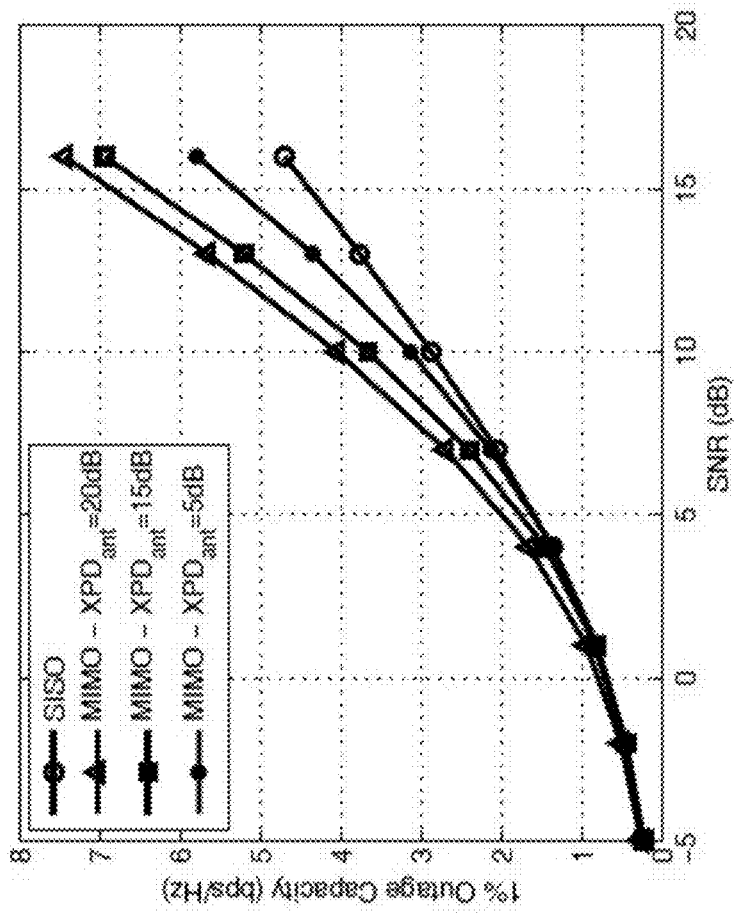
FIG. 15A illustrates a channel capacity example in a rural environment.

FIG. 15A illustrates a channel capacity example in a rural environment. As cross-polarization discrimination of UT antenna increases, the cross-polar interferences become weaker, the MIMO channel becomes diagonal and the outage capacity achieved increases.

Figure 15B:
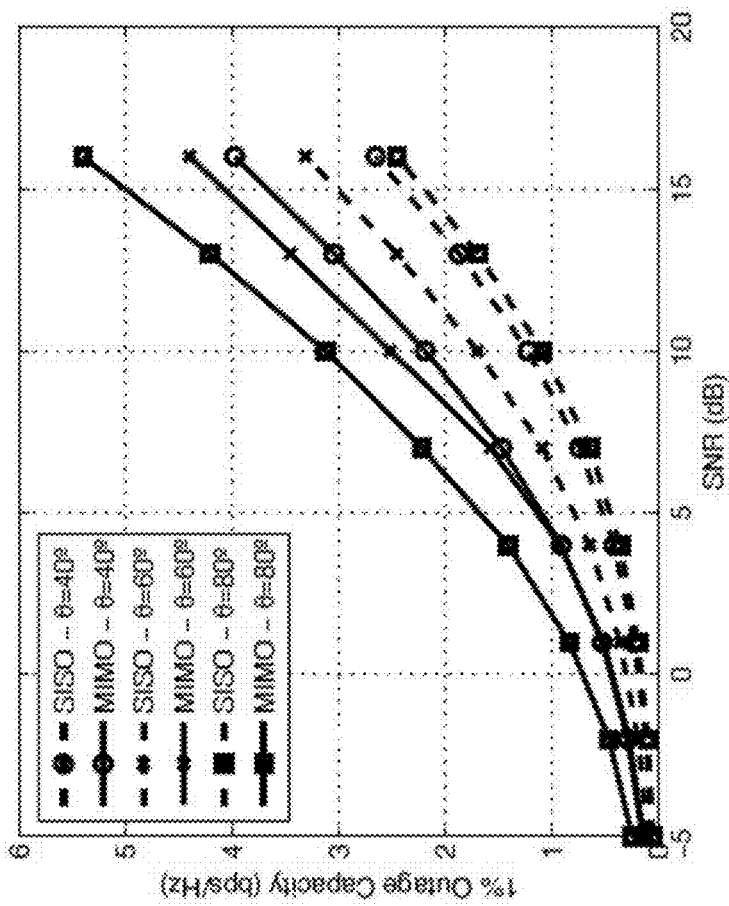
FIG. 15B illustrates a channel capacity example in a suburban environment.

FIG. 15B illustrates a channel capacity example in a suburban environment. As satellite elevation reduces, the blockage probability decreases and MIMO capacity reduces.

Figure 15C:
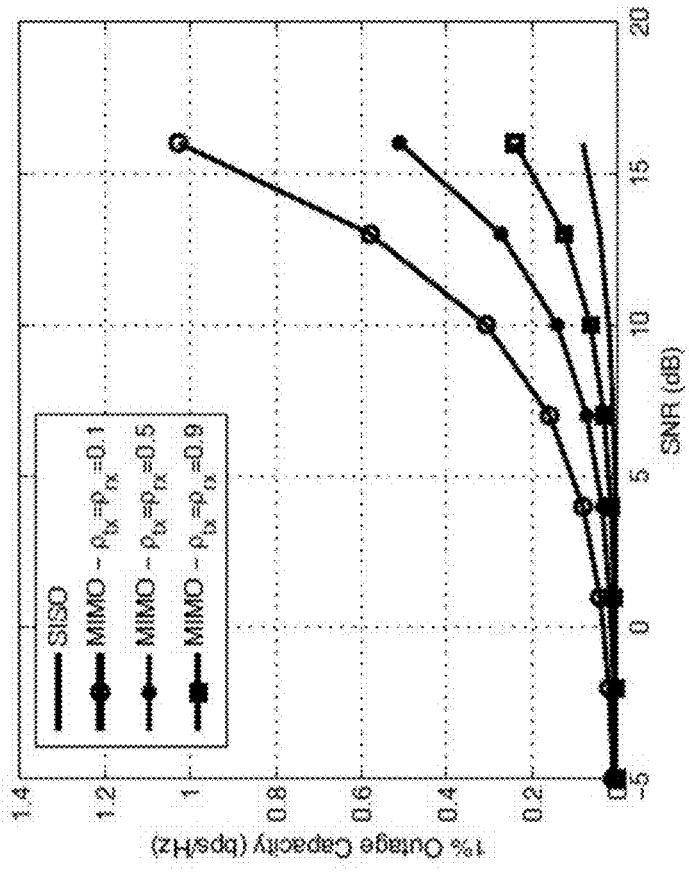
FIG. 15C illustrates a channel capacity example in a suburban environment.

FIG. 15C illustrates a channel capacity example in a suburban environment. A significantly reduced MIMO capacity exists in urban environment. If polarization correlation coefficient is low (e.g., around 0.1), for the diffuse component, MIMO can provide ten-fold increase in the capacity. A typical polarization correlation coefficient is around 0.5.

Figure 15D:
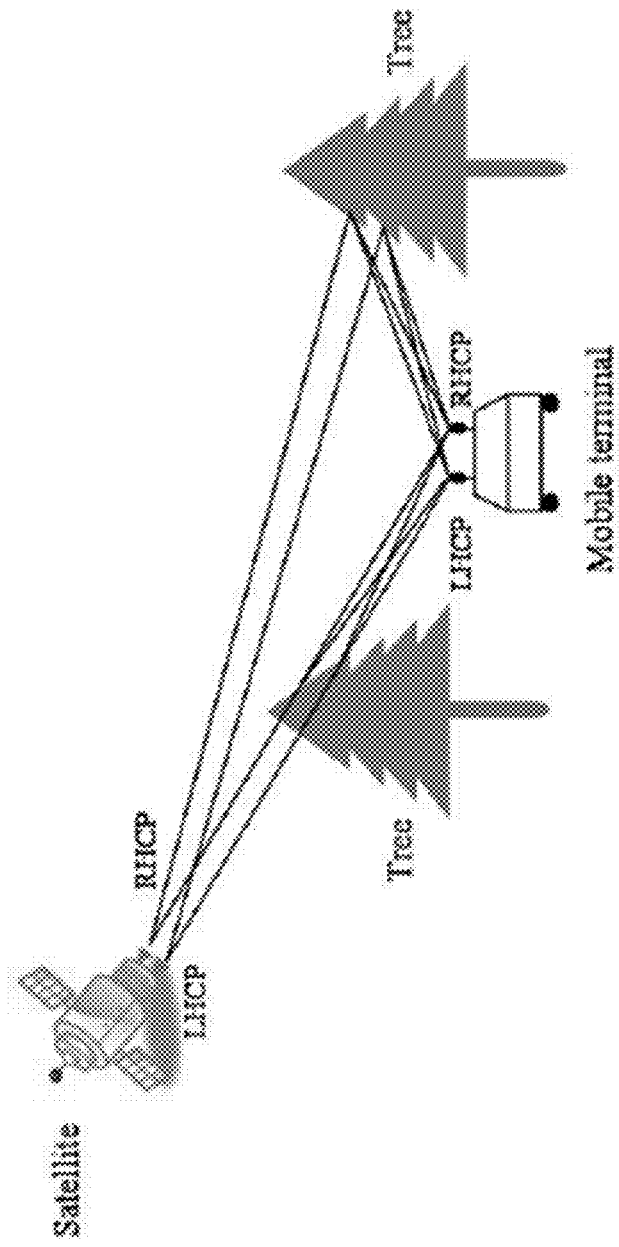
FIG. 15D (Michael Cheffena, Fernando Perez Fontan, Frederic Lacoste, Erwan Corbel, Henri-Jose Mametsa and Guillaume Carrie, IEEE Trans Ant and Propagation) illustrates modeling and performance evaluation of a land mobile satellite dual polarized MIMO channel along roadside trees.

FIG. 15D illustrates modeling and performance evaluation of a land mobile satellite dual polarized MIMO channel along roadside trees. The following table lists the MIMO shadowing correlation coefficients obtained from simulations:

TABLE I

MIMO SHADOWING CORRELATION COEFFICIENTS
OBTAINED FROM FDTD SIMULATIONS

|     | R/R  | L/L  | R/L  | L/R  |
|-----|------|------|------|------|
| R/R | 1    | 0.87 | 0.30 | 0.43 |
| L/L | 0.87 | 1    | 0.26 | 0.47 |
| R/L | 0.30 | 0.26 | 1    | 0.49 |
| L/R | 0.43 | 0.47 | 0.49 | 1    |

Figure 16C:
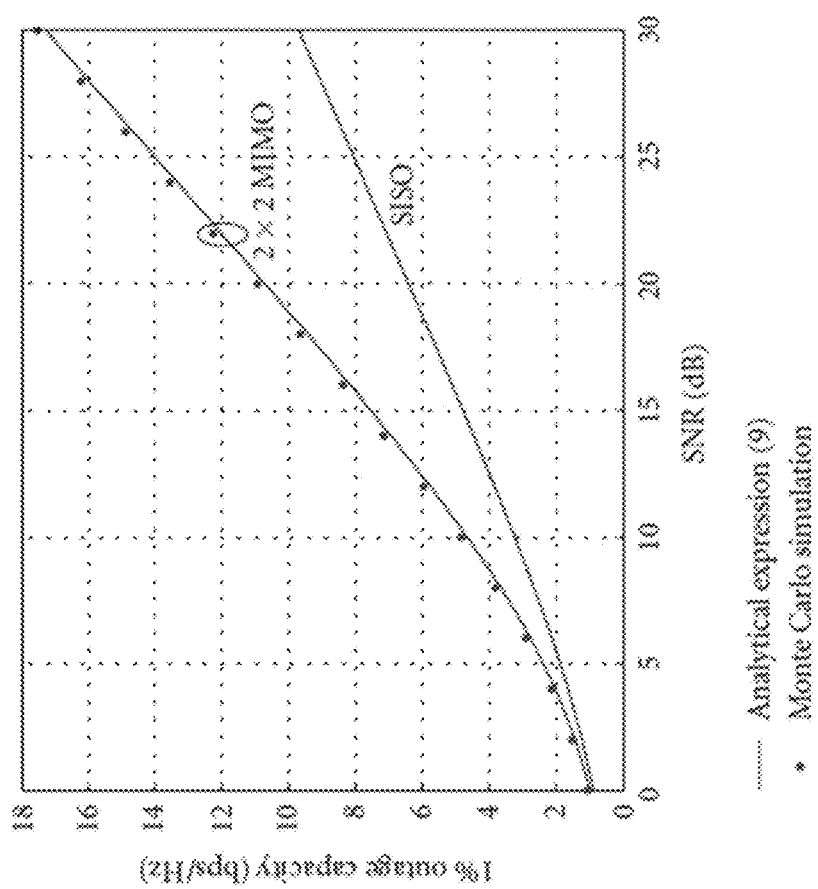
FIG. 16C illustrates channel capacity of a dual satellite MIMO.

FIG. 16A and FIG. 16B illustrate a multi-satellite MIMO example at Ka band and above. FIG. 16A shows a configuration of a dual-satellite 2×2 MIMO channel, where i Individual satellites $S_1$ and $S_2$ transmit either independent data streams (MIMO spatial multiplexing system) or the same signal over the multiple independently fading paths (MIMO diversity system), and FIG. 16B shows the associated elevation angles. FIG. 16C illustrates channel capacity of a dual satellite MIMO. The capacity may be formulated as:

$$C = \sum_{i=1}^{2} \log_2\left(1 + \frac{SNR_i}{2} * 10^{-A_{R_i}/10}\right)$$

For multi-user MIMO, based on applying either a linear (e.g., MMSE) or nonlinear (e.g., Tomlinson-Harashima) precoding at the transmitter, the following table shows a performance comparison of various satellite multi-beam precoding techniques (MIMO over Satellite: A Review, By Arapalogou et al., IEEE Communications Surveys and Tutorials, 2011):

TABLE IV

PERFORMANCE COMPARISON OF VARIOUS SATELLITE
MULTIBEAM PRECODING TECHNIQUES [120].

|           |           | Rate (bps/Hz) | Availability (%) | Rate Variance |
|-----------|-----------|---------------|------------------|---------------|
| Reference | Beam 1    | 2.55          | 96.3             | 1.35          |
|           | Beam 4    | 1.45          | 92.7             | 0.16          |
|           | Aggregate | 16.80         | 95               | 1.19          |
| MMSE      | Beam 1    | 3.16          | 84.9             | 4.24          |
|           | Beam 4    | 1.89          | 74.8             | 1.63          |
|           | Aggregate | 20.90         | 83.7             | 3.89          |
| MOB       | Beam 1    | 0.86          | 43.0             | 0.11          |
|           | Beam 4    | 0.86          | 42.5             | 0.11          |
|           | Aggregate | 6.04          | 42.7             | 0.11          |
| IMOB      | Beam 1    | 8.09          | 100              | 3.74          |
|           | Beam 7    | 2.19          | 87.6             | 0.74          |
|           | Aggregate | 24.40         | 95.5             | 1.12          |

While example embodiments of the present invention may provide for various implementations (e.g., including hardware, firmware and/or software components), and, unless stated otherwise, all functions are performed by a CPU or a processor executing computer executable program code stored in a non-transitory memory or computer-readable storage medium, the various components can be implemented in different configurations of hardware, firmware, software, and/or a combination thereof. Except as otherwise disclosed herein, the various components shown in outline or in block form in the figures are individually well known and their internal construction and operation are not critical either to the making or using of this invention or to a description of the best mode thereof.

In the preceding specification, various embodiments have been described with reference to the accompanying drawings. It will, however, be evident that various modifications may be made thereto, and additional embodiments may be implemented, without departing from the broader scope of the invention as set forth in the claims that follow. The specification and drawings are accordingly to be regarded in an illustrative rather than restrictive sense.

What is claimed is:

1. A satellite communications system comprising:
   a plurality of one or more of low earth orbit (LEO) satellites, medium earth orbit (MEO) satellites and geosynchronous earth orbit (GEO) satellites;
   a gateway node comprising one or more satellite gateways each configured to communicate over respective channels of each of the plurality of satellites via at least one respective gateway antenna, an IP core network, and a border gateway configured to communicate with one or more external IP networks;
   one or more satellite terminals; and
   a plurality of mobile user terminals, wherein the mobile user terminals, of a first subset of the plurality of mobile user terminals, each is configured to communicate with a respective one of the satellite gateways, over one or more channels of the plurality of satellites, via an associated one of the satellite terminals, and wherein the mobile user terminals, of a second subset of the plurality of mobile user terminals, each is configured to communicate with a respective one of the satellite gateways directly over one or more channels of the plurality of satellites; and
   wherein the mobile user terminals, of the first subset of the plurality of mobile user terminals, each is configured to communicate with the associated one of the satellite terminals locally via an S-band channel; and
   wherein the mobile user terminals, of the second subset of the plurality of mobile user terminals, each is configured to communicate directly over the one or more channels of the plurality of satellites, via one or more of Ku band and Ka Band;
   wherein each of the one or more satellite gateways is configured to communicate over the respective channels of each of the plurality of satellites via one or more of Ka band, Ku band, V-band and L-band; and
   wherein, for purposes synchronization and to ensure that uplink transmissions of different mobile user terminals do not overlap or collide at a respective one of the LEO, MEO or GEO satellites, the mobile user terminals are configured to continually adjust a transmit receive offset (TRO) of the terminal to make it equal to a negative of its return trip time (RTT) latency plus a system constant.

* * * * *